US012257827B2

(12) United States Patent
Yamaguchi et al.

(10) Patent No.: US 12,257,827 B2
(45) Date of Patent: Mar. 25, 2025

(54) TAPE CASSETTE

(71) Applicant: BROTHER KOGYO KABUSHIKI KAISHA, Nagoya (JP)

(72) Inventors: Koshiro Yamaguchi, Kakamigahara (JP); Akira Sago, Seto (JP); Takashi Horiuchi, Kariya (JP); Yasuhiro Iriyama, Mie-gun (JP); Yasuhiro Shibata, Okazaki (JP); Tsuyoshi Nagae, Kasugai (JP); Masato Kato, Kasugai (JP); Teruo Imamaki, Nissin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/211,412

(22) Filed: Jun. 19, 2023

(65) Prior Publication Data

US 2023/0331011 A1 Oct. 19, 2023

Related U.S. Application Data

(63) Continuation of application No. 17/339,374, filed on Jun. 4, 2021, now Pat. No. 11,707,938, which is a (Continued)

(30) Foreign Application Priority Data

Mar. 31, 2009 (JP) ................................ 2009-088440
Mar. 31, 2009 (JP) ................................ 2009-088441
(Continued)

(51) Int. Cl.
*B41J 15/04* (2006.01)
*B41J 2/325* (2006.01)
(Continued)

(52) U.S. Cl.
CPC ............ *B41J 15/044* (2013.01); *B41J 2/325* (2013.01); *B41J 3/4075* (2013.01); *B41J 11/009* (2013.01); *B41J 32/00* (2013.01)

(58) Field of Classification Search
CPC ........ B41J 15/044; B41J 2/325; B41J 3/4075; B41J 11/009; B41J 32/00
See application file for complete search history.

(56) References Cited

U.S. PATENT DOCUMENTS 3,901,372 A 8/1975 Denley
4,127,883 A 11/1978 Mestdagh
(Continued)

FOREIGN PATENT DOCUMENTS

AU 2003294971 A1 7/2004
CA 2108332 A1 4/1994
(Continued)

OTHER PUBLICATIONS

Notice of Allowance dated Oct. 7, 2021 received in U.S. Appl. No. 16/923,690.
(Continued)

*Primary Examiner* — David H Banh
(74) *Attorney, Agent, or Firm* — KENEALY VAIDYA LLP

(57) ABSTRACT

A tape cassette includes a box-like housing, a tape mounted within the housing, a hole and a first indicator portion. The housing includes a top wall having a top surface, a bottom wall having a bottom surface and opposing the top wall, and a front wall having a specified height and being formed along peripheries of the top wall and the bottom wall. The
(Continued)

hole is provided in the front wall. The first indicator portion includes at least one first aperture and indicates a first element among a plurality of elements of a type of the tape. The first indicator portion is provided in a portion, spaced from the front wall, of the bottom wall. The hole and the one first aperture is located to intersect a virtual line orthogonal to the front wall when viewing along a vertical direction orthogonal to the top wall and the bottom wall.

13 Claims, 24 Drawing Sheets

Related U.S. Application Data continuation of application No. 16/866,950, filed on May 5, 2020, now Pat. No. 11,052,685, which is a continuation of application No. 16/256,604, filed on Jan. 24, 2019, now Pat. No. 10,675,894, which is a continuation of application No. 15/866,000, filed on Jan. 9, 2018, now Pat. No. 10,226,949, which is a continuation of application No. 15/250,310, filed on Aug. 29, 2016, now Pat. No. 10,201,988, which is a continuation of application No. 14/641,681, filed on Mar. 9, 2015, now Pat. No. 9,498,988, which is a continuation of application No. 12/732,457, filed on Mar. 26, 2010, now Pat. No. 9,427,988.

(30) Foreign Application Priority Data

| | | |
|---|---|---|
| Mar. 31, 2009 | (JP) | 2009-088456 |
| Mar. 31, 2009 | (JP) | 2009-088460 |
| Mar. 31, 2009 | (JP) | 2009-088468 |
| Jun. 30, 2009 | (JP) | 2009-156355 |
| Jun. 30, 2009 | (JP) | 2009-156357 |
| Jun. 30, 2009 | (JP) | 2009-156369 |
| Jun. 30, 2009 | (JP) | 2009-156371 |

(51) Int. Cl.

| | |
|---|---|
| ***B41J 3/407*** | (2006.01) |
| ***B41J 11/00*** | (2006.01) |
| ***B41J 32/00*** | (2006.01) |

(56) References Cited

U.S. PATENT DOCUMENTS

| | | | |
|---|---|---|---|
| 4,226,547 | A | 10/1980 | Bradshaw et al. |
| 4,360,278 | A | 11/1982 | Paque |
| D267,330 | S | 12/1982 | Worrell |
| 4,391,539 | A | 7/1983 | Connoy |
| 4,402,619 | A | 9/1983 | Paque et al. |
| 4,557,617 | A | 12/1985 | Richardson et al. |
| 4,567,488 | A | 1/1986 | Moriguchi et al. |
| 4,678,353 | A | 7/1987 | Richardson et al. |
| 4,725,155 | A | 2/1988 | Kittel et al. |
| 4,773,775 | A | 9/1988 | Bradshaw et al. |
| 4,815,871 | A | 3/1989 | McGourty et al. |
| 4,815,874 | A | 3/1989 | Richardson et al. |
| 4,815,875 | A | 3/1989 | Richardson et al. |
| 4,832,514 | A | 5/1989 | Basile |
| 4,844,636 | A | 7/1989 | Paque |
| 4,880,325 | A | 11/1989 | Ueda et al. |
| 4,892,425 | A | 1/1990 | Shimizu et al. |
| D307,296 | S | 4/1990 | Ivarson et al. |
| 4,915,516 | A | 4/1990 | Shimizu et al. |
| 4,917,514 | A | 4/1990 | Richardson et al. |
| D307,918 | S | 5/1990 | Goda |
| 4,927,278 | A | 5/1990 | Kuzuya et al. |
| 4,930,913 | A | 6/1990 | Basile |
| D311,416 | S | 10/1990 | Richardson et al. |
| 4,966,476 | A | 10/1990 | Kuzuya et al. |
| 4,983,058 | A | 1/1991 | Nagae |
| 5,022,771 | A | 6/1991 | Paque |
| D319,070 | S | 8/1991 | Lavander |
| D320,391 | S | 10/1991 | Paque |
| 5,056,940 | A | 10/1991 | Basile |
| 5,078,523 | A | 1/1992 | McGourty et al. |
| 5,098,208 | A | 3/1992 | Martinez |
| 5,104,247 | A | 4/1992 | Ohshima |
| 5,111,216 | A | 5/1992 | Richardson et al. |
| 5,188,469 | A | 2/1993 | Nagao et al. |
| 5,193,919 | A | 3/1993 | Godo et al. |
| 5,195,835 | A | 3/1993 | Collins |
| 5,203,951 | A | 4/1993 | Hattori et al. |
| 5,223,939 | A | 6/1993 | Imaizumi et al. |
| 5,227,477 | A | 7/1993 | Auerbach et al. |
| 5,239,437 | A | 8/1993 | Hoge et al. |
| D342,275 | S | 12/1993 | Cooper |
| 5,273,272 | A | 12/1993 | Nakamura et al. |
| RE34,521 | E | 1/1994 | Shimizu et al. |
| 5,277,503 | A | 1/1994 | Nagao |
| 5,318,370 | A | 6/1994 | Nehowig |
| 5,348,406 | A | 9/1994 | Yoshiaki et al. |
| 5,350,243 | A | 9/1994 | Ichinomiya et al. |
| D352,305 | S | 11/1994 | Cooper |
| 5,374,132 | A | 12/1994 | Kimura |
| D356,333 | S | 3/1995 | Pearce et al. |
| 5,395,173 | A | 3/1995 | Ueno et al. |
| 5,399,033 | A | 3/1995 | Putman |
| D357,497 | S | 4/1995 | Gray et al. |
| 5,411,339 | A | 5/1995 | Bahrabadi et al. |
| 5,419,648 | A | 5/1995 | Nagao et al. |
| D359,303 | S | 6/1995 | Gray et al. |
| 5,424,757 | A | 6/1995 | Thom |
| 5,429,443 | A | 7/1995 | Kobayashi et al. |
| 5,431,504 | A | 7/1995 | Beadman et al. |
| 5,435,657 | A | 7/1995 | Pearce et al. |
| 5,454,650 | A | 10/1995 | Yamaguchi |
| 5,466,076 | A | 11/1995 | Kobayashi et al. |
| 5,492,282 | A | 2/1996 | Okuchi et al. |
| 5,492,420 | A | 2/1996 | Nunokawa et al. |
| 5,494,362 | A | 2/1996 | Kobayashi et al. |
| 5,506,736 | A | 4/1996 | Ota |
| 5,511,891 | A | 4/1996 | Nehowig et al. |
| 5,518,328 | A | 5/1996 | Okuchi et al. |
| D372,044 | S | 7/1996 | Ware et al. |
| 5,533,818 | A | 7/1996 | Bahrabadi |
| 5,536,092 | A | 7/1996 | Yamaguchi |
| 5,538,352 | A | 7/1996 | Sugiura |
| 5,540,510 | A | 7/1996 | Sims et al. |
| 5,541,796 | A | 7/1996 | Sawada |
| 5,553,952 | A | 9/1996 | Umbach |
| 5,564,843 | A | 10/1996 | Kawaguchi |
| 5,593,237 | A | 1/1997 | Nozaki et al. |
| 5,595,447 | A | 1/1997 | Takayama et al. |
| 5,599,119 | A | 2/1997 | Nunokawa et al. |
| 5,605,404 | A | 2/1997 | Nunokawa et al. |
| 5,620,268 | A | 4/1997 | Yamaguchi et al. |
| 5,634,728 | A | 6/1997 | Nunokawa et al. |
| 5,653,542 | A | 8/1997 | Sugimoto et al. |
| 5,658,083 | A | 8/1997 | Day et al. |
| 5,659,441 | A | 8/1997 | Eckberg et al. |
| 5,709,486 | A | 1/1998 | Day |
| 5,727,888 | A | 3/1998 | Sugimoto et al. |
| 5,730,536 | A | 3/1998 | Yamaguchi |
| 5,739,839 | A | 4/1998 | Iwai et al. |
| 5,752,777 | A | 5/1998 | Nunokawa et al. |
| 5,755,519 | A | 5/1998 | Klinefelter |
| 5,765,954 | A | 6/1998 | Nunokawa et al. |
| 5,771,803 | A | 6/1998 | Takami |
| 5,788,387 | A | 8/1998 | Takayama et al. |
| 5,795,086 | A | 8/1998 | Watanabe et al. |
| 5,813,773 | A | 9/1998 | Kawai |
| 5,813,779 | A | 9/1998 | Palmer et al. |
| 5,823,689 | A | 10/1998 | Nehowig et al. |
| 5,825,724 | A | 10/1998 | Matsumoto et al. |
| 5,826,995 | A | 10/1998 | Day et al. |
| 5,857,788 | A | 1/1999 | Gutsell et al. |
| 5,860,752 | A | 1/1999 | Watanabe et al. |

(56) References Cited

U.S. PATENT DOCUMENTS 5,887,993 A 3/1999 Nunokawa et al.
5,961,225 A 10/1999 Nunokawa et al.
5,964,539 A 10/1999 Yamaguchi et al.
5,967,678 A 10/1999 Nunokawa et al.
5,997,194 A 12/1999 Nunokawa et al.
6,012,860 A 1/2000 Nunokawa et al.
6,016,749 A 1/2000 Tukahara et al.
6,042,280 A 3/2000 Yamaguchi et al.
6,048,118 A 4/2000 Martinez et al.
6,050,672 A 4/2000 Matsuhashi
6,050,734 A 4/2000 Watanabe et al.
6,059,469 A 5/2000 Hirumi
6,106,171 A 8/2000 Nunokawa et al.
6,116,796 A 9/2000 Yamaguchi et al.
6,126,344 A 10/2000 Takayama et al.
6,132,120 A 10/2000 Yamaguchi et al.
6,146,034 A 11/2000 Watanabe et al.
6,149,325 A 11/2000 Nunokawa et al.
6,160,679 A 12/2000 Maekawa et al.
6,167,696 B1 1/2001 Maaseidvaag et al.
6,168,328 B1 1/2001 Ueda et al.
6,190,065 B1 2/2001 Brzuskiewicz
6,190,067 B1 2/2001 Kobayashi et al.
6,190,069 B1 2/2001 Yamaguchi et al.
6,196,740 B1 3/2001 Yamaguchi et al.
6,227,477 B1 * 5/2001 Komatsuzaki ... G11B 23/08714
6,232,993 B1 5/2001 Kobayashi et al.
6,247,860 B1 6/2001 Yanagisawa
6,270,269 B1 8/2001 Watanabe et al.
6,317,156 B1 11/2001 Nagasaki et al.
6,334,724 B2 1/2002 Yamaguchi et al.
6,366,425 B1 4/2002 Kletzl et al.
6,386,774 B1 5/2002 Takayama et al.
6,406,202 B1 6/2002 Unno et al.
6,419,648 B1 7/2002 Vitek et al.
6,429,443 B1 8/2002 Mankos et al.
6,435,744 B1 8/2002 Dunn et al.
6,476,838 B1 11/2002 Italiano
6,485,206 B1 11/2002 Takahashi
6,520,696 B2 2/2003 Huss et al.
6,644,876 B2 11/2003 Carriere et al.
D486,853 S 2/2004 Wilken et al.
6,707,571 B1 3/2004 Kurashina
6,709,179 B2 3/2004 Yamaguchi et al.
6,910,819 B2 6/2005 Carriere et al.
6,929,415 B2 8/2005 Wilken
6,955,318 B2 10/2005 Nonomura
D519,522 S 4/2006 Lee
7,070,347 B2 7/2006 Carriere et al.
7,070,348 B2 7/2006 Sugimoto et al.
7,097,372 B1 8/2006 Heyse et al.
7,121,751 B2 10/2006 Harada et al.
7,128,483 B2 10/2006 Harada et al.
D534,203 S 12/2006 Harada et al.
7,201,522 B2 4/2007 Bandholz et al.
D542,334 S * 5/2007 Harada .......................... D18/12
7,232,268 B2 6/2007 Sugimoto et al.
7,251,044 B1 7/2007 Kurashina
7,287,715 B2 10/2007 Ban
7,296,941 B2 11/2007 Suzuki et al.
7,357,585 B2 4/2008 Kurashina
7,404,684 B2 7/2008 Sugimoto et al.
D579,942 S 11/2008 Terry et al.
7,503,714 B2 3/2009 Yamamoto et al.
7,841,790 B2 11/2010 Yamaguchi et al.
7,942,594 B2 5/2011 Kumazaki et al.
7,965,308 B2 6/2011 Jauert et al.
8,045,288 B2 10/2011 Ota et al.
8,109,684 B2 2/2012 Yamaguchi
8,162,553 B2 4/2012 Vandermeulen
8,164,609 B2 4/2012 Liu et al.
8,382,389 B2 2/2013 Yamaguchi et al.
D681,727 S 5/2013 Van Den Broecke
8,529,142 B2 9/2013 Tanaka
8,540,444 B2 9/2013 Vandermeulen et al.
8,550,393 B2 10/2013 Tada
8,562,228 B2 10/2013 Yamaguchi et al.
8,641,304 B2 2/2014 Yamaguchi et al.
8,734,035 B2 5/2014 Suva et al.
8,740,482 B2 6/2014 Yamaguchi et al.
8,757,907 B2 6/2014 Yamaguchi et al.
8,764,326 B2 7/2014 Yamaguchi et al.
8,770,877 B2 7/2014 Yamaguchi et al.
9,498,998 B2 11/2016 Yamaguchi et al.
9,533,522 B2 1/2017 Yamaguchi et al.
9,566,808 B2 2/2017 Yamaguchi et al.
9,656,495 B2 5/2017 Noda
9,802,432 B2 10/2017 Yamaguchi et al.
9,855,768 B2 1/2018 Tanizaki
9,855,779 B2 1/2018 Yamaguchi et al.
10,226,949 B2 3/2019 Yamaguchi et al.
10,265,982 B2 4/2019 Noda
10,315,442 B2 6/2019 Sato
10,391,732 B2 8/2019 Tanaka
10,414,176 B2 9/2019 Kawai
10,625,527 B2 4/2020 Sato
10,675,894 B2 6/2020 Yamaguchi et al.
2002/0006303 A1 1/2002 Yamaguchi et al.
2002/0012558 A1 1/2002 Huss et al.
2002/0047063 A1 4/2002 Kaneda et al.
2002/0085080 A1 7/2002 Kurashina
2002/0135938 A1 9/2002 Hiraguchi et al.
2003/0081978 A1 5/2003 Carriere et al.
2004/0056143 A1 3/2004 Nonomura
2004/0062586 A1 4/2004 Harada et al.
2004/0233269 A1 11/2004 Tsubota
2004/0265027 A1 12/2004 Hine et al.
2005/0036816 A1 2/2005 Carriere et al.
2005/0117881 A1 6/2005 Baba et al.
2005/0152732 A1 7/2005 Bandholz et al.
2005/0172981 A1 8/2005 Byun
2006/0008608 A1 1/2006 Kurashina
2006/0088802 A1 4/2006 Akaiwa
2006/0121229 A1 6/2006 Nagae
2006/0182921 A1 8/2006 Hioki et al.
2006/0193669 A1 8/2006 Takada et al.
2006/0204304 A1 9/2006 Hioki et al.
2006/0216099 A1 9/2006 Sakano et al.
2006/0216100 A1 9/2006 Minoya et al.
2006/0233582 A1 * 10/2006 Horiuchi ................ B41J 15/044
400/208
2006/0238600 A1 10/2006 Vandermeulen et al.
2006/0239743 A1 10/2006 Naito
2007/0009302 A1 1/2007 Vandermeulen
2007/0009306 A1 1/2007 Harada et al.
2007/0031171 A1 2/2007 Heyse et al.
2007/0041772 A1 2/2007 Harada et al.
2007/0070168 A1 3/2007 Mindler et al.
2007/0098473 A1 5/2007 Heyse et al.
2007/0172293 A1 7/2007 Vandermeulen
2007/0212149 A1 9/2007 Ota et al.
2007/0212151 A1 9/2007 Innocenti et al.
2007/0231041 A1 10/2007 Ueda et al.
2007/0237562 A1 10/2007 Kato et al.
2007/0264070 A1 11/2007 Loo et al.
2007/0283249 A1 12/2007 Nose et al.
2008/0003043 A1 1/2008 Fukui et al.
2008/0029530 A1 2/2008 Yuyama et al.
2008/0050160 A1 2/2008 Yamaguchi et al.
2008/0056793 A1 3/2008 Yokoyama
2008/0080922 A1 4/2008 Vandermeulen
2008/0165009 A1 7/2008 Hirota
2008/0181703 A1 7/2008 Ito et al.
2008/0181708 A1 7/2008 Yamaguchi et al.
2008/0205958 A1 8/2008 Moriyama et al.
2008/0226373 A1 9/2008 Yamaguchi et al.
2008/0232886 A1 9/2008 Kato et al.
2008/0310904 A1 12/2008 Yamaguchi et al.
2009/0016795 A1 1/2009 Caveney et al.
2009/0085451 A1 4/2009 Yuyama et al.
2009/0190988 A1 7/2009 Vereecken et al.
2009/0202283 A1 8/2009 Kumazaki et al.
2009/0231607 A1 9/2009 Kurashina
2009/0285617 A1 11/2009 Vandermeulen

(56) References Cited

U.S. PATENT DOCUMENTS

| | | | |
|---|---|---|---|
| 2010/0119280 | A1 | 5/2010 | Vandermeulen |
| 2010/0119281 | A1 | 5/2010 | Ford et al. |
| 2010/0166475 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0232862 | A1 | 9/2010 | Vandermeulen |
| 2010/0247208 | A1 | 9/2010 | Yamaguchi et al. |
| 2010/0247209 | A1 | 9/2010 | Yamaguchi et al. |
| 2010/0247210 | A1 | 9/2010 | Yamaguchi et al. |
| 2010/0250233 | A1 | 9/2010 | Tanaka |
| 2010/0272492 | A1 | 10/2010 | Van Britsom et al. |
| 2011/0058884 | A1 | 3/2011 | Kato et al. |
| 2012/0008999 | A1 | 1/2012 | Yamaguchi et al. |
| 2012/0009001 | A1 | 1/2012 | Sago et al. |
| 2012/0027485 | A1 | 2/2012 | Suva et al. |
| 2012/0027486 | A1 | 2/2012 | Suva et al. |
| 2012/0027487 | A1 | 2/2012 | Suva et al. |
| 2012/0057917 | A1 | 3/2012 | Van Britsom et al. |
| 2012/0080550 | A1 | 4/2012 | Yamaguchi et al. |
| 2012/0170959 | A1 | 7/2012 | Vandermeulen et al. |
| 2012/0175454 | A1 | 7/2012 | Noda |
| 2012/0188325 | A1 | 7/2012 | Yamaguchi et al. |
| 2012/0189366 | A1 | 7/2012 | Yamaguchi et al. |
| 2012/0201588 | A1 | 8/2012 | Yamaguchi et al. |
| 2014/0205350 | A1 | 7/2014 | Yamaguchi et al. |
| 2014/0218458 | A1 | 8/2014 | Suva et al. |
| 2015/0283837 | A1 | 10/2015 | Sakano |
| 2017/0100948 | A1 | 4/2017 | Yamaguchi et al. |
| 2018/0257400 | A1 | 9/2018 | Yamaguchi |

FOREIGN PATENT DOCUMENTS

| | | | |
|---|---|---|---|
| CA | 2182264 | A1 | 6/1996 |
| CH | 121073 | | 6/1927 |
| CH | 136498 | | 11/1929 |
| CN | 1063641 | A | 8/1992 |
| CN | 1098984 | A | 2/1995 |
| CN | 1119146 | A | 3/1996 |
| CN | 1143928 | A | 2/1997 |
| CN | 1146954 | A | 4/1997 |
| CN | 1148547 | A | 4/1997 |
| CN | 1148548 | A | 4/1997 |
| CN | 1166155 | A | 11/1997 |
| CN | 1209776 | A | 3/1999 |
| CN | 1289293 | A | 3/2001 |
| CN | 1313197 | A | 9/2001 |
| CN | 1313198 | A | 9/2001 |
| CN | 1085151 | C | 5/2002 |
| CN | 1376115 | A | 10/2002 |
| CN | 1385312 | A | 12/2002 |
| CN | 1385313 | A | 12/2002 |
| CN | 1385314 | A | 12/2002 |
| CN | 1397431 | A | 2/2003 |
| CN | 1415482 | A | 5/2003 |
| CN | 1415484 | A | 5/2003 |
| CN | 1415485 | A | 5/2003 |
| CN | 1469811 | A | 1/2004 |
| CN | 1493462 | A | 5/2004 |
| CN | 1636755 | A | 7/2005 |
| CN | 1642746 | A | 7/2005 |
| CN | 1663807 | A | 9/2005 |
| CN | 1744993 | A | 3/2006 |
| CN | 1744994 | A | 3/2006 |
| CN | 1762720 | A | 4/2006 |
| CN | 1785685 | A | 6/2006 |
| CN | 1799850 | A | 7/2006 |
| CN | 1799851 | A | 7/2006 |
| CN | 1820940 | A | 8/2006 |
| CN | 1827386 | A | 9/2006 |
| CN | 1829607 | A | 9/2006 |
| CN | 1835867 | A | 9/2006 |
| CN | 1865012 | A | 11/2006 |
| CN | 1914045 | A | 2/2007 |
| CN | 1990261 | A | 7/2007 |
| CN | 1331684 | C | 8/2007 |
| CN | 101028771 | A | 9/2007 |
| CN | 101035683 | A | 9/2007 |
| CN | 101039807 | A | 9/2007 |
| CN | 101060985 | A | 10/2007 |
| CN | 101077664 | A | 11/2007 |
| CN | 101128324 | A | 2/2008 |
| CN | 201030694 | Y | 3/2008 |
| CN | 101229724 | A | 7/2008 |
| CN | 101264701 | A | 9/2008 |
| CN | 101264702 | A | 9/2008 |
| CN | 101310989 | A | 11/2008 |
| CN | 101327696 | A | 12/2008 |
| CN | 101356061 | A | 1/2009 |
| CN | 101516628 | A | 8/2009 |
| CN | 101758676 | A | 6/2010 |
| CN | 102616025 | A | 8/2012 |
| CN | 202895934 | U | 4/2013 |
| EP | 214466 | A2 | 3/1987 |
| EP | 0329369 | A2 | 8/1989 |
| EP | 0511602 | A1 | 11/1992 |
| EP | 0555954 | B1 | 8/1993 |
| EP | 0593269 | A2 | 4/1994 |
| EP | 0629509 | A2 | 12/1994 |
| EP | 0635375 | A2 | 1/1995 |
| EP | 0644506 | A2 | 3/1995 |
| EP | 0629509 | A3 | 7/1995 |
| EP | 0644506 | A3 | 11/1995 |
| EP | 0684143 | A2 | 11/1995 |
| EP | 0703089 | A1 | 3/1996 |
| EP | 734878 | A2 | 10/1996 |
| EP | 0742103 | A1 | 11/1996 |
| EP | 0760291 | A2 | 3/1997 |
| EP | 734878 | A3 | 5/1997 |
| EP | 0863021 | B1 | 9/1998 |
| EP | 0644506 | B1 | 4/1999 |
| EP | 0936076 | A2 | 8/1999 |
| EP | 0940263 | A2 | 9/1999 |
| EP | 0958931 | A2 | 11/1999 |
| EP | 0684143 | A3 | 1/2000 |
| EP | 0997300 | A2 | 5/2000 |
| EP | 1167049 | A1 | 1/2002 |
| EP | 1170139 | A1 | 1/2002 |
| EP | 1199179 | A | 4/2002 |
| EP | 1284196 | A2 | 2/2003 |
| EP | 1502758 | A1 | 2/2005 |
| EP | 1516739 | A1 | 3/2005 |
| EP | 1552949 | A1 | 7/2005 |
| EP | 1575781 | A1 | 9/2005 |
| EP | 1700705 | A | 9/2006 |
| EP | 1707395 | A1 | 10/2006 |
| EP | 1829696 | A2 | 9/2007 |
| EP | 2059396 | A1 | 5/2009 |
| EP | 2236303 | A1 | 10/2010 |
| EP | 2236304 | A1 | 10/2010 |
| EP | 2448762 | B1 | 9/2013 |
| JP | S56-20944 | U | 2/1981 |
| JP | S58-139415 | U | 9/1983 |
| JP | S58-220783 | A | 12/1983 |
| JP | S59-78879 | A | 5/1984 |
| JP | S60-99692 | A | 6/1985 |
| JP | S61-179776 | A | 8/1986 |
| JP | S62-173944 | U | 11/1987 |
| JP | S63-81063 | U | 5/1988 |
| JP | S63-166557 | A | 7/1988 |
| JP | S63-203348 | A | 8/1988 |
| JP | S63-254085 | A | 10/1988 |
| JP | H01-195088 | A | 8/1989 |
| JP | H01-146945 | U | 10/1989 |
| JP | H02-56664 | U | 4/1990 |
| JP | H02-56665 | U | 4/1990 |
| JP | H02-56666 | U | 4/1990 |
| JP | H02-147272 | A | 6/1990 |
| JP | H03-14865 | A | 1/1991 |
| JP | H03-63155 | A | 3/1991 |
| JP | H03-093584 | A | 4/1991 |
| JP | H03-151261 | A | 6/1991 |
| JP | H03-63155 | B2 | 9/1991 |
| JP | H03-118672 | U | 12/1991 |
| JP | H03-120680 | A | 12/1991 |

(56) References Cited

FOREIGN PATENT DOCUMENTS

| | | | |
|---|---|---|---|
| JP | H11-263055 | U | 12/1991 |
| JP | H04-016113 | U | 2/1992 |
| JP | H04-37575 | A | 2/1992 |
| JP | H04-133756 | A | 5/1992 |
| JP | H04-168086 | A | 6/1992 |
| JP | H05-16342 | U | 3/1993 |
| JP | H05-18853 | U | 3/1993 |
| JP | H05-63067 | A | 3/1993 |
| JP | H05-104840 | A | 4/1993 |
| JP | H05-155067 | A | 6/1993 |
| JP | 5-51662 | U | 7/1993 |
| JP | H05-54225 | U | 7/1993 |
| JP | H05-78565 | U | 10/1993 |
| JP | H05-080765 | U | 11/1993 |
| JP | H05-294051 | A | 11/1993 |
| JP | H05-301435 | A | 11/1993 |
| JP | H06-12053 | U | 2/1994 |
| JP | H06-52560 | A | 2/1994 |
| JP | H06-021953 | U | 3/1994 |
| JP | H06-122239 | A | 5/1994 |
| JP | H06-122249 | A | 5/1994 |
| JP | H06-124406 | A | 5/1994 |
| JP | H06-127094 | A | 5/1994 |
| JP | H06-152907 | A | 5/1994 |
| JP | H06143761 | A | 5/1994 |
| JP | H06-53560 | U | 7/1994 |
| JP | H06-183117 | A | 7/1994 |
| JP | H06-191081 | A | 7/1994 |
| JP | H06-210889 | A | 8/1994 |
| JP | H06-255145 | A | 9/1994 |
| JP | H06-74348 | U | 10/1994 |
| JP | H06-328800 | A | 11/1994 |
| JP | H07-1782 | A | 1/1995 |
| JP | H07-1805 | A | 1/1995 |
| JP | H07-9743 | A | 1/1995 |
| JP | H07-20725 | A | 1/1995 |
| JP | H07-25122 | A | 1/1995 |
| JP | H07-25123 | A | 1/1995 |
| JP | H07-47737 | A | 2/1995 |
| JP | H07-20725 | B2 | 3/1995 |
| JP | H07-61009 | A | 3/1995 |
| JP | H07-068814 | A | 3/1995 |
| JP | H07-68877 | A | 3/1995 |
| JP | H07-069497 | A | 3/1995 |
| JP | H07-89115 | A | 4/1995 |
| JP | H07-89196 | A | 4/1995 |
| JP | H07-101133 | A | 4/1995 |
| JP | H07-108702 | A | 4/1995 |
| JP | H07-108730 | A | 4/1995 |
| JP | H07-137327 | A | 5/1995 |
| JP | H07-164680 | A | 6/1995 |
| JP | H07-40456 | U | 7/1995 |
| JP | H07-214876 | A | 8/1995 |
| JP | H07-237314 | A | 9/1995 |
| JP | H07-251539 | A | 10/1995 |
| JP | H07-276695 | A | 10/1995 |
| JP | H07-290803 | A | 11/1995 |
| JP | H07-314862 | A | 12/1995 |
| JP | H07-314864 | A | 12/1995 |
| JP | H07-314865 | A | 12/1995 |
| JP | H07-314866 | A | 12/1995 |
| JP | H08-25768 | A | 1/1996 |
| JP | H08-39909 | A | 2/1996 |
| JP | H08-058211 | A | 3/1996 |
| JP | H08-90887 | A | 4/1996 |
| JP | H08-118738 | A | 5/1996 |
| JP | H08-165035 | A | 6/1996 |
| JP | H08-216461 | A | 8/1996 |
| JP | H08-252964 | A | 10/1996 |
| JP | H08-267839 | A | 10/1996 |
| JP | H08-290618 | A | 11/1996 |
| JP | H08-290681 | A | 11/1996 |
| JP | H09-039347 | A | 2/1997 |
| JP | 9-76614 | A | 3/1997 |
| JP | H09-85928 | A | 3/1997 |
| JP | 2596263 | B2 | 4/1997 |
| JP | H09-109533 | A | 4/1997 |
| JP | H09-118044 | A | 5/1997 |
| JP | H09-123579 | A | 5/1997 |
| JP | H09-134557 | A | 5/1997 |
| JP | H09-141986 | A | 6/1997 |
| JP | H09-141997 | A | 6/1997 |
| JP | H09-188049 | A | 7/1997 |
| JP | H09-188050 | A | 7/1997 |
| JP | H09-240158 | A | 9/1997 |
| JP | 9-277673 | A | 10/1997 |
| JP | H10-056604 | A | 2/1998 |
| JP | H10-181063 | A | 7/1998 |
| JP | H10-301701 | A | 11/1998 |
| JP | H11-78188 | A | 3/1999 |
| JP | H11-78189 | A | 3/1999 |
| JP | H11-91144 | A | 4/1999 |
| JP | H11-105351 | A | 4/1999 |
| JP | H11-129563 | A | 5/1999 |
| JP | H11-263055 | A | 9/1999 |
| JP | H11-263056 | A | 9/1999 |
| JP | 2000-006481 | A | 1/2000 |
| JP | 2000-006501 | A | 1/2000 |
| JP | 2000-025251 | A | 1/2000 |
| JP | 2000-025316 | A | 1/2000 |
| JP | 2998617 | B2 | 1/2000 |
| JP | 2000-043336 | A | 2/2000 |
| JP | 2000-043337 | A | 2/2000 |
| JP | 2000-076372 | A | 3/2000 |
| JP | 2000-085224 | A | 3/2000 |
| JP | 2000-103129 | A | 4/2000 |
| JP | 2000-103131 | A | 4/2000 |
| JP | 3031439 | B2 | 4/2000 |
| JP | 2000-135843 | A | 5/2000 |
| JP | 2000-198258 | A | 7/2000 |
| JP | 2000-211193 | A | 8/2000 |
| JP | 2000-229750 | A | 8/2000 |
| JP | 2001-011594 | A | 1/2001 |
| JP | 2001-048389 | A | 2/2001 |
| JP | 2001-088359 | A | 4/2001 |
| JP | 2001-121797 | A | 5/2001 |
| JP | 3207860 | B2 | 9/2001 |
| JP | 2001-310540 | A | 11/2001 |
| JP | 2001-319447 | A | 11/2001 |
| JP | 2002-042441 | A | 2/2002 |
| JP | 2002-053248 | A | 2/2002 |
| JP | 3266736 | B2 | 3/2002 |
| JP | 3266739 | B2 | 3/2002 |
| JP | 2002-103762 | A | 4/2002 |
| JP | 2002-104568 | A | 4/2002 |
| JP | 2002-166605 | A | 6/2002 |
| JP | 2002-166606 | A | 6/2002 |
| JP | 2002-167084 | A | 6/2002 |
| JP | 2002-179300 | A | 6/2002 |
| JP | 2002-192769 | A | 7/2002 |
| JP | 2002-308481 | A | 10/2002 |
| JP | 2002-308518 | A | 10/2002 |
| JP | 2002-367333 | A | 12/2002 |
| JP | 3357128 | B2 | 12/2002 |
| JP | 2003-011454 | A | 1/2003 |
| JP | 2003-026164 | A | 1/2003 |
| JP | 2003-048337 | A | 2/2003 |
| JP | 2003-506235 | A | 2/2003 |
| JP | 3378622 | B2 | 2/2003 |
| JP | 2003-072127 | A | 3/2003 |
| JP | 2003-145902 | A | 5/2003 |
| JP | 3426983 | B2 | 7/2003 |
| JP | 2003-251902 | A | 9/2003 |
| JP | 2003-251904 | A | 9/2003 |
| JP | 2003-285522 | A | 10/2003 |
| JP | 2004-018077 | A | 1/2004 |
| JP | 2004-155150 | A | 6/2004 |
| JP | 3543659 | B2 | 7/2004 |
| JP | 2004-255656 | A | 9/2004 |
| JP | 3564848 | B2 | 9/2004 |
| JP | 3567469 | B2 | 9/2004 |
| JP | 2004-291591 | A | 10/2004 |
| JP | 2004-323241 | A | 11/2004 |
| JP | 3106187 | U | 12/2004 |

(56) References Cited

FOREIGN PATENT DOCUMENTS

| | | | |
|---|---|---|---|
| JP | 2005-059504 | A | 3/2005 |
| JP | 2005-088597 | A | 4/2005 |
| JP | 2005-178206 | A | 7/2005 |
| JP | 2005-231203 | A | 9/2005 |
| JP | 2005-280008 | A | 10/2005 |
| JP | 2005-297348 | A | 10/2005 |
| JP | 2005-298031 | A | 10/2005 |
| JP | 2006-021432 | A | 1/2006 |
| JP | 2006-096030 | A | 4/2006 |
| JP | 2006-512224 | A | 4/2006 |
| JP | 2006-142835 | A | 6/2006 |
| JP | 2006-168974 | A | 6/2006 |
| JP | 2006-182034 | A | 7/2006 |
| JP | 2006-224675 | A | 8/2006 |
| JP | 2006-240310 | A | 9/2006 |
| JP | 2006-248059 | A | 9/2006 |
| JP | 2006-264337 | A | 10/2006 |
| JP | 2006-272895 | A | 10/2006 |
| JP | 2006-272977 | A | 10/2006 |
| JP | 2006-289991 | A | 10/2006 |
| JP | 2007-070028 | A | 3/2007 |
| JP | 2007-111863 | A | 5/2007 |
| JP | 2007-196654 | A | 8/2007 |
| JP | 2007-230155 | A | 9/2007 |
| JP | 2007-268815 | A | 10/2007 |
| JP | 2007-296863 | A | 11/2007 |
| JP | 4003068 | B2 | 11/2007 |
| JP | 2007-313681 | A | 12/2007 |
| JP | 2008-044180 | A | 2/2008 |
| JP | 2008-062474 | A | 3/2008 |
| JP | 4061507 | B2 | 3/2008 |
| JP | 2008-080668 | A | 4/2008 |
| JP | 2008-083432 | A | 4/2008 |
| JP | 2008-094103 | A | 4/2008 |
| JP | 2008-509823 | A | 4/2008 |
| JP | 2008-213462 | A | 9/2008 |
| JP | 2008-229855 | A | 10/2008 |
| JP | 2008-254384 | A | 10/2008 |
| JP | 2008-265180 | A | 11/2008 |
| JP | 2008-265278 | A | 11/2008 |
| JP | 2008-279678 | A | 11/2008 |
| JP | 2008-307703 | A | 12/2008 |
| JP | 2009-001020 | A | 1/2009 |
| JP | 2009-028976 | A | 2/2009 |
| JP | 2009-509812 | A | 3/2009 |
| JP | 2009-184832 | A | 8/2009 |
| JP | 2009-214431 | A | 9/2009 |
| JP | 2009-215083 | A | 9/2009 |
| JP | 2010-234697 | A | 10/2010 |
| JP | 4571626 | B2 | 10/2010 |
| JP | 2011-011401 | A | 1/2011 |
| JP | 2011-011407 | A | 1/2011 |
| JP | 2011-110843 | A | 6/2011 |
| JP | 2011-110845 | A | 6/2011 |
| JP | 2011-110848 | A | 6/2011 |
| KR | 2007-0091073 | A | 9/2007 |
| RU | 2297333 | C2 | 4/2007 |
| TW | 200827179 | A | 7/2008 |
| WO | 96/16812 | A1 | 6/1996 |
| WO | 2000/032401 | A1 | 6/2000 |
| WO | 01/10649 | A1 | 2/2001 |
| WO | 2002/32680 | A1 | 4/2002 |
| WO | 03/080350 | A1 | 10/2003 |
| WO | 2004/058509 | A1 | 7/2004 |
| WO | 2005/101306 | A1 | 10/2005 |
| WO | 2005/120844 | A1 | 12/2005 |
| WO | 2006/0013466 | A2 | 2/2006 |
| WO | 2006/024913 | A2 | 3/2006 |
| WO | 2006/033431 | A1 | 3/2006 |
| WO | 2006/033432 | A1 | 3/2006 |
| WO | 2006/090842 | A1 | 8/2006 |
| WO | 2006/024913 | A3 | 10/2006 |
| WO | 2008/029931 | A1 | 3/2008 |
| WO | 2009/107534 | A1 | 9/2009 |
| WO | 2010/113445 | A1 | 10/2010 |
| WO | 2010/113782 | A1 | 10/2010 |

OTHER PUBLICATIONS

Notice of Allowance dated Nov. 22, 2021 received in U.S. Appl. No. 16/782,368.

Notice of Allowance dated Sep. 23, 2021 received in U.S. Appl. No. 16/286,132.

Office Action dated Oct. 21, 2021 received in U.S. Appl. No. 16/924,874.

Supplemental List of Patents or Patent Applications Treated as Related dated Dec. 22, 2021, 4 pages.

Supplemental List of Patents or Patent Applications Treated as Related dated Mar. 10, 2022.

Nov. 25, 2014—(US) Notice of Allowance—U.S. Appl. No. 13/934,512.

Oct. 2, 2014—(US) Non-Final Office Action—U.S. Appl. No. 13/430,033.

Oct. 10, 2014—(US) Notice of Allowance—U.S. Appl. No. 12/732,457.

Oct. 27, 2014—(US) Non-Final Office Action—U.S. Appl. No. 14/141,576.

Oct. 30, 2014 (US) Final Office Action—U.S. Appl. No. 14/226,256.

Sep. 2, 2014—(US) Non-Final Office Action—U.S. Appl. No. 14/226,165.

Sep. 9, 2014—(US) Non-Final Office Action—U.S. Appl. No. 14/226,380.

Sep. 9, 2014—(US) Non-Final Office Action—U.S. Appl. No. 14/226,417.

Sep. 10, 2014—(US) Notice of Allowance—U.S. Appl. No. 13/934,512.

Sep. 11, 2014—(US) Election Requirement—U.S. Appl. No. 13/240,322.

Sep. 11, 2014—(US) Non-Final Office Action—U.S. Appl. No. 13/848,750.

Sep. 12, 2014—(US) Final Office Action—U.S. Appl. No. 13/431,371.

Sep. 12, 2014—(US) Non-Final Office Action—U.S. Appl. No. 14/226,386.

Sep. 22, 2014—(US) Non-Final Office Action—U.S. Appl. No. 14/141,673.

Sep. 24, 2014—(JP) Notification of Rejection—App 2013-142488—Eng Tran.

Sep. 24, 2014—(US) Notice of Allowance—U.S. Appl. No. 13/431,277.

Sep. 25, 2014—(US) Non-Final Office Action—U.S. Appl. No. 14/226,424.

Jan. 17, 2014 (CN) Office Action issued in Chinese Patent Application No. 201210071810.7.

Jan. 22, 2014 (CN) Office Action issued in Chinese Patent Application No. 201010274378.2.

Feb. 5, 2014 (EP) Extended European Search Report issued in European Patent Application No. 09852818.5.

Mar. 10, 2014 (US) Non-Final Office Action issued in U.S. Appl. No. 13/430,080.

Mar. 13, 2014 (CN) Office Action issued in Chinese Application No. 201010150928.X.

Mar. 25, 2014 (US) Non-Final Office Action issued in U.S. Appl. No. 13/431,371.

Mar. 26, 2014 (US) Final Office Action issued in U.S. Appl. No. 12/732,457.

Mar. 27, 2014 (US) Notice of Allowance issued in U.S. Appl. No. 13/240,266.

Apr. 1, 2014 (JP) Office Action issued in Japanese Patent Application No. 2013-035990.

Apr. 2, 2014 (CN) Office Action issued in Chinese Patent Application No. 201210070968.2.

Apr. 10, 2014 (CN) Office Action issued in Chinese Application No. 201010150109.5.

Apr. 11, 2014 (US) Notice of Allowance issued in U.S. Appl. No. 12/644,572.

Apr. 15, 2014 (AU) Office Action issued in Australian Patent Application No. 2009332345.

Apr. 17, 2014 (RU) Office Action issued in Russian Patent Application No. 2011143817.

(56) References Cited

OTHER PUBLICATIONS

Apr. 25, 2014 (MX) Mexican Office Action issued in Mexican Application No. MX/a/2011/013553.
May 6, 2014 (CN) Chinese Office Action issued in Chinese Application No. 201010150087.2.
May 6, 2014 (CN) Chinese Office Action issued in Chinese Application No. 201010150878.5.
May 6, 2014 (US) Notice of Allowance issued in U.S. Appl. No. 13/934,512.
May 7, 2014 (US) Final Office Action issued in U.S. Appl. No. 13/240,216.
May 9, 2014 (VN) Office Action issued in Vietnamese Patent Application No. 1-2011-02491.
May 13, 2014 (CN) Chinese Office Action issued in Chinese Application No. 201080013339.5.
May 21, 2014 (EP) Extended European Search Report issued in European Application No. 10758552.3.
May 22, 2014 (US) Non-Final Office Action issued in U.S. Appl. No. 14/226,256.
Jun. 2, 2014 (AU) Office action issued in Australian Patent Application No. 2010231425.
Jun. 10, 2014 (JP) Japanese Office Action issued Japanese Application No. 2013-142488.
Jun. 20, 2014 (CN) Office action issued in Chinese Patent Application No. 201210070147.9.
Jun. 24, 2014 (JP) Japanese Office Action issued Japanese Application No. 2013-153250.
Jun. 24, 2014 (JP) Japanese Office Action issued Japanese Application No. 2013-153340.
Apr. 1, 2015—(US) Notice of Allowance—U.S. Appl. No. 12/732,457.
Apr. 1, 2015—(US) Notice of Allowance—U.S. Appl. No. 13/430,033.
Apr. 2, 2015 (EP) Office Action in Application No. 10711776.4.
Apr. 7, 2015 (TW) Office Action in U.S. Appl. No. 99/132,600.
Apr. 9, 2015—(TW) Office Action—App 099132598—Eng. Tran.
Office Action dated Jul. 1, 2021 received from the United States Patent Office in related application U.S. Appl. No. 16/782,368.
Mar. 5, 2010 (PCT) International Search Report in International Application No. PCT/JP2009/007088.
Mar. 16, 2010 (PCT) International Search Report and Written Opinion issued in International Application No. PCT/JP2009/071812.
Mar. 16, 2010 (PCT) International Search Report in International Application No. PCT/JP2010/050253.
Mar. 23, 2010 (PCT) International Search Report in International Application No. PCT/JP2009/070971.
Mar. 23, 2010 (PCT) International Search Report in International Application No. PCT/JP2009/071568.
May 20, 2010 (PCT) International Search Report in International Application No. PCT/JP2009/007085.
May 20, 2010 (PCT) International Search Report in International Application No. PCT/JP2009/007086.
May 20, 2010 (PCT) International Search Report in International Application No. PCT/JP2009/007087.
May 21, 2010 (PCT) International Search Report in International Application No. PCT/JP2009/007089.
May 21, 2010 Extended European Search Report in European Patent Application No. 09180351.0.
May 21, 2010 Extended European Search Report in European Patent Application No. 09180354.4.
Jun. 22, 2010 (PCT) International Search Report in International Application No. PCT/JP2010/055305.
Jun. 22, 2010 (PCT) International Search Report in International Application No. PCT/JP2010/055310.
Jun.22, 2010 (PCT) International Search Report in International Application No. PCT/JP2010/055311.
Jun. 22, 2010 (PCT) International Search Report in International Application No. PCT/JP2010/055324.
Jun. 22, 2010 (PCT) International Search Report in International Application No. PCT/JP2010/055326.
Jun. 28, 2010 (PCT) International Search Report in International Application No. PCT/JP2010/002170.
Jul. 2, 2010 Extended European Search Report in European Patent Application No. 10157994.4.
Jul. 12, 2010 Extended European Search Report in European Patent Application No. 10158024.9.
Jul. 30, 2010 (PCT) International Search Report in International Application No. PCT/JP2010/002165.
Jul. 30, 2010 (PCT) International Search Report in International Application No. PCT/JP2010/002169.
Aug. 3, 2010 (PCT) International Search Report in International Application No. PCT/JP2010/002154.
Aug. 3, 2010 (PCT) International Search Report in International Application No. PCT/JP2010/002161.
Aug. 24, 2010 (PCT) International Search Report in International Application No. PCT/JP2010/004076.
Oct. 12, 2010 Extended European Search Report in European Patent Application No. 10155348.5.
Dec. 3, 2010 Extended European Search Report in European Patent Application No. 10175769.8.
Oct. 11, 2011 (JP) Office Action issued in Japanese Patent Application No. 2008-331634.
Oct. 11, 2011 (JP) Office Action issued in Japanese Patent Application No. 2009-088227.
Oct. 11, 2011 (JP) Office Action issued in Japanese Patent Application No. 2009-088238.
Oct. 11, 2011 (JP) Office Action issued in Japanese Patent Application No. 2009-088441.
Oct. 11, 2011 (JP) Office Action issued in Japanese Patent Application No. 2009-088460.
Oct. 11, 2011 (JP) Office Action issued in Japanese Patent Application No. 2009-088440.
Nov. 15, 2011 (JP) Office Action issued in Japanese Patent Application No. 2009-088241.
Nov. 15, 2011 (PCT) International Preliminary Report on Patentability issued in PCT/JP2009/071568.
Nov. 15, 2011 (PCT) International Preliminary Report on Patentability issued in PCT/JP2010/050253.
Nov. 15, 2011 (PCT) International Preliminary Report on Patentability issued in PCT/JP2010/055324.
Nov. 15, 2011 (PCT) International Preliminary Report on Patentability issued in PCT/JP2010/055326.
Jan. 17, 2012 (JP) Office Action issued in Japanese Patent Application No. 2009-088456.
Feb. 14, 2012 (PCT) International Preliminary Report on Patentability in International Application No. PCT/JP2010/055305.
Feb. 14, 2012 (PCT) International Preliminary Report on Patentability in International Application No. PCT/JP2010/055311.
Mar. 7, 2012 (US) Office Action issued in U.S. Appl. No. 12/732,404.
Mar. 8, 2012 (US) Office Action issued in U.S. Appl. No. 12/732,247.
Mar. 9, 2012 (US) Office Action issued in U.S. Appl. No. 12/732,257.
Mar. 26, 2012 (US) Office Action issued in U.S. Appl. No. 12/732,457.
Mar. 27, 2012 (JP) Office Action issued in Japanese Patent Application No. 2008-331638.
Mar. 27, 2012 (JP) Office Action issued in Japanese Patent Application No. 2008-331639.
Mar. 27, 2012 (JP) Office Action issued in Japanese Patent Application No. 2009-156405.
Mar. 27, 2012 (JP) Office Action issued in Japanese Patent Application No. 2009-156406.
Mar. 27, 2012 (JP) Office Action issued in Japanese Patent Application No. 2009-156407.
Mar, 27, 2012 (JP) Office Action issued in Japanese Patent Application No. 2009-270221.
Supplemental List of Patents or Patent Applications Treated as Related dated Sep. 16, 2022.
Notice of Allowance dated Jun. 10, 2022 received in U.S. Appl. No. 16/924,874.
Mar. 30, 2012 (US) Office Action issued in U.S. Appl. No. 12/644,451.
Apr. 11, 2012 (PCT) International Preliminary Report on Patentability issued in PCT/JP2010/055310.
Apr. 11, 2012 (US) Office Action in U.S. Appl. No. 12/644,572.

(56) References Cited

OTHER PUBLICATIONS

May 8, 2012 (JP) Office Action issued in Japanese Patent Application No. 2009-086239.
May 10, 2012 (US) Office Action in U.S. Appl. No. 13/431,371.
May 22, 2012 (JP) Japanese Office Action issued in Japanese Patent Application No. 2010-041323.
Jun. 4, 2012 (US) Office Action in U.S. Appl. No. 13/431,350.
Jun. 6, 2012 (US) Office Action in U.S. Appl. No. 12/732,747.
Jun. 8, 2012 (US) Office Action in U.S. Appl. No. 13/431,277.
Jun. 12, 2012 (JP) Office Action issued in Japanese Patent Application No. 2009-086222.
Jun. 12, 2012 (JP) Office Action issued in Japanese Patent Application No. 2010-084499.
Jun. 12, 2012 (US) Office Action in U.S. Appl. No. 12/732,828.
Jun. 15, 2012 (US) Office Action in U.S. Appl. No. 12/732,404.
Jul. 3, 2012 (JP) Office Action issued in Japanese Patent Application No. 2010-084500.
Jul. 3, 2012 (JP) Office Action issued in Japanese Patent Application No. 2010-084501.
Jul. 3, 2012 (JP) Office Action issued in Japanese Patent Application No. 2010-084502.
Jul. 10, 2012 (PCT) International Preliminary Report on Patentability issued in PCT/JP2009/070971.
Jul. 13, 2012 (US) Office Action in U.S. Appl. No. 12/644,413.
Jul. 20, 2012 (US) Office Action in U.S. Appl. No. 12/817,556.
Jul. 30, 2012 (US) Final Office Action in U.S. Appl. No. 12/732,247.
Aug. 3, 2012 (US) Office Action in U.S. Appl. No. 12/644,373.
Aug. 14, 2012 (PCT) International Preliminary Report on Patentability issued in PCT/JP2009/071812.
Aug. 27, 2012 (US) Office Action in U.S. Appl. No. 12/644,572.
Aug. 28, 2012 (US) Office Action in U.S. Appl. No. 12/644,451.
Aug. 28, 2012 (US) Office Action in U.S. Appl. No. 12/732,257.
Aug. 28, 2012 (US) Office Action in U.S. Appl. No. 12/732,457.
Aug. 30, 2012 (US) Office Action in U.S. Appl. No. 12/732,647.
Sep. 6, 2012 (EP) European Communication issued in European Patent Application No. 10711477.9-1251.
Sep. 11, 2012 (JP) Office Action issued in Japanese Patent Application No. 2009-086172.
Sep. 11, 2012 (JP) Office Action issued in Japanese Patent Application No. 2009-088449.
Sep. 28, 2012 (NZ) Examination Report issued in New Zealand Patent Application No. 596044.
Oct. 16, 2012 (US) Office Action in U.S. Appl. No. 12/873,633.
Oct. 23, 2012 (US) Office Action in U.S. Appl. No. 12/732,404.
Nov. 13, 2012 (JP) Office Action issued in Japanese Patent Application No. 2009-270056.
Nov. 13, 2012 (JP) Office Action issued in Japanese Patent Application No. 2009-297502.
Dec. 18, 2012 (JP) Office Action issued in Japanese Patent Application No. 2009-156369.
Nov. 22, 2013 (EP) Office Action issued in European Patent Application No. 10711776.4.
Nov. 26, 2013 (JP) Office Action issued in Japanese Patent Application No. 2011-507142.
Jan. 17, 2013 (US) Office Action in U.S. Appl. No. 12/732,747.
Jan. 22, 2013 (US) Office Action in U.S. Appl. No. 12/732,247.
Jan. 29, 2013 (JP) Office Action issued in Japanese Patent Application No. 2011-506968.
Jan. 30, 2013 (US) Office Action in U.S. Appl. No. 13/431,277.
Feb. 28, 2013 (US) Office Action in U.S. Appl. No. 12/817,556.
Mar. 1, 2013 (US) Office Action in U.S. Appl. No. 12/732,647.
Mar. 8, 2013 (CN) Office Action issued in Chinese Patent Application No. 200980158165.9.
Apr. 2, 2013 (JP) Office Action issued in Japanese Patent Application No. 2009-156399.
Apr. 2, 2013 (JP) Office Action issued in Japanese Patent Application No. 2009-156404.
Apr. 2, 2013 (JP) Office Action issued in Japanese Patent Application No. 2009-156281.
Apr. 2, 2013 (JP) Office Action issued in Japanese Patent Application No. 2009-156350.
Apr. 2, 2013 (JP) Office Action issued in Japanese Patent Application No. 2009-156355.
Feb. 11, 2016—(US) Notice of Allowance—U.S. Appl. No. 14/226,402.
Feb. 12, 2016—(US) Notice of Allowance—U.S. Appl. No. 13/431,277.
Feb. 16, 2016—(US) Non-Final Office Action—U.S. Appl. No. 14/867,877.
Feb. 24, 2016—(US) Non-Final Office Action—U.S. Appl. No. 14/226,262.
Feb. 25, 2016—(US) Non-Final Office Action—U.S. Appl. No. 14/141,568.
Feb. 22, 2016—(US) Non-Final Office Action—U.S. Appl. No. 14/226,386.
Feb. 23, 2016—(US) Final Office Action—U.S. Appl. No. 14/226,424.
Mar. 4, 2016—(US) Notice of Allowance—U.S. Appl. No. 14/643,865.
Mar. 29, 2016—(US) Notice of Allowance—U.S. Appl. No. 14/641,681.
Apr. 6, 2016—(US) Notice of Allowance—U.S. Appl. No. 12/732,457.
Apr. 19, 2016—(US) Notice of Allowance—U.S. Appl. No. 14/226,417.
Apr. 21, 2016—(US) Notice of Allowance—U.S. Appl. No. 14/226,428.
May 25, 2016—(US) Notice of Allowance—U.S. Appl. No. 14/755,141.
Jun. 24, 2016—(US) Notice of Allowance—U.S. Appl. No. 14/226,256.
Aug. 16, 2016—(US) Notice of Allowance—U.S. Appl. No. 13/240,322.
Sep. 22, 2016—(KR) Notice of Final Rejection—App 10-2011-7021961, Eng Tran.
Jul. 4, 2017—(CN) Office Action—App 201510714069.5 with English Translation.
Nov. 6, 2017—(CN) Office Action—App 201610344359.X with English Translation.
Oct. 3, 2016—(US) Office Action—U.S. Appl. No. 15/250,310.
May 18, 2017—(US) Office Action—U.S. Appl. No. 15/250,310.
Dec. 1, 2017—(US) Notice of Allowance—U.S. Appl. No. 15/250,310.
Sep. 25, 2017—(US) Notice of Allowance—U.S. Appl. No. 15/250,310.
List of Patents or Patent Applications Treated as Related dated Jun. 4, 2021, 4 pages.
United States Official Action dated Jan. 8, 2018 received in related U.S. Appl. No. 15/226,188.
Nov. 27, 2017—(US) Notice of Allowance—U.S. Appl. No. 15/276,474.
Mar. 23, 2015 (US) Notice of Allowance in U.S. Appl. No. 13/934,512.
May 1, 2015—(US) Notice of Allowance—U.S. Appl. No. 12/644,572.
May 6, 2015—(US) Final Office Action—U.S. Appl. No. 14/226,259.
May 6, 2015—(US) Final Office Action—U.S. Appl. No. 14/226,373.
May 19, 2015—(US) Notice of Allowance—U.S. Appl. No. 14/226,201.
May 19, 2015—(US) Final Office Action—U.S. Appl. No. 14/226,289.
May 20, 2015—(US) Notice of Allowance—U.S. Appl. No. 13/848,750.
May 22, 2015—(US) Non-Final Office Action—U.S. Appl. No. 12/732,257.
May 26, 2015—(CN) Office Action—App 201310659625.4.
May 29, 2015—(MY) Substantive Examination Adverse Report—App. PI 2013702520—Eng Tran.
May 29, 2015—(US) Notice of Allowance—U.S. Appl. No. 14/226,165.
Sep. 1, 2015—(US) Notice of Allowance—U.S. Appl. No. 14/226,259.
Sep. 8, 2015—(JP) Office Action—App 2014-210427—Eng Tran.
Sep. 8, 2015—(US) Notice of Allowance—U.S. Appl. No. 14/141,673.
Sep. 9, 2015—(US) Final Office Action—U.S. Appl. No. 14/226,386.
Sep. 17, 2015—(US) Non-Final Office Action—U.S. Appl. No. 14/226,424.
Sep. 18, 2015—(US) Non-Final Office Action—U.S. Appl. No. 14/226,428.
Oct. 1, 2015—(US) Notice of Allowance—U.S. Appl. No. 12/732,457.
Oct. 5, 2015—(US) Notice of Allowance—U.S. Appl. No. 12/644,572.
Oct. 5, 2015—(US) Notice of Allowance—U.S. Appl. No. 14/141,673.
Oct. 7, 2015—(US)—Final Office Action—U.S. Appl. No. 13/240,322.
Oct. 13, 2015—(US) Notice of Allowance—U.S. Appl. No. 13/430,033.
Oct. 20, 2015—(US) Notice of Allowance—U.S. Appl. No. 14/226,201.
Oct. 22, 2015—(US) Final Office Action—U.S. Appl. No. 14/641,681.
Sep. 2, 2015—(CN) Notification of First Office Action—App 201410200475.5.
Oct. 23, 2015—(US) Final Office Action—U.S. Appl. No. 13/431,350.
Oct. 26, 2015—(US)—Non-Final Office Action—U.S. Appl. No. 14/643,865.

(56) References Cited

OTHER PUBLICATIONS

Oct. 30, 2015—(US)—Non-Final Office Action—U.S. Appl. No. 14/226,373.
Nov. 3, 2015—(US) Notice of Allowance—U.S. Appl. No. 14/226,259.
Nov. 9, 2015—(US) Notice of Allowance—U.S. Appl. No. 13/848,750.
Nov. 13, 2015—(US) Non-Final Office Action—U.S. Appl. No. 14/226,289.
Nov. 25, 2015—(US) Final Office Action—U.S. Appl. No. 14/226,256.
Nov. 27, 2015—(US) Notice of Allowance—U.S. Appl. No. 14/226,367.
Dec. 4, 2015—(US) Notice of Allowance—U.S. Appl. No. 14/226,325.
Dec. 10, 2015—(US) Non-Final Office Action—U.S. Appl. No. 14/755,141.
Nov. 20, 2015—(KR) Office Action—App 10-2015-7006347.
Nov. 20, 2015—(KR) Office Action—App 10-2011-7017238.
Dec. 11, 2015—(US) Notice of Allowance—U.S. Appl. No. 14/226,165.
Dec. 17, 2015—(US) Non-Final Office Action—U.S. Appl. No. 14/920,398.
Dec. 21, 2015—(US) Notice of Allowance—U.S. Appl. No. 13/934,512.
Dec. 23, 2015—(US) Final Office Action—U.S. Appl. No. 14/226,417.
Oct. 27, 2015—(CN) Office Action—App 201410195767.4.
Dec. 24, 2015—(US) Non-Final Office Action—U.S. Appl. No. 14/226,380.
Nov. 27, 2015—(CN) Office Action—App 201410311930.9.
Dec. 3, 2015—(CN) Office Action—App 201510088644.5.
Jan. 12, 2016—(US) Notice of Allowance—U.S. Appl. No. 13/431,371.
Jan. 15, 2016—(US) Notice of Allowance—U.S. Appl. No. 12/732,257.
Jan. 29, 2016—(US) Notice of Allowance—U.S. Appl. No. 14/226,411.
Dec. 24, 2015—(TW) Decision of Rejection—App 101110368—Eng Tran.
Feb. 5, 2016—(US) Non-Final Office Action—U.S. Appl. No. 13/240,322.
Sep. 17, 2013 (US) Office Action in U.S. Appl. No. 12/732,647.
Sep. 22, 2013 (CN) Office Action issued in Chinese Patent Application No. 201010150109.5.
Sep. 25, 2013 (NZ) Office Action issued in New Zealand Patent Application No. 596044.
Sep. 26. 2013 (CN) Office Action issued in Chinese Patent Application No. 201010150090.4.
Sep. 30, 2013 (CN) Office Action issued in Chinese Patent Application No. 201010150088.7.
Oct. 1, 2013 (JP) Office Action issued in Japanese Patent Application No. 2011547222.
Oct. 16, 2013 (US) Non-Final Office Action issued in corresponding U.S. Appl. No. 13/240,266.
Oct. 28, 2013 (CN) Office Action issued in Chinese Patent Application No. 200980158165.9.
Nov. 1, 2013 (CN) Office Action Issued in Chinese Patent Application No. 200980161405.0.
Nov. 6, 2013 (EP) European Search Report issued in European Patent Application No. 09842716.4.
Nov. 8, 2013 (NZ) Office Action issued in New Zealand Patent Application No. 596044.
Nov. 12, 2013 (EP) European Search Report issued in European Patent Application No. 10758310.6.
Nov. 13, 2013 (US) Office Action issued in corresponding U.S. Appl. No. 13/240,216.
Nov. 19, 2013 (US) Office Action issued in corresponding U.S. Appl. No. 13/934,512.
Dec. 3, 2013 (JP) Office Action issued in Japanese Patent Application No. 2011-507049.
Dec. 16, 2013 (EP) Extended European Search Report in European Patent Application No. 12160324.5.
Dec. 18, 2013 (EP) Extended European Search Report in European Patent Application No. 12160192.6.
Dec. 19, 2013 (CN) Office Action issued in Chinese Patent Application No. 200910262674.8.
Dec. 20, 2013 (EP) Extended European Search Report issued in European Patent Application No. 12161271.7.
Dec. 23, 2013 (US) Final Office Action issued in U.S. Appl. No. 13/431,350.
Dec. 30, 2013 (CN) Office Action issued in Chinese Application No. 201010209208.6.
Dec. 30, 2013 (CN) Office Action issued in Chinese Patent Application No. 201210070147.9.
Aug. 12, 2014—(CN) Notice of Second Office Action—App 201210071810.7—Eng Tran.
Aug. 26, 2014—(CN) Notice of Second Office Action—App 201010274378.2—Eng Tran.
Aug. 28, 2014—(US) Non-Final Office Action—U.S. Appl. No. 13/240,216.
Dec. 1, 2014—(US) Non-Final Office Action—U.S. Appl. No. 14/226,289.
Dec. 5, 2014—(US) Non-Final Office Action—U.S. Appl. No. 14/226,325.
Dec. 16, 2014—(US) Non-Final Office Action—U.S. Appl. No. 14/226,259.
Dec. 15, 2014—(US) Notice of Allowance—U.S. Appl. No. 13/240,216.
Dec. 26, 2014—(CN) Office Action in Application No. 201080013339.5.
Feb. 4, 2014 (US) Notice of Allowance issued in U.S. Appl. No. 12/732,404.
Feb. 19, 2014 (US) Notice of Allowance issued in U.S. Appl. No. 12/732,747.
Feb. 24, 2014 (US) Notice of Allowance issued in U.S. Appl. No. 12/644,451.
Jan. 3, 2014 (AU) Office Action issued in Australian Patent Application No. 2010231426.
Jan. 27, 2014 (US) Notice of Allowance issued in U.S. Appl. No. 12/732,828.
Jul. 7, 2014 (US) Final Office Action issued in U.S. Appl. No. 13/430,080.
Jul. 8, 2014 (CA) Office Action issued in Canadian Patent Application No. 2,755,882.
Jul. 8, 2014 (JP) Office Action issued in Japanese Patent Application No. 2013-153421.
Jul. 8, 2014 (JP) Office Action issued in Japanese Patent Application No. 2013-153495.
Jul. 16, 2014 (US)—Restriction requirement in U.S. Appl. No. 13/848,750.
Jul. 18, 2014 (US) Office Action in U.S. Appl. No. 13/431,350.
Jul. 22, 2014 (US) Office Action in U.S. Appl. No. 12/732,257.
Jul. 25, 2014—(CN) Notice of Second Office Action—App 201010150090.4—Eng Tran.
Jul. 28, 2014—(CN) Notice of Second Office Action—App 201010150088.7—Eng Tran.
Jun. 26, 2014—(CN) Office Action—App 200980161405.0.
Jun. 27, 2014 (AU) Office Action issued in Australian Patent Application No. 2010231426.
Nov. 4, 2014—(US) Non-Final Office Action—U.S. Appl. No. 14/226,367.
Nov. 4, 2014—(US) Non-Final Office Action—U.S. Appl. No. 14/226,428.
Nov. 5, 2014—(US) Non-Final Office Action—U.S. Appl. No. 14/226,373.
Nov. 12, 2014 (MX) Office Action in Application No. MX/a/2011/013553.
US Official Action dated Oct. 30, 2018 from related U.S. Appl. No. 15/832,531.
Photographs of a Brother Kogyo Kabushiki Kaisha TX series cassette sold in the United States at least around Jan. 6, 1993.
Photographs of a Brother Kogyo Kabushiki Kaisha TC series cassette sold in the United States at least around Dec. 28, 1988.
United States Official Action dated Apr. 20, 2018 received in related U.S. Appl. No. 14/742,077.
United States Official Action dated Apr. 27, 2018 received in related U.S. Appl. No. 15/832,531.
United States Official Action dated Apr. 12, 2019 received in related U.S. Appl. No. 15/715,329.
United States Official Action dated Jan. 17, 2019 received in related U.S. Appl. No. 15/226,188.
United States Official Action dated May 3, 2018 received in related U.S. Appl. No. 15/226,188.

(56) References Cited

OTHER PUBLICATIONS

United States Notice of Allowance dated Nov. 30, 2018 received in related U.S. Appl. No. 15/357,004.
United States Notice of Allowance dated Oct. 1, 2018 received in related U.S. Appl. No. 15/389,497.
United States Official Action dated May 9, 2019 received in related U.S. Appl. No. 15/717,148.
United States Official Action dated Sep. 27, 2018 received in related U.S. Appl. No. 15/717,148.
United States Notice of Allowance dated Jun. 5, 2019 received in related U.S. Appl. No. 15/832,531.
United States Notice of Allowance dated Mar. 5, 2019 received in related U.S. Appl. No. 15/832,531.
United States Notice of Allowance dated Sep. 27, 2018 received in related U.S. Appl. No. 15/866,000.
United States Notice of Allowance dated Jul. 6, 2018 received in related U.S. Appl. No. 15/866,000.
United States Notice of Allowance dated Jun. 5, 2019 received in related U.S. Appl. No. 15/981,465.
Office Action dated May 20, 2019 received in U.S. Appl. No. 15/226,188.
Chinese Office Action dated Jun. 3, 2019 in Chinese Patent Application No. 201711461753.2.
Extended European Search Report dated Aug. 29, 2019 received in related EP 19173286.6.
Notice of Allowance dated Nov. 5, 2019 received from the United States Patent Office in related application U.S. Appl. No. 16/160,343.
Notification of Reasons for Rejection dated Oct. 29, 2019 received from the Japanese Patent Office in application JP 2018-246396 together with an English language translation.
Notice of Allowance dated Apr. 8, 2020 received in related U.S. Appl. No. 16/796,463.
Office Action dated Oct. 24, 2019 received from the United States Patent Office in related application U.S. Appl. No. 15/715,329.
Office Action dated Apr. 4, 2019 received in related application U.S. Appl. No. 16/256,604.
Notice of Allowance dated Jun. 5, 2019 received in related application U.S. Appl. No. 15/832,531.
Office Action dated Jun. 5, 2019 received in related application U.S. Appl. No. 15/981,465.
Office Action dated Jul. 1, 2020 received in related U.S. Appl. No. 15/715,329.
Office Action dated Jul. 29, 2020 received in related U.S. Appl. No. 16/286,132.
Office Action dated Oct. 6, 2020 received in related application U.S. Appl. No. 16/866,950.
Official Action dated Oct. 12, 2020 received in related German Patent Application No. DE 10 2010 012 892.9 together with an English language translation.
Office Action dated Jan. 7, 2021 from related application U.S. Appl. No. 16/293,984.
Notice of Allowance dated Mar. 4, 2021 received in related application U.S. Appl. No. 16/866,950.
Office Action dated Nov. 24, 2020 received in related application U.S. Appl. No. 16/782,368.
Office Action dated Dec. 14, 2020 received in related application U.S. Appl. No. 15/715,329.
Office Action dated Mar. 30, 2021 received in related application U.S. Appl. No. 16/286,132.
Office Action dated Apr. 22, 2021 received in related application U.S. Appl. No. 15/715,329.
Office Action dated Oct. 26, 2022 received in related U.S. Appl. No. 17/538,254.
Explanation of Proofs submitted in Nullification Appeal for JP Patent 5233800 dated Feb. 17, 2022 together with English language translation.
Office Action dated Sep. 22, 2023 received in related U.S. Appl. No. 17/538,254.
Notice of Reasons for Refusal dated Aug. 30, 2022 received in Japanese Patent Application No. JP 2021-156029.
Apr. 9, 2015—(US) Non-Final Office Action—U.S. Appl. No. 14/641,681.
Apr. 9, 2015—(US) Notice of Allowance—U.S. Appl. No. 13/431,277.
Apr. 10, 2010—(US) Non-Final Office Action—U.S. Appl. No. 13/430,080.
Apr. 13, 2015—(CN) Notification ofThird Office Action—App 201210071810.7—Eng. Tran.
Apr. 14, 2015—(US) Notice of Allowance—U.S. Appl. No. 13/240,266.
Apr. 17, 2015—(US) Final Office Action—U.S. Appl. No. 14/226,367.
Apr. 20, 2015—(AU) Office Action in Application No. 2010231426.
Apr. 21, 2015—(US) Final Office Action—U.S. Appl. No. 14/226,428.
Aug. 4, 2015—(US) Notice of Allowance—U.S. Appl. No. 14/141,576.
Aug. 6, 2015—(CN) Office Action—App 201410046812.X—Eng Tran.
Aug. 11, 2015—(AU) Patent Examination Report—App 2014221250.
Aug. 13, 2015—(US) Final Office Action—U.S. Appl. No. 13/431,371.
Aug. 24, 2015—(US) Final Office Action—U.S. Appl. No. 14/226,402.
Feb. 6, 2015—(EP) Extended Search Report—App. 14189221.6.
Feb. 10, 2015—(US) Notice of Allowance—U.S. Appl. No. 14/226,380.
Feb. 12, 2015—(US) Final Office Action—U.S. Appl. No. 12/732,257.
Feb. 12, 2015—(US) Final Office Action—U.S. Appl. No. 13/431,350.
Feb. 12, 2015—(US) Final Office Action—U.S. Appl. No. 14/226,417.
Feb. 13, 2015—(US) Non-Final Office Action—U.S. Appl. No. 13/240,322.
Feb. 17, 2015—(US) Final Office Action—U.S. Appl. No. 14/141,673.
Feb. 19, 2015—(CA) Office Action in Application No. 2755885.
Jan. 2, 2015—(US) Non-Final Office Action—U.S. Appl. No. 14/226,262.
Jan. 5, 2015—(US) Non-final Office Action—U.S. Appl. No. 14/226,201.
Jan. 16, 2015—(US) Non-Final Office Action—U.S. Appl. No. 14/226,402.
Jan. 20, 2015—(US) Non-Final Office Action—U.S. Appl. No. 13/431,371.
Jan. 22, 2015—(US) Non-Final Office Action—U.S. Appl. No. 14/226,411.
Jan. 22, 2015—(US) Notice of Allowance—U.S. Appl. No. 12/732,457.
Jan. 23, 2015—(AU) Office Action in Application No. 2010231426.
Jan. 28, 2015—(US) Notice of Allowance—U.S. Appl. No. 13/431,277.
Jan. 29, 2015—(TW) Office Action—App 099132599.
Jul. 7, 2015—(US) Notice of Allowance—U.S. Appl. No. 14/141,673.
Jul. 16, 2015—(US) Non-Final Office Action—U.S. Appl. No. 14/226,417.
Jul. 31, 2015—(US) Final Office Action—U.S. Appl. No. 14/226,411.
Jun. 1, 2015—(CN) Notification of First Office Action—App 201310717842.4—Eng Tran.
Jun. 1, 2015—(CN) Notification of First Office Action—App 201310717871.0—Eng Tran.
Jun. 2, 2015—(US) Final Office Action—U.S. Appl. No. 14/226,262.
Jun. 2, 2015—(US) Non-Final Office Action—U.S. Appl. No. 14/226,256.
Jun. 5, 2015—(US) Notice of Allowance—U.S. Appl. No. 14/226,380.
Jun. 17, 2015—(US) Final Office Action—U.S. Appl. No. 14/226,325.
Jun. 19, 2015—(CN) Notification of First Office Action—App 201310659875.8—Eng Tran.
Jun. 25, 2015—(US) Non-Final Office Action—U.S. Appl. No. 13/431,350.
Mar. 2, 2015—(TW) Office Action in Application No. 101110368.
Mar. 4, 2015—(US) Final Office Action—U.S. Appl. No. 14/141,576.
Mar. 4, 2015—(US) Non-Final Office Action—U.S. Appl. No. 14/226,386.
Mar. 6, 2015—(AU) Office Action in Application No. 2010231425.
Mar. 6, 2015—(US) Final Office Action—U.S. Appl. No. 14/226,424.
Mar. 10, 2015—(JP) Office Action in Application No. 2014-095027.
Mar. 12, 2015—(EP) Search Report in Application No. 14156840.2.
Mar. 13, 2015—(US) Notice of Allowance in U.S. Appl. No. 14/226,165.
Mar. 17, 2015—(US) Notice of Allowance—U.S. Appl. No. 13/848,750.
Apr. 2, 2013 (JP) Office Action issued in Japanese Patent Application No. 2009-156357.
Apr. 2, 2013 (JP) Office Action issued in Japanese Patent Application No. 2009-156371.

(56) References Cited

OTHER PUBLICATIONS

Apr. 2, 2013 (JP) Office Action issued in Japanese Patent Application No. 2009-156398.
Apr. 2, 2013 (JP) Office Action issued in Japanese Patent Application No. 2009-156403.
Apr. 2, 2013 (JP) Office Action issued in Japanese Patent Application No. 2009-270325.
Apr. 8, 2013 (EP) European Search Report issued in European Patent Application No. 09852278.2.
Apr. 15, 2013 (CN) Office Action issued in Chinese Patent Application No. 201080013099.9.
Apr. 19, 2013 (CN) Office Action issued in Chinese Patent Application No. 200910262678.6.
Apr. 23, 2013 (JP) Office Action issued in Japanese Patent Application No. 2010-73748.
Apr. 23, 2013 (JP) Office Action issued in Japanese Patent Application No. 2010-73750.
Apr. 23, 2013 (US) Office Action in U.S. Appl. No. 13/430,080.
Apr. 26, 2013 (CN)Office Action issued in Chinese Patent Application No. 200910262676.7.
Apr. 26, 2013 (US) Office Action in U.S. Appl. No. 13/755,174.
May 2, 2013 (CN) Office Action issued in Chinese Patent Application No. 200910262677.1.
May 2, 2013 (CN) Office Action issued in Chinese Patent Application No. 200910262679.0.
May 2, 2013 (CN) Office Action issued in Chinese Patent Application No. 200910262680.3.
May 7, 2013 (US) Office Action in U.S. Appl. No. 12/732,404.
May 14, 2013 (JP) Office Action issued in Japanese Patent Application No. 2010-073747.
May 14, 2013 (US) Office Action in U.S. Appl. No. 13/431,350.
May 14, 2013 (US) Office Action in U.S. Appl. No. 13/431,371.
May 21, 2013 (JP) Office Action issued in Japanese Patent Application No. 2009-154698.
May 21, 2013 (JP) Office Action issued in Japanese Patent Application No. 2009-154699.
May 21, 2013 (JP) Office Action issued in Japanese Patent Application No. 2010-073749.
May 21, 2013 (JP) Office Action issued in Japanese Patent Application No. 2010-073755.
May 21, 2013 (US) Office Action in U.S. Appl. No. 12/732,257.
May 21, 2013 (US) Office Action in U.S. Appl. No. 12/732,828.
May 22, 2013 (US) Office Action in U.S. Appl. No. 12/644,413.
May 22, 2013 (US) Office Action in U.S. Appl. No. 12/873,633.
May 28, 2013 (JP) Office Action issued in Japanese Patent Application No. 2010-073751.
May 30, 2013 (US) Office Action in U.S. Appl. No. 12/732,247.
Jun. 4, 2013 (CN) Office Action issued in Chinese Patent Application No. 200980161443.6.
Jun. 4, 2013 (JP) Office Action issued in Japanese Patent Application No. 2010-073754.
Jun. 19, 2013 (US) Office Action in U.S. Appl. No. 12/644,373.
Jun. 2, 2013 (JP) Office Action issued in Japanese Patent Application No. 2009-156281.
Jun. 2, 2013 (JP) Office Action issued in Japanese Patent Application No. 2009-156350.
Jul. 10, 2013 (NZ) Office Action issued in New Zealand Patent Application No. 596044.
Jul. 16, 2013 (US) Office Action issued in U.S. Appl. No. 12/817,556.
Aug. 1, 2013 (US) Office Action in U.S. Appl. No. 12/732,747.
Aug. 7, 2013 (CN) Office Action issued in Chinese Patent Application No. 200910262675.2.
Aug. 9, 2013 (US) Office Action in U.S. Appl. No. 13/431,350.
Aug. 22, 2013 (CN) Office Action issued in Chinese Patent Application No. 201080013339.5.
Aug. 27, 2013 (US) Office Action in U.S. Appl. No. 12/644,451.
Aug. 27, 2013 (US) Office Action in U.S. Appl. No. 12/644,572.
Sep. 3, 2013 (CN) Office Action issued in Chinese Patent Application No. 201010150928.X.
Sep. 3, 2013 (JP) Office Action issued in Japanese Patent Application No. 2011-507143.
Sep. 9, 2013 (US) Office Action issued in U.S. Appl. No. 12/732,404.
Sep. 11, 2013 (US) Office Action in U.S. Appl. No. 13/430,080.
Sep. 12, 2013 (US) Office Action in U.S. Appl. No. 12/732,457.
Sep. 12, 2013 (US) Office Action in U.S. Appl. No. 12/732,828.

* cited by examiner

FIG. 20

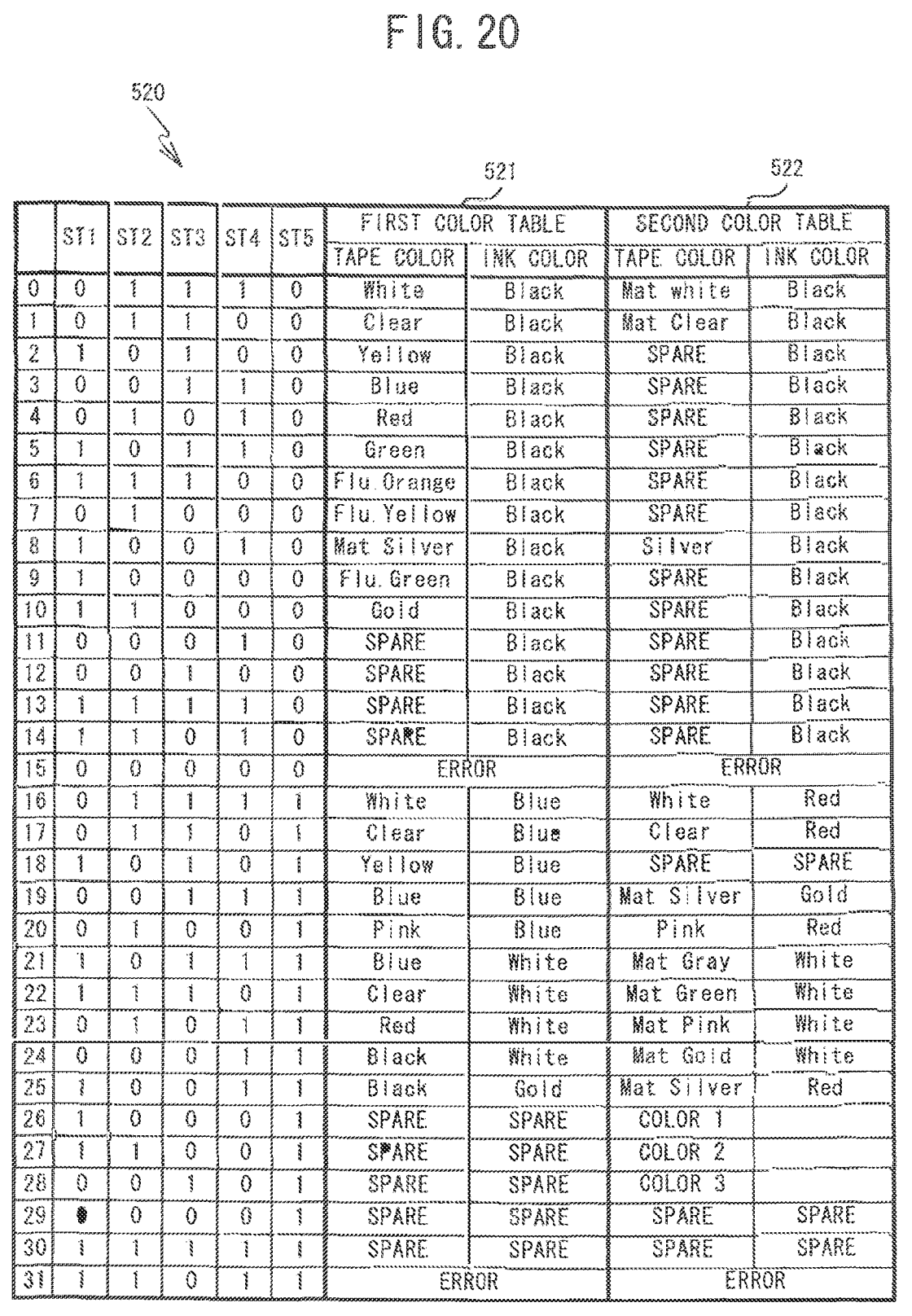

520

521 522

| | ST1 | ST2 | ST3 | ST4 | ST5 | FIRST COLOR TABLE | | SECOND COLOR TABLE | |
|---|---|---|---|---|---|---|---|---|---|
| | | | | | | TAPE COLOR | INK COLOR | TAPE COLOR | INK COLOR |
| 0 | 0 | 1 | 1 | 1 | 0 | White | Black | Mat white | Black |
| 1 | 0 | 1 | 1 | 0 | 0 | Clear | Black | Mat Clear | Black |
| 2 | 1 | 0 | 1 | 0 | 0 | Yellow | Black | SPARE | Black |
| 3 | 0 | 0 | 1 | 1 | 0 | Blue | Black | SPARE | Black |
| 4 | 0 | 1 | 0 | 1 | 0 | Red | Black | SPARE | Black |
| 5 | 1 | 0 | 1 | 1 | 0 | Green | Black | SPARE | Black |
| 6 | 1 | 1 | 1 | 0 | 0 | Flu.Orange | Black | SPARE | Black |
| 7 | 0 | 1 | 0 | 0 | 0 | Flu.Yellow | Black | SPARE | Black |
| 8 | 1 | 0 | 0 | 1 | 0 | Mat Silver | Black | Silver | Black |
| 9 | 1 | 0 | 0 | 0 | 0 | Flu.Green | Black | SPARE | Black |
| 10 | 1 | 1 | 0 | 0 | 0 | Gold | Black | SPARE | Black |
| 11 | 0 | 0 | 0 | 1 | 0 | SPARE | Black | SPARE | Black |
| 12 | 0 | 0 | 1 | 0 | 0 | SPARE | Black | SPARE | Black |
| 13 | 1 | 1 | 1 | 1 | 0 | SPARE | Black | SPARE | Black |
| 14 | 1 | 1 | 0 | 1 | 0 | SPARE | Black | SPARE | Black |
| 15 | 0 | 0 | 0 | 0 | 0 | ERROR | | ERROR | |
| 16 | 0 | 1 | 1 | 1 | 1 | White | Blue | White | Red |
| 17 | 0 | 1 | 1 | 0 | 1 | Clear | Blue | Clear | Red |
| 18 | 1 | 0 | 1 | 0 | 1 | Yellow | Blue | SPARE | SPARE |
| 19 | 0 | 0 | 1 | 1 | 1 | Blue | Blue | Mat Silver | Gold |
| 20 | 0 | 1 | 0 | 0 | 1 | Pink | Blue | Pink | Red |
| 21 | 1 | 0 | 1 | 1 | 1 | Blue | White | Mat Gray | White |
| 22 | 1 | 1 | 1 | 0 | 1 | Clear | White | Mat Green | White |
| 23 | 0 | 1 | 0 | 1 | 1 | Red | White | Mat Pink | White |
| 24 | 0 | 0 | 0 | 1 | 1 | Black | White | Mat Gold | White |
| 25 | 1 | 0 | 0 | 1 | 1 | Black | Gold | Mat Silver | Red |
| 26 | 1 | 0 | 0 | 0 | 1 | SPARE | SPARE | COLOR 1 | |
| 27 | 1 | 1 | 0 | 0 | 1 | SPARE | SPARE | COLOR 2 | |
| 28 | 0 | 0 | 1 | 0 | 1 | SPARE | SPARE | COLOR 3 | |
| 29 | [illegible] | 0 | 0 | 0 | 1 | SPARE | SPARE | SPARE | SPARE |
| 30 | 1 | 1 | 1 | 1 | 1 | SPARE | SPARE | SPARE | SPARE |
| 31 | 1 | 1 | 0 | 1 | 1 | ERROR | | ERROR | |

TAPE CASSETTE

CROSS-REFERENCE TO RELATED APPLICATION

This application claims priority to and is a continuation patent application of U.S. patent application Ser. No. 17/339,374 filed on Jun. 4, 2021, which is a continuation of U.S. patent application Ser. No. 16/866,950, filed May 5, 2020, now U.S. Pat. No. 11,052,685 issued Jul. 6, 2021, which is a continuation of U.S. patent application Ser. No. 16/256,604, filed Jan. 24, 2019, now U.S. Pat. No. 10,675,894 issued Jun. 9, 2020, which is a continuation of U.S. patent application Ser. No. 15/866,000, filed Jan. 9, 2018, now U.S. Pat. No. 10,226,949 issued Mar. 12, 2019, which is a continuation of U.S. patent application Ser. No. 15/250,310, filed Aug. 29, 2016, now U.S. Pat. No. 10,201,988 issued Feb. 12, 2019, which is a continuation of U.S. patent application Ser. No. 14/641,681, filed Mar. 9, 2015, now U.S. Pat. No. 9,498,988 issued on Nov. 22, 2016, which is a continuation of U.S. patent application Ser. No. 12/732,457 filed on Mar. 26, 2010, now U.S. Pat. No. 9,427,988 issued on Aug. 30, 2016, which claims priority to Japanese Patent Application Nos. 2009-088440, 2009-088441, 2009-088456, 2009-088460, and 2009-088468, respectively filed on Mar. 31, 2009, and Japanese Patent Application Nos. 2009-156355, 2009-156357, 2009-156369, and 2009-156371, respectively filed on Jun. 30, 2009. The disclosure of the foregoing applications is herein incorporated by reference in its entirety.

BACKGROUND

The present invention relates to a tape cassette that is detachably installed in a tape printer.

A tape cassette has been known that, when installed in a housing portion of a tape printer, selectively presses a plurality of detecting switches provided on the cassette housing portion to cause the tape printer to detect color information of the tape cassette (a tape color, a character color, etc.). More specifically, a cassette detection portion is provided on a section of the bottom surface of the tape cassette, where through-holes are formed in a pattern corresponding to the color information. When the tape cassette is installed in the cassette housing portion, the plurality of detecting switches, which are constantly urged in an upward direction, are selectively pressed in accordance with the pattern of the through-holes formed in the cassette detection portion. The tape printer detects the color information of the tape cassette installed in the cassette housing portion based on a combination of the pressed and non-pressed switches among the plurality of detecting switches.

SUMMARY

The pattern of through-holes formed in the cassette detection portion is basically only designed to allow the tape printer to detect the color information. Accordingly, different patterns are allocated randomly in accordance with the color information. In other words, the patterns of through-holes are not formed in a pattern in accordance with rules to allow them to be identified from the outward appearance. Therefore, it is difficult for a person to visually identify the color information. For that reason, for example, in a tape cassette manufacturing process, it may be difficult for a worker to visually identify a tape and an ink ribbon etc. that should be mounted inside the cassette case from the external appearance of the tape cassette.

An object of the present invention is to provide a tape cassette that allows color information to be recognized by visually checking an external appearance of the tape cassette.

A tape cassette according to the present invention includes a housing, at least one tape, and a color indicator portion. The housing includes a top wall having a top surface, a bottom wall having a bottom surface, and a side wall. The top wall and the bottom wall each have a generally rectangular shape whose longitudinal direction is a left-and-right direction of the housing. The top wall, the bottom wall, and the side wall define a periphery of the housing. The at least one tape is mounted in a tape housing area defined within the periphery. The color indicator portion is disposed between the tape housing area and the periphery, and in a specified area adjacent to the tape housing area on a rear edge side of the bottom wall. The color indicator portion indicates color information relating to the at least one tape, and includes a plurality of lateral information sections that are a plurality of strip-shaped sections extending along the left-and-right direction of the housing and aligned in a front-rear direction of the housing. A presence or an absence of a first aperture formed in a first lateral information section indicates, as the color information, a base material color of the at least one tape. The first lateral information section is one of the plurality of lateral information sections and adjoining the rear edge of the bottom wall.

BRIEF DESCRIPTION OF THE DRAWINGS

Exemplary embodiments of the present disclosure will be described below in detail with reference to the accompanying drawings in which:

FIG. 20 is a diagram showing a data structure of a color information table 520;

DETAILED DESCRIPTION OF EXEMPLARY EMBODIMENTS

Figure 1:
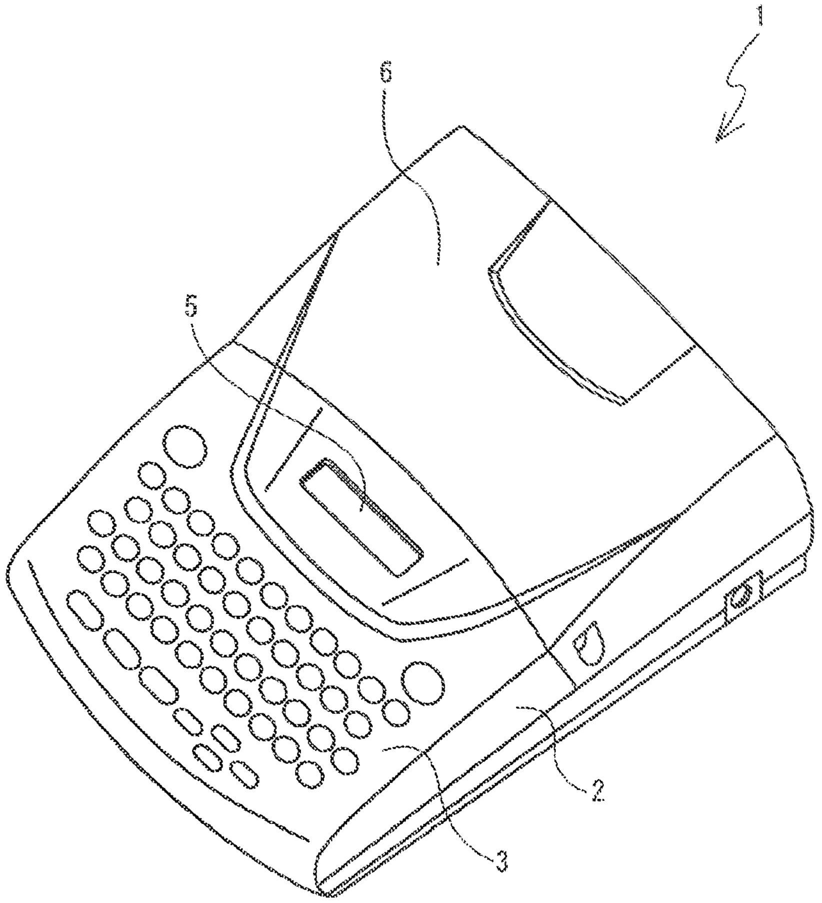
FIG. 1 is a perspective view of a tape printer 1 when a cassette cover 6 is closed.

Exemplary embodiments of the present invention will be explained below with reference to the figures. The configurations of the apparatuses, the flowcharts of various processing and the like shown in the drawings are merely exemplary and do not intend to limit the present invention.

A tape printer 1 and a tape cassette 30 according to the present embodiment will be explained hereinafter with reference to FIG. 1 to FIG. 23. In the explanation of the present embodiment, the lower left side, the upper right side, the lower right side, and the upper left side in FIG. 1 are respectively defined as the front side, the rear side, the right side, and the left side of the tape printer 1. In addition, the lower right side, the upper left side, the upper right side, and the lower left side in FIG. 2 are respectively defined as the front side, the rear side, the right side, and the left side of the tape cassette 30.

Figure 2:
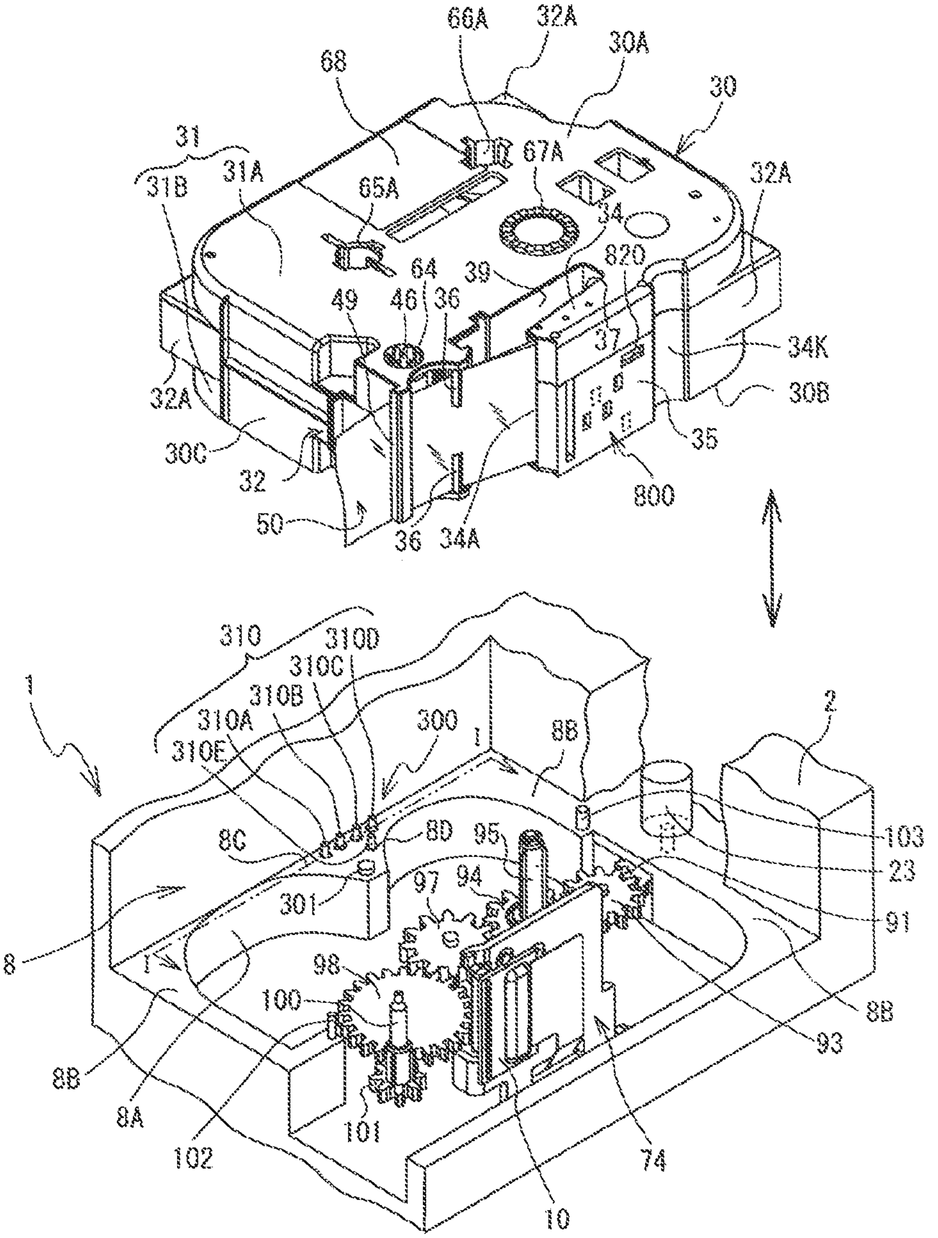
FIG. 2 is a perspective view illustrating a tape cassette 30 and a cassette housing portion 8.

Note that, in actuality, a group of gears, including gears 91, 93, 94, 97, 98 and 101 shown in FIG. 2, is covered and hidden by the bottom surface of a cavity 8A. However, for explanation purposes, the bottom surface of the cavity 8A is not shown in FIG. 2. Furthermore, in FIG. 2 to FIG. 6, side walls that form a periphery around a cassette housing portion 8 are shown schematically, but this is simply a schematic diagram, and the side walls shown in FIG. 2, for example, are depicted as thicker than they are in actuality. Moreover, in FIG. 3 to FIG. 6, for ease of understanding, the states in which various types of the tape cassette 30 are installed in the cassette housing portion 8 are shown with a top case 31A removed.

First, an outline configuration of the tape printer 1 according to the present embodiment will be explained. Hereinafter, the tape printer 1 configured as a general purpose device will be explained as an example. As the general purpose device, the tape printer 1 may commonly use a plurality of types of tape cassettes 30 with various types of tapes. The types of the tape cassettes 30 may include a thermal type tape cassette 30 that houses only a heat-sensitive paper tape, a receptor type tape cassette 30 that houses a print tape and an ink ribbon, and a laminated type tape cassette 30 that houses a double-sided adhesive tape, a film tape and an ink ribbon.

As shown in FIG. 1, the tape printer 1 is provided with a main unit cover 2 that has a rectangular shape in a plan view. A keyboard 3 is provided on the front side of the main unit cover 2. The keyboard 3 includes character keys for characters (letters, symbols, numerals, and so on), a variety of function keys, and so on. A display 5 is provided on the rear side of the keyboard 3. The display 5 displays input characters. A cassette cover 6 is provided on the rear side of the display 5. The cassette cover 6 may be opened and closed when the tape cassette 30 is replaced. Further, although not shown in the figures, a discharge slit is provided to the rear of the left side of the main unit cover 2, from which the printed tape is discharged to the outside. Also, a discharge window is formed on the left side of the cassette cover 6, such that, when the cassette cover 6 is in a closed state, the discharge slit is exposed to the outside.

Next, an internal configuration within the main unit cover 2 below the cassette cover 6 will be explained with reference to FIG. 2 to FIG. 8. As shown in FIG. 2, the cassette housing portion 8 is provided in the interior of the main unit cover 2 below the cassette cover 6. The cassette housing portion 8 is an area in which the tape cassette 30 can be installed or removed. The cassette housing portion 8 includes a cavity 8A and a cassette support portion 8B. The cavity 8A is formed as a depression that has a flat bottom surface, and the shape of the cavity 8A generally corresponds to the shape of a bottom surface of a cassette case 31 (to be described later) when the tape cassette 30 is installed. The cassette support portion 8B is a flat portion extending horizontally from the outer edge of the cavity 8A.

The plan view shape of the cassette support portion 8B generally corresponds to the plan view shape of the tape cassette 30, and is a rectangular shape that is longer in the left-and-right direction. The rear edge of the cavity 8A has a shape in which two arcs are lined up with each other in the left-and-right direction when seen in a plan view. A section of the cassette support portion 8B that is located between the two arcs is referred to as a rear support portion 8C. The rear support portion 8C is a portion that opposes a rear indentation 68C (refer to FIG. 11) of the tape cassette 30 installed in the cassette housing portion 8. The remaining part of the cassette support portion 8B except the rear support portion 8C is a portion that opposes a lower surface of a common portion 32 (more specifically, corner portions 32A to be described later) of the tape cassette 30 when the tape cassette 30 is installed in the cassette housing portion 8.

A rear support pin 301 and a rear detection portion 300 are provided on the rear support portion 8C. The rear support pin 301 is a column-shaped member that protrudes upward from the rear support portion 8C, in the vicinity of a position where the two arcs are joined at the rear edge of the cavity 8A. The rear support pin 301 supports the rear indentation

68C of the tape cassette 30 (to be described later) from underneath when the tape cassette 30 is installed in the cassette housing portion 8.

The rear detection portion 300 includes a plurality of detecting switches 310. Switch terminals 322 of the detecting switches 310 respectively protrude upward from through-holes 8D provided in the rear support portion 8C. In the present embodiment, the rear detection portion 300 includes five detecting switches 310A to 310E. Four of the detecting switches (the detecting switches 310A to 310D) are aligned in a single line along the rear end of the rear support portion 8C, in that order from the left side (the right side in FIG. 7). The remaining one detecting switch 310E is arranged to the front of the second detecting switch 310C from the right. Hereinafter, the detecting switches 310 provided in the rear detection portion 300 are referred to as the rear detecting switches 310.

Figure 7:
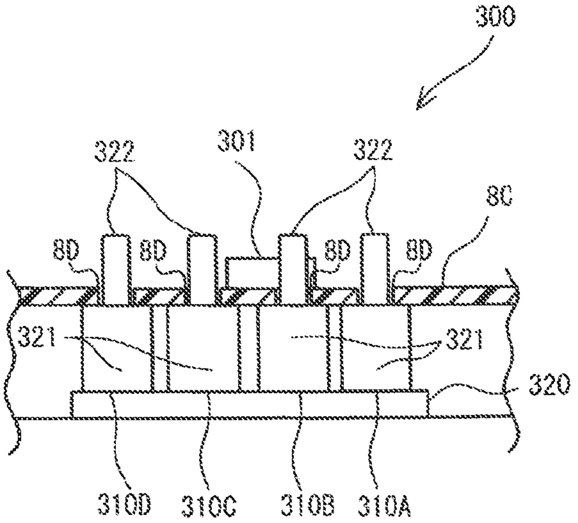
FIG. 7 is a cross-sectional view taken along a line I-I in FIG. 2 as seen in the direction of the arrows.

Here, the structure of the rear detecting switches 310 will be explained in detail with reference to FIG. 7. As shown in FIG. 7, each of the rear detecting switches 310 (the rear detecting switches 310A to 310E) includes a generally cylindrically shaped main unit 321 and a bar-shaped switch terminal 322. The main unit 321 is positioned below the rear support portion 8C, namely, inside the main unit cover 2. The switch terminal 322 can extend and retract in the direction of an axis line from one end of the main unit 321. The other end of the main unit 321 of each of the rear detecting switches 310 is attached to a switch support plate 320 and positioned inside the main unit cover 2.

In addition, on the one end of the main units 321, the switch terminals 322 can extend and retract through the through-holes 8D formed in the rear support portion 8C. Each of the switch terminals 322 is constantly maintained in a state in which the switch terminal 322 extends from the main unit 321 due to a spring member (not shown in the figures) provided inside the main unit 321. When the switch terminal 322 is not pressed, the switch terminal 322 remains extended from the main unit 321 to be in an off state. On the other hand, when the switch terminal 322 is pressed, the switch terminal 322 is pushed back into the main unit 321 to be in an on state.

As shown in FIG. 2, when the tape cassette 30 is not installed in the cassette housing portion 8, the rear detecting switches 310 are separated from the tape cassette 30. Consequently, all the rear detecting switches 310 are in the off state. On the other hand, when the tape cassette 30 is installed in the cassette housing portion 8, the rear detecting switches 310 oppose a rear indicator portion 900 (to be described later) of the tape cassette 30, and the rear detecting switches 310 are selectively pressed by the rear indicator portion 900. The type of the tape (hereinafter referred to as the tape type) mounted in the tape cassette 30 is detected based on a combination of the on and off states of the rear detecting switches 310. The detection of the tape type by the rear detection portion 300 will be described in more detail later.

Further, as shown in FIG. 2, two positioning pins 102 and 103 are provided at two positions on the cassette support portion 8B. More specifically, the positioning pin 102 is provided on the left side of the cavity 8A and the positioning pin 103 is provided on the right side of the cavity 8A. The positioning pins 102 and 103 are provided at the positions that respectively oppose pin holes 62 and 63 (refer to FIG. 11), when the tape cassette 30 is installed in the cassette housing portion 8. The pin holes 62 and 63 are two indentations formed in the lower surface of the common portion 32 of the tape cassette 30. When the tape cassette 30 is installed in the cassette housing portion 8, the positioning pins 102 and 103 are respectively inserted into the pin holes 62 and 63 to support the tape cassette 30 from underneath at the left and right positions of the peripheral portion of the tape cassette 30.

The cassette housing portion 8 is equipped with a feed mechanism, a print mechanism, and the like. The feed mechanism pulls out the tape from the tape cassette 30 and feeds the tape. The print mechanism prints characters on a surface of the tape. As shown in FIG. 2, a head holder 74 is fixed in the front part of the cassette housing portion 8, and a thermal head 10 that includes a heating element (not shown in the figures) is mounted on the head holder 74.

A tape feed motor 23 that is a stepping motor is provided outside of the cassette housing portion 8 (the upper right side in FIG. 2). A drive gear 91 is anchored to the lower end of a drive shaft of the tape feed motor 23. The drive gear 91 is meshed with a gear 93 through an opening, and the gear 93 is meshed with a gear 94. A ribbon take-up shaft 95 is standing upward on the upper surface of the gear 94. The ribbon take-up shaft 95 drives the rotation of a ribbon take-up spool 44, which will be described later. In addition, the gear 94 is meshed with a gear 97, the gear 97 is meshed with a gear 98, and the gear 98 is meshed with a gear 101. A tape drive shaft 100 is standing upward on the upper surface of the gear 101. The tape drive shaft 100 drives the rotation of a tape drive roller 46, which will be described later.

If the tape feed motor 23 is driven to rotate in the counterclockwise direction in a state where the tape cassette 30 is installed in the cassette housing portion 8, the ribbon take-up shaft 95 is driven to rotate in the counterclockwise direction via the drive gear 91, the gear 93 and the gear 94. The ribbon take-up shaft 95 causes the ribbon take-up spool 44, which is fitted with the ribbon take-up shaft 95 by insertion, to rotate. Furthermore, the rotation of the gear 94 is transmitted to the tape drive shaft 100 via the gear 97, the gear 98 and the gear 101, to thereby drive the tape drive shaft 100 to rotate in the clockwise direction. The tape drive shaft 100 causes the tape drive roller 46, which is fitted with the tape drive shaft 100 by insertion, to rotate.

As shown in FIG. 3 to FIG. 6, on the front side of the head holder 74, an arm shaped platen holder 12 is pivotably supported around a support shaft 12A. A platen roller 15 and a movable feed roller 14 are both rotatably supported on the leading end of the platen holder 12. The platen roller 15 faces the thermal head 10, and may be moved close to and apart from the thermal head 10. The movable feed roller 14 faces the tape drive roller 46 that is fitted with the tape drive shaft 100 by insertion, and may be moved close to and apart from the tape drive roller 46.

A release lever (not shown in the figures), which moves in the left-and-right direction in response to the opening and closing of the cassette cover 6, is coupled to the platen holder 12. When the cassette cover 6 is opened, the release lever moves in the right direction, and the platen holder 12 moves toward the stand-by position shown in FIG. 3. At the stand-by position shown in FIG. 3, the platen holder 12 has moved away from the cassette housing portion 8. Therefore, the tape cassette 30 can be installed into or detached from the cassette housing portion 8 when the platen holder 12 is at the stand-by position. The platen holder 12 is constantly elastically urged to remain in the stand-by position by a spiral spring that is not shown in the figures.

Figure 4:
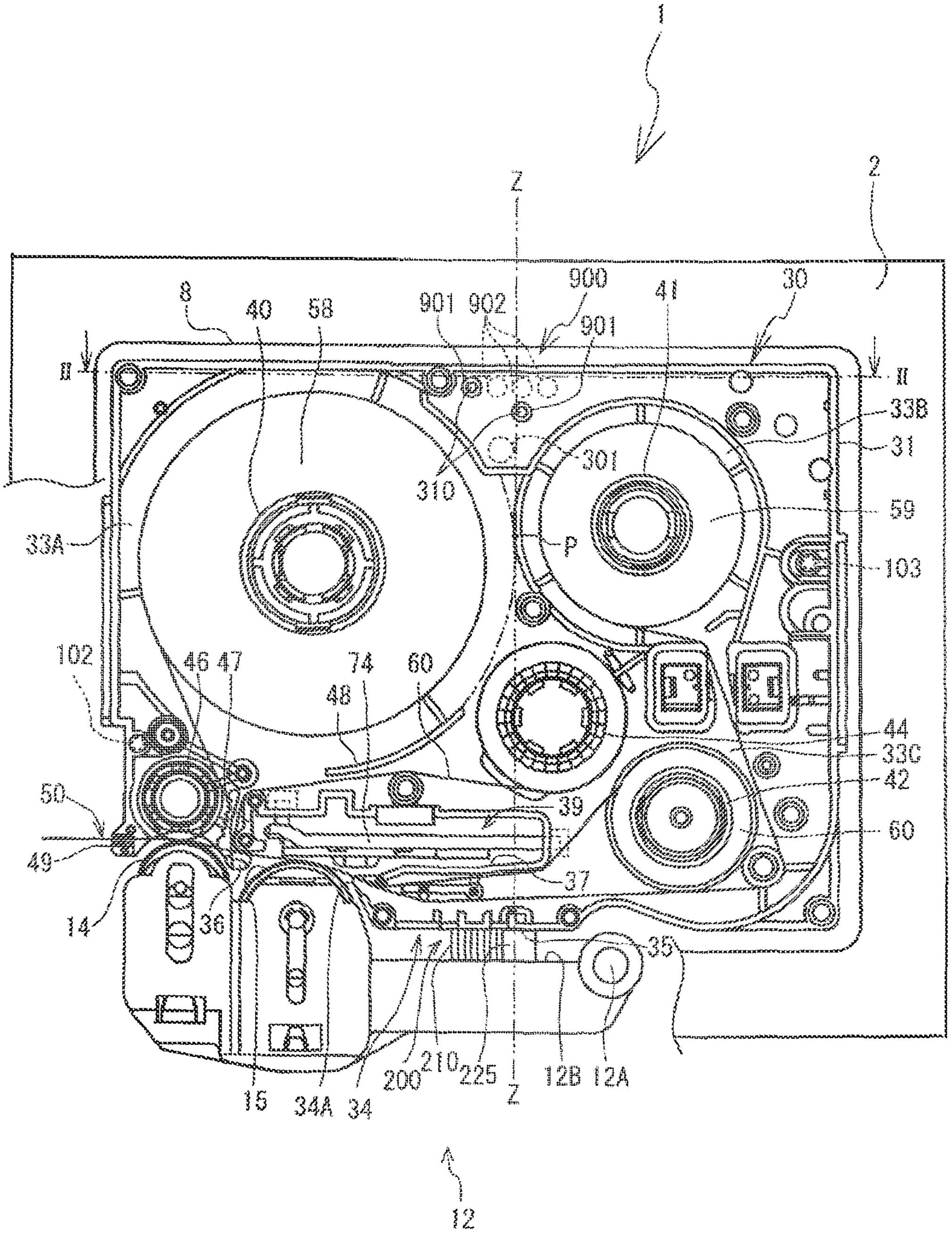
FIG. 4 is a plan view of the cassette housing portion 8 with the laminated type tape cassette 30 installed, when the platen holder 12 is at a print position.

On the other hand, when the cassette cover 6 is closed, the release lever moves in the left direction and the platen holder 12 moves toward the print position shown in FIG. 4 to FIG.

Figure 3:
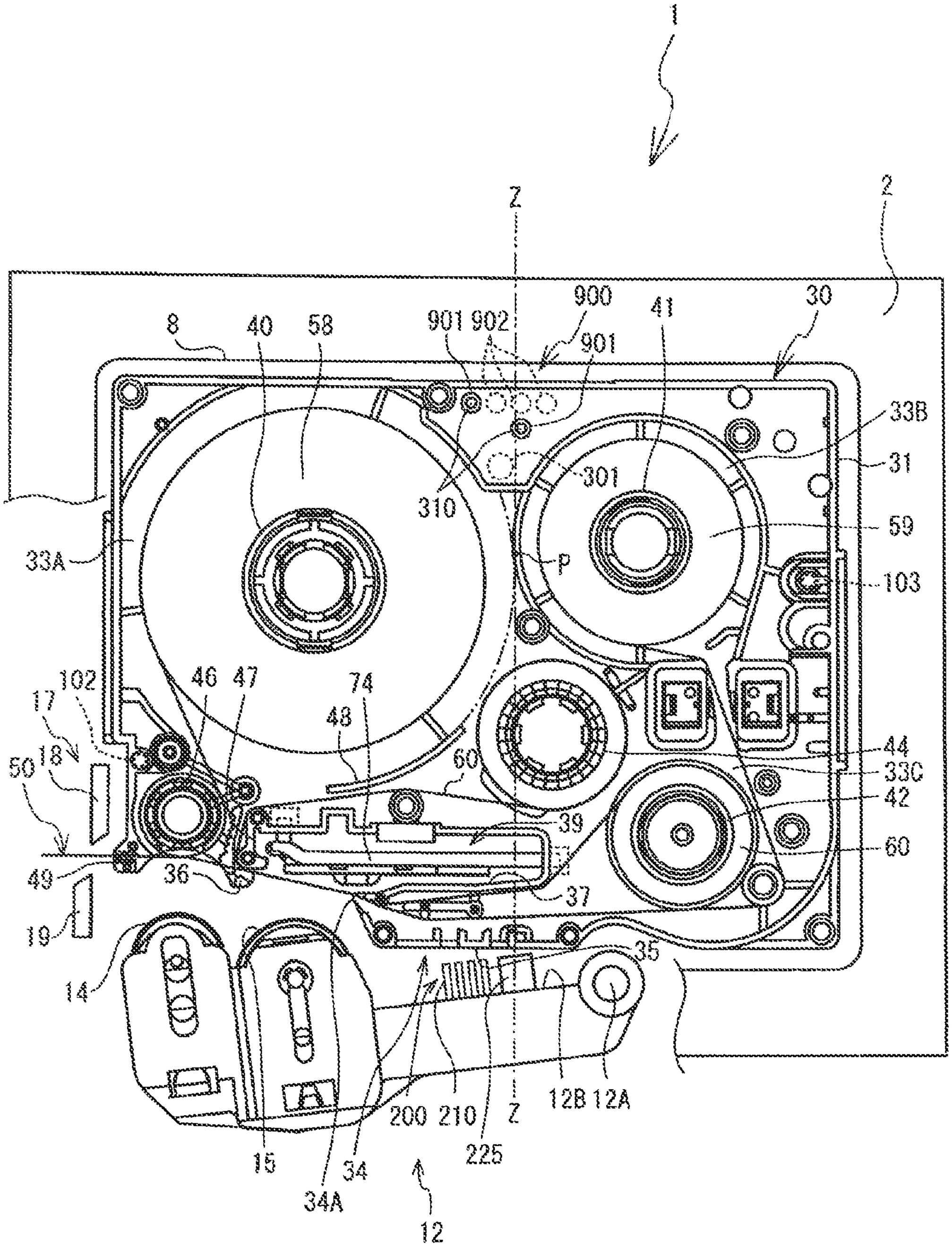
FIG. 3 is a plan view of the cassette housing portion 8 with a laminated type tape cassette 30 installed, when a platen holder 12 is at a standby position.

6. At the print position shown in FIG. 4 to FIG. 6, the platen holder 12 has moved close to the cassette housing portion 8. As shown in FIG. 3 and FIG. 4, when the laminated type tape cassette 30 is installed in the cassette housing portion 8, the platen roller 15 presses the thermal head 10 via a film tape 59 and an ink ribbon 60. At the same time, the movable feed roller 14 presses the tape drive roller 46 via a double-sided adhesive tape 58 and the film tape 59.

Figure 5:
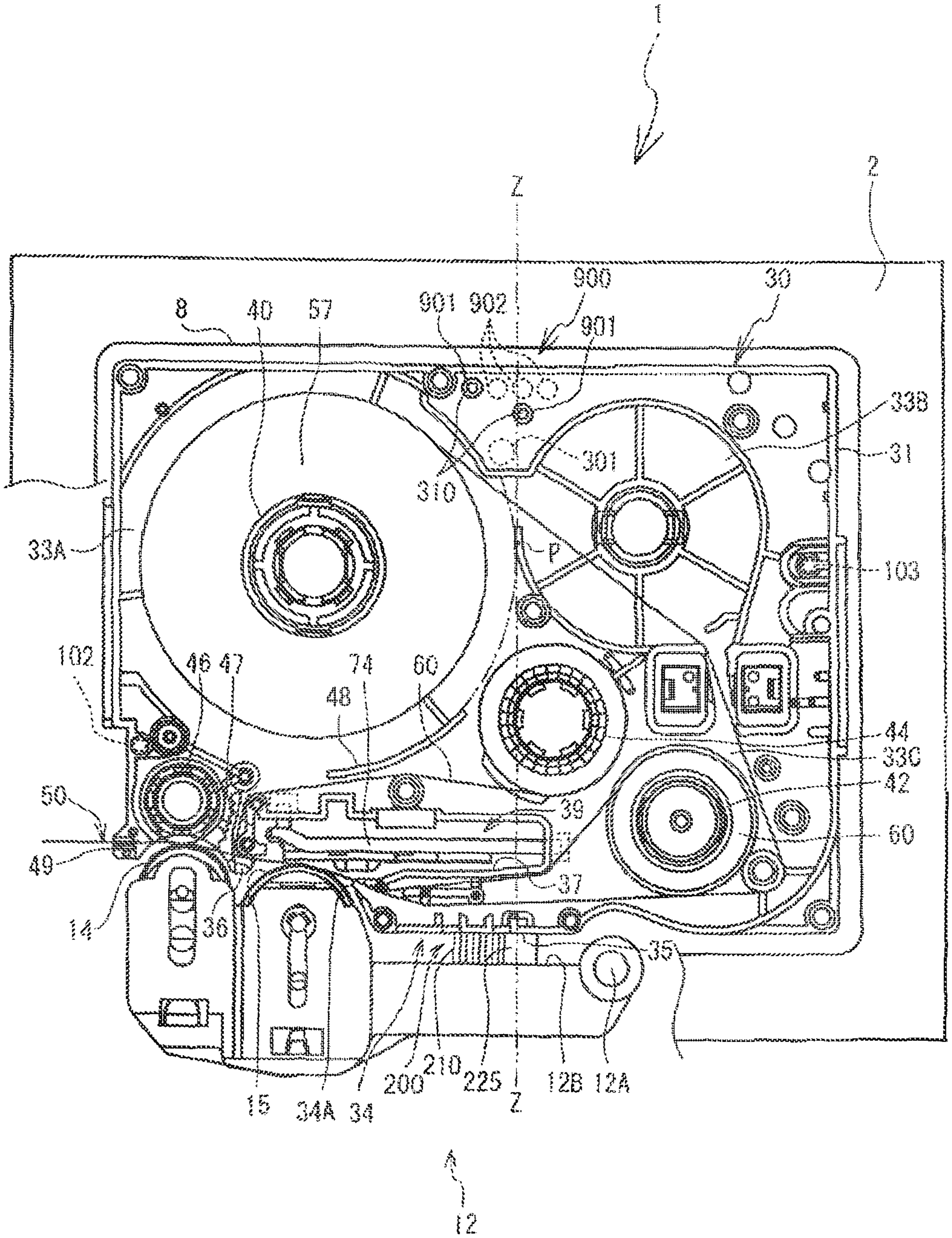
FIG. 5 is a plan view of the cassette housing portion 8 with a receptor type tape cassette 30 installed, when the platen holder 12 is at the print position.
Figure 6:
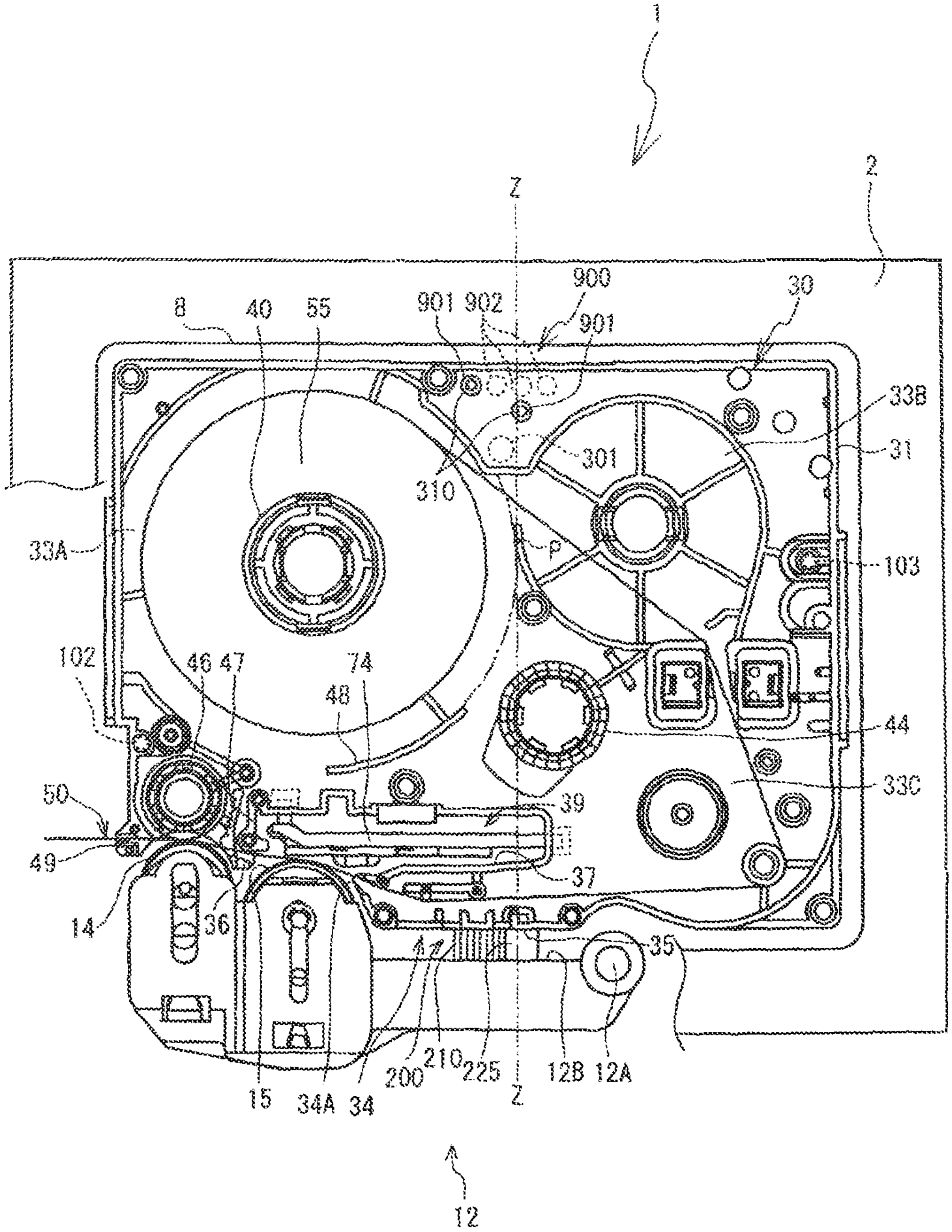
FIG. 6 is a plan view of the cassette housing portion 8 with a thermal type tape cassette 30 installed, when the platen holder 12 is at the print position.

In a similar way, as shown in FIG. 5, when the receptor type tape cassette 30 is installed in the cassette housing portion 8, the platen roller 15 presses the thermal head 10 via a print tape 57 and the ink ribbon 60, while the movable feed roller 14 presses the tape drive roller 46 via the print tape 57. Further, as shown in FIG. 6, when the thermal type tape cassette 30 is installed in the cassette housing portion 8, the platen roller 15 presses the thermal head 10 via a heat-sensitive paper tape 55, while the movable feed roller 14 presses the tape drive roller 46 via the heat-sensitive paper tape 55.

As described above, at the print position shown in FIG. 4 to FIG. 6, printing can be performed using the tape cassette 30 installed in the cassette housing portion 8. The heat-sensitive paper tape 55, the print tape 57, the double-sided adhesive tape 58, the film tape 59 and the ink ribbon 60 will be explained in more detail later.

As shown in FIG. 3, a feed path along which a printed tape 50 is fed extends from a tape discharge portion 49 of the tape cassette 30 to a discharge slit (not shown in the figures) of the tape printer 1. A cutting mechanism 17 that cuts the printed tape 50 at a predetermined position is provided on the feed path. The cutting mechanism 17 includes a fixed blade 18 and a movable blade 19 that opposes the fixed blade 18 and that is supported such that it can move in the back-and-forth direction (in the up-and-down direction in FIG. 3 to FIG. 6). The movable blade 19 is moved in the back-and-forth direction by a cutter motor 24 (refer to FIG. 9).

As shown in FIG. 3 to FIG. 6, an arm detection portion 200 is provided on the rear side surface of the platen holder 12, namely, a surface on the side that opposes the thermal head 10 (hereinafter referred to as a cassette-facing surface 12B). The arm detection portion 200 is provided slightly to the right of a center position in the longitudinal direction of the cassette-facing surface 12B. The arm detection portion 200 includes a plurality of detecting switches 210. Switch terminals 222 (refer to FIG. 17) of the detecting switches 210 respectively protrude to the rear such that the detecting switches 210 oppose the front wall (more specifically, an arm front wall 35 which will be described later) of the tape cassette 30 installed in the cassette housing portion 8.

In a similar way to the above-described switch terminal 322, when the switch terminal 222 of each of the detecting switches 210 is not pressed, it is extended to be in an off state, and when the switch terminal 222 is pressed, it is pushed back to be in an on state. Note that, hereinafter, the detecting switches 210 provided in the arm detection portion 200 are referred to as the arm detecting switches 210.

Figure 8:
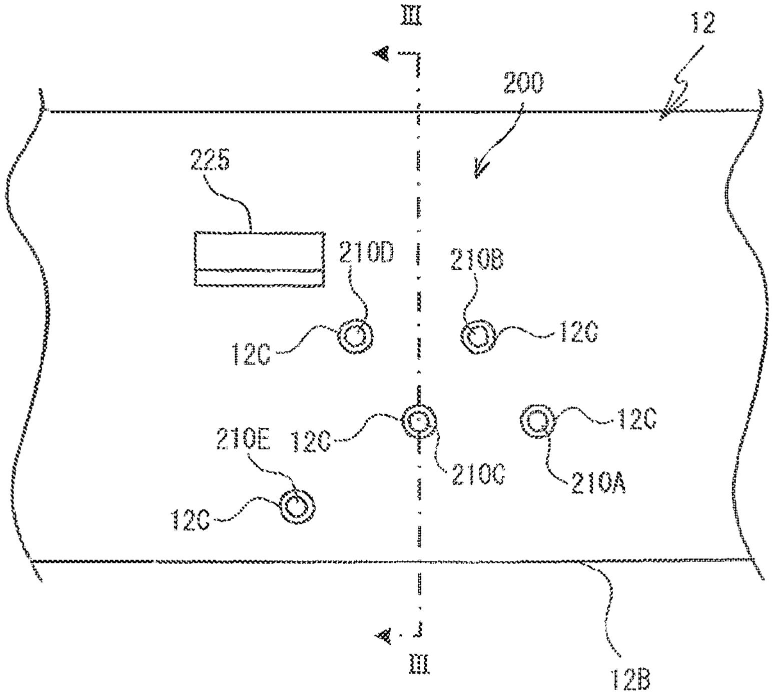
FIG. 8 is a partial enlarged view of a cassette-facing surface 12B on which is provided an arm detection portion 200.

As shown in FIG. 8, in the present embodiment, five through-holes 12C are formed in three rows in the vertical direction in the cassette-facing surface 12B of the platen holder 12. More specifically, the through-holes 12C are arranged such that two holes are arranged in an upper row, two holes are arranged in a middle row and one hole is arranged in a lower row. Positions of the through-holes 12C are different from each other in the left-and-right direction. Specifically, the five through-holes 12C are arranged in a zigzag pattern from the left side of the cassette-facing surface 12B (the right side in FIG. 8), in the following order: the left side of the middle row, the left side of the upper row, the right side of the middle row, the right side of the upper row, and then the lower row. The five arm detecting switches 210 are provided from the left side of the cassette-facing surface 12B in the order 210A, 210B, 210C, 210D, and 210E, at positions corresponding to the five through-holes 12C. The arm detecting switches 210A to 210E are each positioned at a height facing an arm indicator portion 800 (to be described later), in a state where the tape cassette 30 is installed in the cassette housing portion 8 at the proper position.

If the platen holder 12 moves toward the stand-by position (refer to FIG. 3) in a state where the tape cassette 30 is installed in the cassette housing portion 8, the arm detecting switches 210 are separated from the tape cassette 30. Consequently, all the arm detecting switches 210 are in the off state. On the other hand, if the platen holder 12 moves toward the print position (refer to FIG. 4 to FIG. 6), the arm detecting switches 210 oppose the front wall (more specifically, the arm front wall 35 that will be described later) of the tape cassette 30, and the arm detecting switches 210 are selectively pressed by the arm indicator portion 800, which will be described later. The tape type is detected based on a combination of the on and off states of the arm detecting switches 210, as will be described in more detail later.

Further, as shown in FIG. 3 to FIG. 6, a latching piece 225 is provided on the cassette-facing surface 12B of the platen holder 12. The latching piece 225 is a plate-like protrusion that extends in the left-and-right direction. In a similar way to the switch terminals 222 of the arm detecting switches 210, the latching piece 225 protrudes from the cassette-facing surface 12B in a generally horizontal manner toward the cassette housing portion 8. In other words, the latching piece 225 protrudes such that the latching piece 225 opposes the front wall (more specifically, the arm front wall 35) of the tape cassette 30 installed in the cassette housing portion 8. When the tape cassette 30 is installed in the cassette housing portion 8 at the proper position, the latching piece 225 is positioned at a height facing a latching hole 820 (refer to FIG. 2) formed in the arm front wall 35 of the tape cassette 30.

Figure 9:
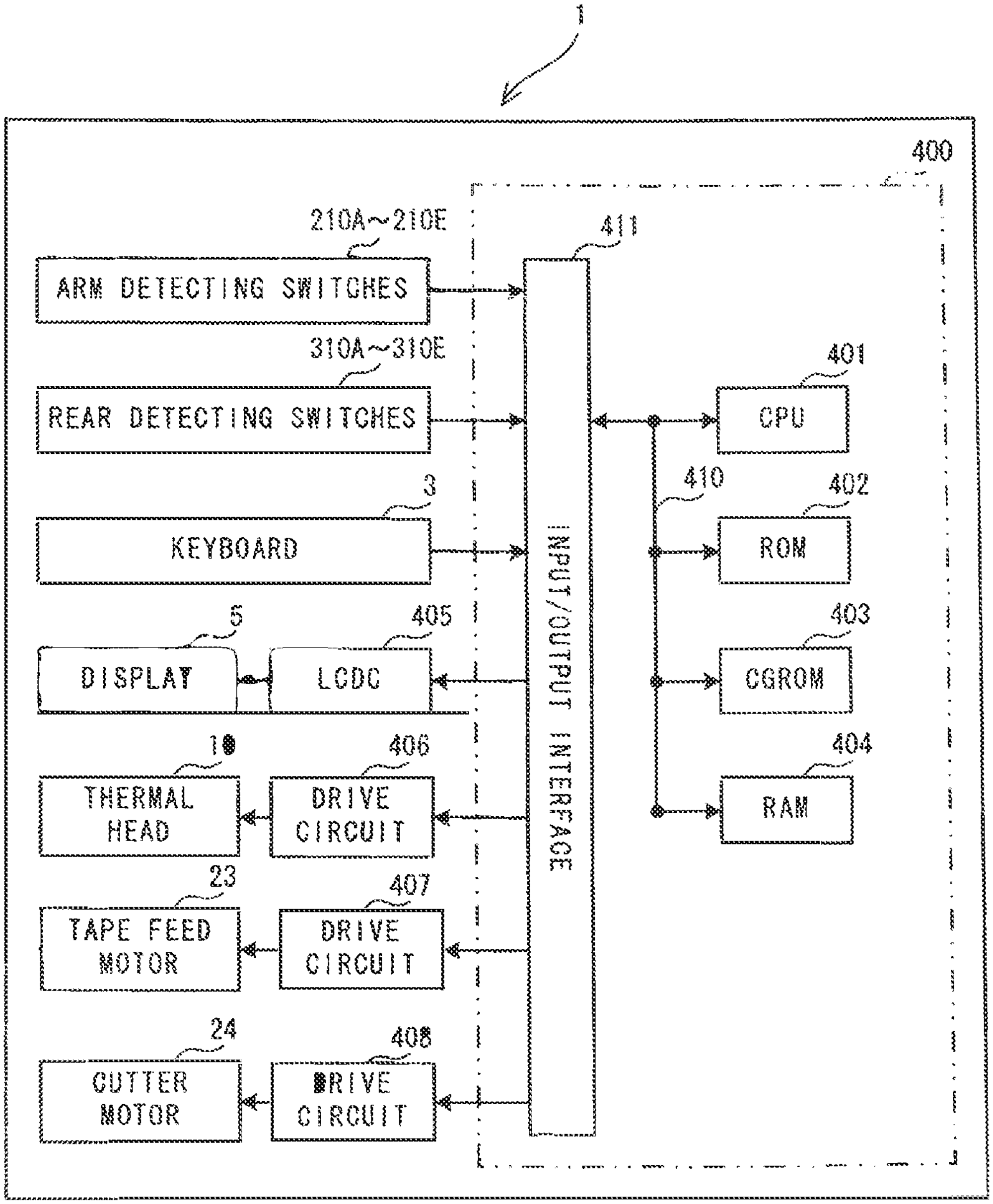
FIG. 9 is a block diagram showing an electrical configuration of the tape printer 1.

Next, the electrical configuration of the tape printer 1 will be explained with reference to FIG. 9. As shown in FIG. 9, the tape printer 1 includes a control circuit 400 formed on a control board. The control circuit 400 includes a CPU 401 that controls each instrument, a ROM 402, a CGROM 403, a RAM 404, and an input/output interface 411, all of which are connected to the CPU 401 via a data bus 410.

The ROM 402 stores various programs to control the tape printer 1, including a display drive control program, a print drive control program, a pulse number determination program, a cutting drive control program, and so on. The display drive control program controls a liquid crystal drive circuit (LCDC) 405 in association with code data of characters, such as letters, numerals and so on input from the keyboard 3. The print drive control program drives the thermal head 10 and the tape feed motor 23. The pulse number determination program determines the number of pulses to be applied corresponding to the amount of formation energy for each print dot. The cutting drive control program drives the cutting motor 24 to cut the printed tape 50 at a predetermined cutting position. The CPU 401 performs a variety of computations in accordance with each type of program. Note that the ROM 402 also stores various tables that are used to identify the tape type of the tape cassette 30 installed in the tape printer 1. The tables will be explained in more detail later.

The CGROM 403 stores print dot pattern data to be used to print various characters. The print dot pattern data is associated with corresponding code data for the characters. The print dot pattern data is categorized by font (Gothic, Mincho, and so on), and the stored data for each font includes six print character sizes (dot sizes of 16, 24, 32, 48, 64 and 96, for example).

The RAM 404 includes a plurality of storage areas, including a text memory, a print buffer and so on. The text memory stores text data input from the keyboard 3. The print buffer stores dot pattern data, including the printing dot patterns for characters and the number of pulses to be applied that is the amount of formation energy for each dot, and so on. The thermal head 10 performs dot printing in accordance with the dot pattern data stored in the print buffer. Other storage areas store data obtained in various computations and so on.

The input/output interface 411 is connected, respectively, to the arm detecting switches 210A to 210E, the rear detecting switches 310A to 310E, the keyboard 3, the liquid crystal drive circuit (LCDC) 405 that has a video RAM (not shown in the figures) to output display data to the display (LCD) 5, a drive circuit 406 that drives the thermal head 10, a drive circuit 407 that drives the tape feed motor 23, a drive circuit 408 that drives the cutter motor 24, and so on.

The configuration of the tape cassette 30 according to the present embodiment will be explained below with reference to FIG. 2 to FIG. 6 and FIG. 10 to FIG. 18. Hereinafter, the tape cassette 30 configured as a general purpose cassette will be explained as an example. As the general purpose cassette, the tape cassette 30 may be assembled as the thermal type, the receptor type and the laminated type that have been explained above, by changing, as appropriate, the type of the tape to be mounted in the tape cassette 30 and by changing the presence or absence of the ink ribbon, and so on.

FIG. 2 to FIG. 4 and FIG. 10 to FIG. 14 are figures relating to the tape cassette 30 in which a width of the tape is 36 mm, which is equal to or greater than a predetermined width (18 mm, for example). The tape cassette 30 represented in FIG. 2 to FIG. 4 and FIG. 10 to FIG. 14 is assembled as the laminated type cassette in which the double-sided adhesive tape 58 with a white base material, and the ink ribbon 60 with a black ink color are mounted.

Figure 10:
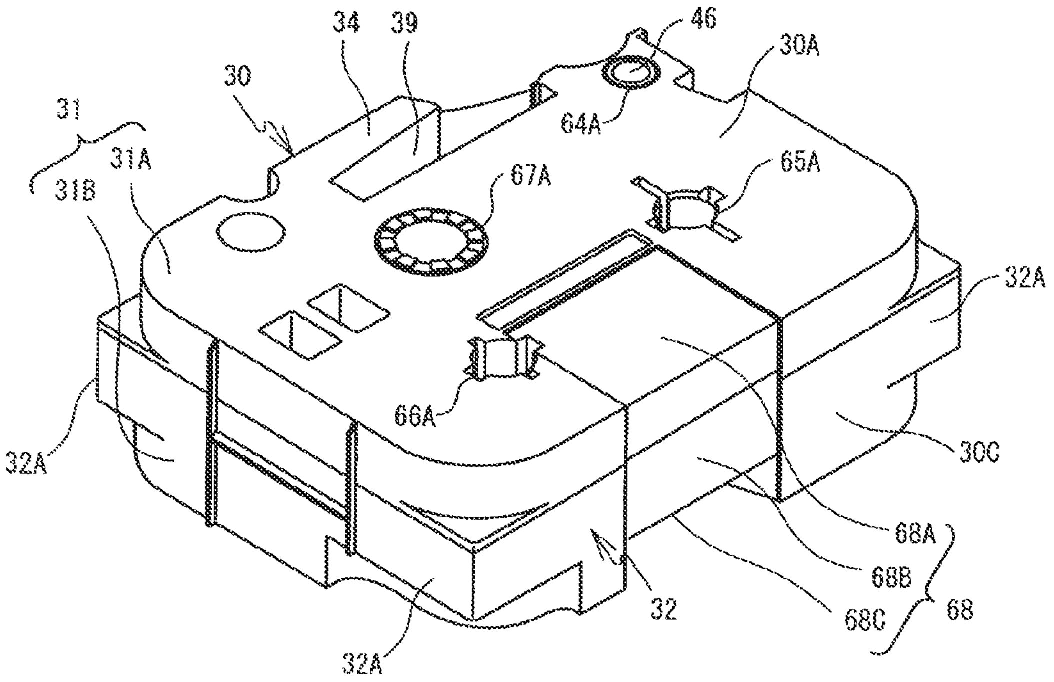
FIG. 10 is an external perspective view of the tape cassette 30 as seen from a top surface side.

As shown in FIG. 2 and FIG. 10, the tape cassette 30 includes a cassette case 31 that is a housing having a generally rectangular parallelepiped shape (box-like shape), with rounded corner portions in a plan view. The cassette case 31 includes a bottom case 31B and a top case 31A. The bottom case 31B includes a bottom wall 30B that forms the bottom surface of the cassette case 31. The top case 31A includes a top wall 30A that forms the top surface of the cassette case 31. The top case 31A is fixed to an upper portion of the bottom case 31B.

When the top case 31A and the bottom case 31B are joined, a side wall 30C of a predetermined height is formed. The side wall 30C extends between the top wall 30A and the bottom wall 30B along the peripheries of the top wall 30A and the bottom wall 30B. In other words, the cassette case 31 is a box-shaped case that has the top wall 30A and the bottom wall 30B, which are a pair of rectangular flat portions opposing each other in a vertical direction, and the side wall 30C (in the present embodiment, including four side walls of a front wall, a rear wall, a left side wall and a right side wall) that has a predetermined height and extends along the peripheries of the top wall 30A and the bottom wall 30B.

In the cassette case 31, the peripheries of the top wall 30A and the bottom wall 30B may not be entirely surrounded by the side wall 30C. A part of the side wall 30C (the rear wall, for example) may have an aperture that exposes the interior of the cassette case 31 to the outside. Further, a boss that connects the top wall 30A and the bottom wall 30B may be provided in a position facing the aperture. In the explanation below, the distance from the bottom surface to the top surface (the length in the vertical direction) is referred to as the height of the tape cassette 30 or the height of the cassette case 31. In the present embodiment, the vertical direction of the cassette case 31 (namely, the direction in which the top wall 30A and the bottom wall 30B oppose each other) generally corresponds to the direction of installation and removal of the tape cassette 30.

The cassette case 31 has the corner portions 32A that have the same width (the same length in the vertical direction), regardless of the type of the tape cassette 30. The corner portions 32A each protrude in an outward direction to form a right angle when seen in a plan view. However, the front left corner portion 32A does not form a right angle in the plan view, as the tape discharge portion 49 is provided in the corner. When the tape cassette 30 is installed in the cassette housing portion 8, the lower surface of the corner portions 32A opposes the above-described cassette support portion 8B inside the cassette housing portion 8.

The cassette case 31 includes a portion that is called the common portion 32. The common portion 32 includes the corner portions 32A and encircles the cassette case 31 along the side wall 30C at the same position as the corner portions 32A in the vertical (height) direction of the cassette case 31 and also has the same width as the corner portions 32A. More specifically, the common portion 32 is a portion that has a symmetrical shape in the vertical direction with respect to a center line in the vertical (height) direction of the cassette case 31.

The height of the tape cassette 30 differs depending on the width of the tape (the heat-sensitive paper tape 55, the print tape 57, the double-sided adhesive tape 58, the film tape 59 and so on) mounted in the cassette case 31. The height of the common portion 32, however, is set to be the same, regardless of the width of the tape of the tape cassette 30. For example, when the width of the common portion 32 is 12 mm, as the width of the tape of the tape cassette 30 is larger (18 mm, 24 mm, 36 mm, for example), the height of the cassette case 31 becomes accordingly larger, but the width of the common portion 32 remains constant.

Figure 11:
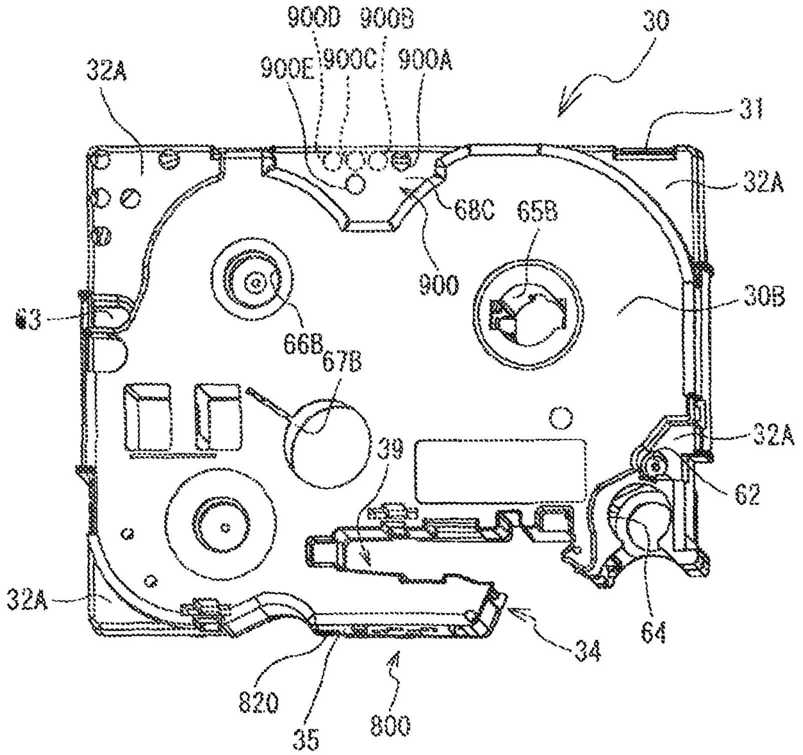
FIG. 11 is an external perspective view of the tape cassette 30 as seen from a bottom surface side.

As shown in FIG. 2, FIG. 10 and FIG. 11, the top case 31A and the bottom case 31B respectively have support holes 65A, 66A and 67A and support holes 65B, 66B and 67B that rotatably support a first tape spool 40, a second tape spool 41 and the ribbon take-up spool 44, respectively, which will be explained later. The support holes 65A and 65B are communicated with a first tape housing area 33A (refer to FIG. 3 to FIG. 6) at a substantially center position of the first tape housing area 33A when seen in a plan view. The first tape housing area 33A is provided in a left side area inside the cassette case 31. The support holes 66A and 66B are communicated with a second tape housing area 33B (refer to FIG. 3 to FIG. 6) at a substantially center position of the second tape housing area 33B when seen in a plan view. The second tape housing area 33B is provided in a right side area inside the cassette case 31.

The first tape housing area 33A has a generally circular shape in a plan view that corresponds to the tape wound on the first tape spool 40 (the double-sided adhesive tape 58 in FIG. 3 and FIG. 4). The second tape housing area 33B has a generally circular shape in a plan view that corresponds to the tape wound on the second tape spool 41 (the film tape 59 in FIG. 3 and FIG. 4). The first and second tape housing areas 33A and 33B are provided in the cassette case 31 whose longitudinal direction is the left-and-right direction, and lined up with each other in the left-and-right direction such that their outer edges are adjoined to each other in a plan view. Further, the front right portion in the cassette case 31 is provided with an ink ribbon housing area 33C that is positioned to the front of the first and second tape housing areas 33A and 33B.

In the laminated type tape cassette 30 shown in FIG. 3 and FIG. 4, the double-sided adhesive tape 58 wound on the first tape spool 40, the film tape 59 wound on the second tape spool 41 and the ink ribbon 60 wound on a ribbon spool 42 are mounted in the cassette case 31. The first tape spool 40, on which the double-sided adhesive tape 58 is wound with its release paper facing outward, is rotatably mounted in the first tape housing area 33A via the support holes 65A and 65B. The second tape spool 41, on which the film tape 59 is wound, is rotatably mounted in the second tape housing area 33B via the support holes 66A and 66B. The ink ribbon 60 that is wound on the ribbon spool 42 is rotatably arranged in the ink ribbon housing area 33C.

Between the first tape spool 40 and the ribbon spool 42 in the cassette case 31, the ribbon take-up spool 44 is rotatably supported by the support holes 67A and 67B. The ribbon take-up spool 44 pulls out the ink ribbon 60 from the ribbon spool 42 and takes up the ink ribbon 60 that has been used to print characters. A clutch spring (not shown in the figures) is attached to a lower portion of the ribbon take-up spool 44 to prevent loosening of the taken up ink ribbon 60 due to reverse rotation of the ribbon take-up spool 44.

In the receptor type tape cassette 30 shown in FIG. 5, the print tape 57 wound on the first tape spool 40 and the ink ribbon 60 wound on the ribbon spool 42 are mounted in the cassette case 31. The receptor type tape cassette 30 does not include the second tape spool 41.

In the thermal type tape cassette 30 shown in FIG. 6, the heat-sensitive paper tape 55 wound on the first tape spool 40 is mounted in the cassette case 31. The thermal type tape cassette 30 does not include the second tape spool 41 and the ribbon spool 42.

As shown in FIG. 2, a semi-circular groove 34K that has a semi-circular shape in a plan view is provided in the front wall of the cassette case 31, and extends over the height of the cassette case 31 (in other words, extends from the top surface to the bottom surface). Of the front wall of the cassette case 31, a section that stretches leftwards from the semi-circular groove 34K is referred to as the arm front wall 35. A portion that is defined by the arm front wall 35 and an arm rear wall 37 and that extends leftwards from the front right portion of the tape cassette 30 is referred to as an arm portion 34. The arm rear wall 37 is a wall separately provided at the rear of the arm front wall 35 and extends over the height of the cassette case 31.

Figure 12:
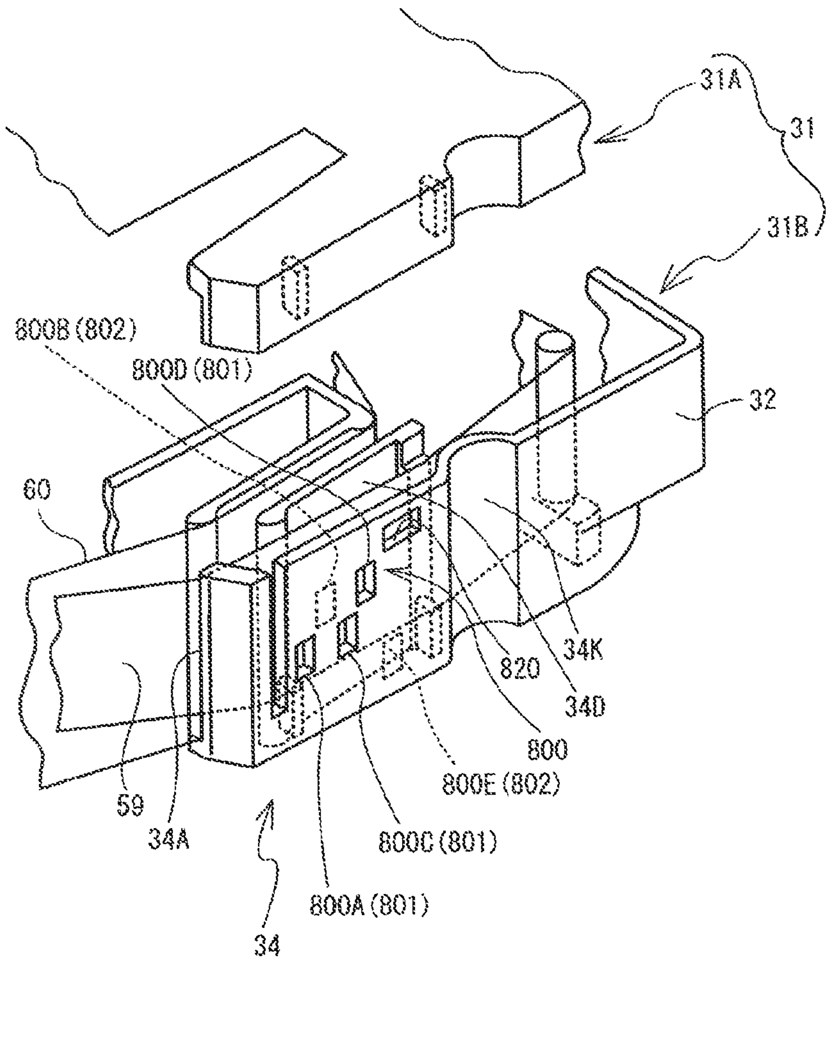
FIG. 12 is an enlarged and exploded perspective view of an arm portion 34 of the tape cassette 30.

As shown in FIG. 12, a tape feed path, along which the film tape 59 is fed, and a ribbon feed path, along which the ink ribbon 60 is fed, are formed as different feed paths separated by a separating wall 34D inside the arm portion 34. After the film tape 59 and the ink ribbon 60 are respectively guided and fed along the feed paths, the film tape 59 and the ink ribbon 60 are joined together at an exit 34A of the arm portion 34, and are discharged from the exit 34A toward a head insertion portion 39.

Although FIG. 12 shows an example of the laminated type tape cassette 30 (refer to FIG. 3 and FIG. 4), the arm portion 34 of the other types of tape cassettes 30 is similar. In the receptor type tape cassette 30 (refer to FIG. 5), the print tape 57 is guided and fed along the tape feed path, while the ink ribbon 60 is guided and fed along the ribbon feed path. In the thermal type tape cassette 30 (refer to FIG. 6), the heat-sensitive paper tape 55 is guided and fed along the tape feed path, while the ribbon feed path is not used.

When the platen holder 12 moves to the print position (refer to FIG. 4 to FIG. 6) in a state where the tape cassette 30 is installed in the cassette housing portion 8, the arm detection portion 200 and the latching piece 225 provided on the cassette-facing surface 12B oppose the arm front wall 35. As shown in FIG. 2 and FIG. 12, the arm front wall 35 is provided with the arm indicator portion 800 and the latching hole 820. The arm indicator portion 800 allows the tape printer 1 to detect the tape type, by selectively pressing the arm detecting switches 210. The latching hole 820 is a hole into which the latching piece 225 is inserted.

The arm indicator portion 800 includes a plurality of indicators. Each of the indicators is formed as one of the non-pressing portion 801 and the pressing portion 802 and provided at a position corresponding to each of the arm detecting switches 210. Specifically, the arm indicator portion 800 includes a combination of the non-pressing portion(s) 801 and the pressing portion(s) 802 arranged in a pattern that corresponds to print information. The print information, among the tape types of the tape cassette 30, is essential to perform correct printing in the tape printer 1. In the present embodiment, the arm indicator portion 800 includes five indicators 800A to 800E, each of which is formed as either the non-pressing portion 801 or the pressing portion 802, arranged at positions that respectively oppose the five arm detecting switches 210A to 210E when the tape cassette 30 is installed in the cassette housing portion 8.

The non-pressing portion 801 is a switch hole that has an upright rectangular shape in a front view. The switch terminal 222 (refer to FIG. 17) of each of the arm detecting switches 210 can be inserted into and removed from the switch hole. The arm detecting switch 210 that opposes the non-pressing portion 801 remains in the off state, because the switch terminal 222 is inserted into the non-pressing portion 801. The pressing portion 802 is a surface portion that does not allow the insertion of the switch terminal 222. The arm detecting switch 210 that opposes the pressing portion 802 is changed to the on state, because the switch terminal 222 contacts with the pressing portion 802.

The latching hole 820 is a slit-like through-hole that extends in the left-and-right direction on the upper right side of the arm indicator portion 800. The latching hole 820 is arranged to oppose the latching piece 225 (refer to FIG. 8) such that the latching piece 225 can be inserted into and removed from the latching hole 820 when the tape cassette 30 is installed in the cassette housing portion 8.

As shown in FIG. 2 to FIG. 6, the head insertion portion 39 is a space that has a generally rectangular shape in a plan view and that extends through the tape cassette 30 in the vertical direction. The head insertion portion 39 is surrounded by the arm rear wall 37 and a peripheral wall that is provided continuously from the arm rear wall 37. The head holder 74 that supports the thermal head 10 of the tape printer 1 is inserted into the head insertion portion 39, and the thermal head 10 performs printing on the tape (one of the heat-sensitive paper tape 55, the print tape 57 and the film tape 59) discharged from the exit 34A of the arm portion 34.

Further, a support hole 64 (refer to FIG. 11) is provided on the downstream side of the head insertion portion 39, in the tape feed direction from the exit 34A of the arm portion 34 to the tape discharge portion 49. The tape drive roller 46 is rotatably supported inside the support hole 64. In a case where the laminated type tape cassette 30 shown in FIG. 3 and FIG. 4 is installed in the cassette housing portion 8, the tape drive roller 46, by moving in concert with the opposing movable feed roller 14, pulls out the film tape 59 from the second tape spool 41. At the same time, the tape drive roller 46 pulls out the double-sided adhesive tape 58 from the first tape spool 40, then guides the double-sided adhesive tape 58 to the print surface of the film tape 59 to bond them together.

A pair of regulating members 36 that match in the vertical direction are provided on the upstream side of the tape drive roller 46. The base portions of the regulating members 36 regulate the printed film tape 59 in the vertical direction (in the tape width direction) on the downstream side of the thermal head 10, and direct the printed film tape 59 toward the tape discharge portion 49. The regulating members 36 regulate the film tape 59 such that it can be boned to the double-sided adhesive tape 58 appropriately without making any positional displacement.

A guide wall 47 is standing in the vicinity of the regulating members 36. The guide wall 47 serves to separate the used ink ribbon 60 that has been fed via the head insertion portion 39 from the film tape 59, and guides the used ink ribbon 60 toward the ribbon take-up spool 44. A separating wall 48 is standing between the guide wall 47 and the ribbon take-up spool 44. The separating wall 48 prevents mutual contact between the used ink ribbon 60 that is guided along the guide wall 47 and the double-sided adhesive tape 58 that is wound on and supported by the first tape spool 40.

In a case where the receptor type tape cassette 30 shown in FIG. 5 is installed in the cassette housing portion 8, the print tape 57 is pulled out from the first tape spool 40 by the tape drive roller 46 moving in concert with the movable feed roller 14. On the downstream side of the thermal head 10, the printed print tape 57 is regulated in the vertical direction (in the tape width direction) by the base portions of the regulating members 36, and is guided toward the tape discharge portion 49. In addition, the used ink ribbon 60 that has been fed via the head insertion portion 39 is separated from the print tape 57 by the guide wall 47, and guided toward the ribbon take-up spool 44.

In a case where the thermal type tape cassette 30 shown in FIG. 6 is installed, the heat-sensitive paper tape 55 is pulled out from the first tape spool 40 by the tape drive roller 46 moving in concert with the movable feed roller 14. On the downstream side of the thermal head 10, the printed heat-sensitive paper tape 55 is regulated in the vertical direction (in the tape width direction) by the base portions of the regulating members 36, and guided toward the tape discharge portion 49.

As shown in FIG. 11, the pin holes 62 and 63 are provided at two positions on the lower surface of the corner portions 32A, corresponding to the above-described positioning pins 102 and 103 of the tape printer 1. More specifically, the pin hole 62, into which the positioning pin 102 is inserted, is an indentation provided in the lower surface of the corner portion 32A to the rear (the upper side in FIG. 11) of the support hole 64 that is provided in the left front portion of the cassette case 31 (the lower right side in FIG. 11). The pin hole 63, into which the positioning pin 103 is inserted, is an indentation provided in the lower surface of the corner portion 32A in the vicinity of a central portion of the right end of the cassette case 31 (the left side in FIG. 11). Note that the tape drive roller 46 and some other components are not shown in FIG. 11.

A distance in the vertical (height) direction of the tape cassette 30 between the position of the pin holes 62 and 63 and a center position in the vertical direction of the film tape 59 that is the print medium housed in the cassette case 31 is constant, regardless of the tape type (the tape width, for example) of the tape cassette 30. In other words, the distance remains constant even when the height of the tape cassette 30 is different.

As shown in FIG. 2 and FIG. 10, a top surface affixing portion 68A, a rear surface affixing portion 68B and the rear indentation 68C are provided on a rear surface 68 of the cassette case 31. The top surface affixing portion 68A is provided in a rear portion of the top wall 30A, and has a rectangular shape in a plan view. The back surface affixing portion 68B is provided along the vertical direction of the side wall 30C, and has a rectangular shape in a rear view. The rear indentation 68C is provided in a rear portion of the bottom wall 30B, and has a generally triangular shape in a bottom view. The top surface affixing portion 68A, the back surface affixing portion 68B and the rear indentation 68C have the same width, and are provided at a substantially center position in the left-and-right direction in a rear portion of the cassette case 31. The top surface affixing portion 68A, the back surface affixing portion 68B and the rear indentation 68C form an area that extend continuously over three surfaces of the top wall 30A, the side wall 30C and the bottom wall 30B.

The top surface affixing portion 68A and the back surface affixing portion 68B are parts onto which a label sheet (not shown in the figures) to indicate the tape type etc. of the tape cassette 30 is affixed over two surfaces of the top wall 30A and the side wall 30C (specifically, a rear wall). The rear indentation 68C is a stepped portion that is formed between the first tape housing area 33A and the second tape housing area 33B (refer to FIG. 3 to FIG. 6 and FIG. 14) in the rear portion of the cassette case 31. In other words, the rear indentation 68C is provided between a rear wall 31C (refer to FIG. 13 and FIG. 14) and the first and second tape housing areas 33A and 33B. The rear wall 31C is a wall portion forming the rear surface, of the side wall 30C of the tape cassette 30.

More specifically, as shown in FIG. 11, the rear indentation 68C is a flat portion that is upwardly indented in the bottom wall 30B from the bottom surface, and has a shape that substantially matches the shape of the rear support portion 8C shown in FIG. 2. The rear indentation 68C is positioned at the same height position as the lower surface of the corner portion 32A. As described earlier, the common portion 32 is formed symmetrically in the vertical direction with respect to the center line in the vertical (height) direction of the cassette case 31, and the height T of the common portion 32 is set to be the same, regardless of the width of the tape of the tape cassette 30. Therefore, similarly to the common portion 32, the distance from the center line in the vertical (height) direction of the cassette case 31 to the rear indentation 68C is the same, regardless of the width of the tape of the tape cassette 30.

When the tape cassette 30 is installed in the cassette housing portion 8 at a proper position, the rear support pin 301 provided in the rear support portion 8C contacts with the rear indentation 68C, and the rear detection portion 300 opposes the rear indentation 68C. Therefore, the rear indentation 68C is provided with the rear indicator portion 900 that is a portion that makes it possible for a person to identify the tape type, and that also allows the tape printer 1 to detect the tape type by selectively pressing the rear detecting switches 310 (refer to FIG. 2 and FIG. 7).

The structure and the function of the rear indentation 68C that includes the rear indicator portion 900 will be explained below in detail with reference to FIG. 13 to FIG. 16.

As described above, the tape cassette 30 according to the present embodiment is structured such that when a person looks at the tape cassette 30 alone in a state in which the tape cassette 30 is not installed in the tape printer 1, the person can identify the type of the tape by visually checking the rear indicator portion 900. In addition, the tape cassette 30 is structured such that when the tape cassette 30 is installed in the cassette housing portion 8 of the tape printer 1, the tape printer 1 can identify the type of the tape by the rear detection portion 300 detecting information indicated by the rear indicator portion 900. In the present embodiment, the tape type indicated by the rear indicator portion 900 is color information relating to the tape mounted in the tape cassette 30. First, an area included in the rear indentation 68C and the structure within the area will be explained.

Figure 13:
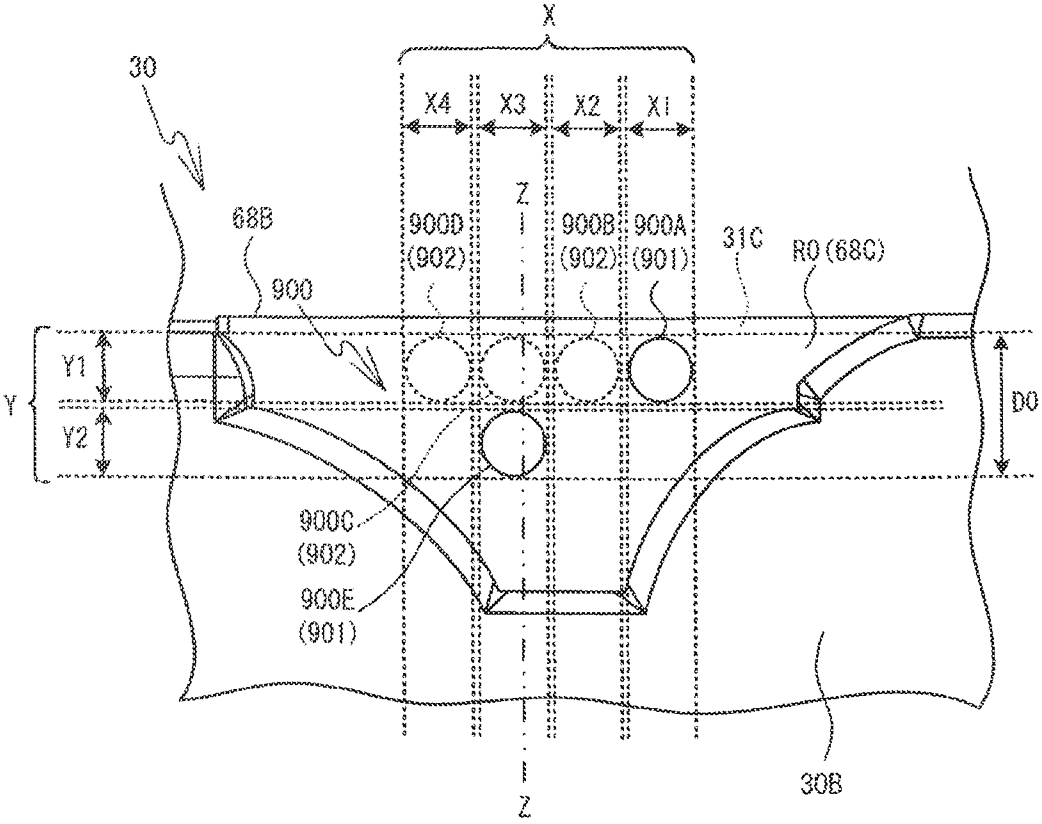
FIG. 13 is a bottom view of the tape cassette 30, in which a rear indentation 68C is enlarged.

As shown in FIG. 13, the rear indentation 68C includes a specified area R0. The specified area R0 is an area extending to the front from the rear wall 31C, which is the wall portion forming the rear surface, of the side surface 30C of the tape cassette 30. More specifically, the specified area R0 is an area adjoining the rear wall 31C in the rear indentation 68C. In the present embodiment, the entire rear indentation 68C is the specified area R0. The specified area R0 includes a plurality of vertical information sections X and a plurality of lateral information sections Y. The plurality of vertical information sections X is formed as a plurality of strip-shaped sections extending along a front-rear direction (the up-and-down direction in FIG. 13), which is a short side direction of the cassette case 31. The plurality of lateral information sections Y is formed as a plurality of strip-shaped sections extending along a left-and-right direction (the left-and-right direction in FIG. 13), which is a long side direction of the cassette case 31.

The vertical information sections X according to the present embodiment that are exemplified in FIG. 13 include four vertical information sections X1 to X4. The vertical information sections X1 to X4 are arranged at equal intervals in the left-and-right direction of the cassette case 31. Among the vertical information sections X1 to X4, the vertical information section X1 is positioned on the leftmost side (the right side in FIG. 13). The vertical information sections X2, X3 and X4 are arranged in that order from the vertical information section X1 toward the right side (the left side in FIG. 13). The widths (namely, the lengths in the left-and-right direction) of the vertical information sections X1 to X4 are approximately the same, and adjacent vertical information sections among the vertical information sections X1 to X4 are adjacent to each other at equal intervals.

The vertical information section X3 includes a part (i.e., a contact point P shown in FIG. 3 to FIG. 6) at which outer peripheral edges of the first and second tape housing areas 33A and 33B contact each other when seen in a plan view. In other words, the vertical information section X3 includes an imaginary line (hereinafter referred to as a reference line Z) that passes through the contact point P and that extends in the front-rear direction. In the vertical information section X3 according to the present embodiment, the reference line Z is positioned slightly to the left (to the right in FIG. 13) of a substantially center position in the left-and-right direction of the vertical information section X3.

The lateral information sections Y according to the present embodiment that are exemplified in FIG. 13 include two lateral information sections Y1 and Y2. The lateral information sections Y1 and Y2 are arranged in rows in the front-rear direction (the up-and-down direction in FIG. 13) of the cassette case 31. The lateral information section Y1 adjoins the rear wall 31C, in the specified area R0. The lateral information section Y2 is provided to the front (the lower side in FIG. 13) of the lateral information section Y1, in the specified area R0. The widths (namely, the lengths in the front-rear direction) of the lateral information sections Y1 and Y2 are approximately the same.

The specified area R0 is an area that opposes the rear detecting switches 310 of the tape printer 1 when the tape cassette 30 is installed in the cassette housing portion 8, and includes the rear indicator portion 900 that indicates the tape type (color information, in the present embodiment) of the tape cassette 30. At least one aperture is formed in at least one of the lateral information sections Y1 and Y2. A pattern in which the at least one aperture is formed in the lateral information sections Y1 and Y2 are determined in advance, according to the color information. The rear indicator portion 900 is a portion that indicates the color information by a combination of whether or not an aperture is formed in each of the lateral information sections Y1 and Y2. A person can recognize the color information by visually checking the combination of the aperture(s) formed in the lateral information sections Y1 and Y2 of the rear indicator portion 900.

The left-and-right direction positions of the apertures formed in the lateral information sections Y1 and Y2 may be fixed for each of the lateral information sections Y1 and Y2. For example, among a plurality of areas where the lateral information sections Y1, Y2 and the vertical information sections X1 to X4 intersect and overlap with each other (hereinafter referred to as overlapping areas), at least one overlapping area in each of the lateral information sections Y1 and Y2 may be fixed as an indicator. In such a case, the color information may be identified based on a combination of whether or not the aperture is formed in each of the indicators. If positions corresponding to the rear detecting switches 310 (refer to FIG. 2 and FIG. 7) of the tape printer 1 are determined as the indicators, the color information can be identified not only by human visual check but also by the tape printer 1.

Given this, in the present embodiment, five overlapping areas that respectively oppose the five rear detecting switches 310A to 310E shown in FIG. 2 and FIG. 7 when the tape cassette 30 is installed in the cassette housing portion 8 are fixed as indicators 900A to 900E. More specifically, as shown in FIG. 13, the area in which the lateral information section Y1 and the vertical information section X1 intersect and overlap with each other functions as the indicator 900A that opposes the rear detecting switch 310A. The area in which the lateral information section Y1 and the vertical information section X2 intersect and overlap with each other functions as the indicator 900B that opposes the rear detecting switch 310B. The area in which the lateral information section Y1 and the vertical information section X3 intersect and overlap with each other functions as the indicator 900C that opposes the rear detecting switch 310C. The area in which the lateral information section Y1 and the vertical information section X4 intersect and overlap with each other functions as the indicator 900D that opposes the rear detecting switch 310D. The area in which the lateral information section Y2 and the vertical information section X3 intersect and overlap with each other functions as the indicator 900E that opposes the rear detecting switch 310E.

In the example shown in FIG. 13, the apertures are formed in the indicators 900A and 900E. On the other hand, the indicators 900B, 900C and 900D are surface portions that are in the same plane as the rear indentation 68C, and no aperture is formed therein. In such a manner, each of the indicators 900A to 900E is formed as either an aperture or a surface portion. The aperture and the surface portion can be identified by human visual check. In addition, when the aperture and the surface portion oppose the rear detecting switches 310, the aperture and the surface portion respectively function as a non-pressing portion 901 that does not press the rear detecting switch 310, and as a pressing portion 902 that presses the rear detecting switch 310. Thus, the aperture and the surface portion allow the tape printer 1 to identify the color information. The relationship between the indicators 900A to 900E and the rear detecting switches 310 will be described later in detail.

In the present embodiment, one indicator is provided in each of the vertical information sections X1, X2 and X4, while a plurality of indicators are provided in the vertical information section X3. This is because the specified area R0 is the rear indentation 68C that has a generally triangular shape in a plan view and that is defined by the first and second tape housing areas 33A and 33B and the rear wall 31C, and the rear indentation 68C has the maximum length in the front-rear direction, on the above-described reference line Z. In other words, among the vertical information sections X1 to X4, the vertical information section X3 including the reference line Z has the maximum length in the front-rear direction. Accordingly, in a case where a plurality of indicators are arranged in rows in the front-rear direction in the rear indentation 68C, it may be most favorable to provide the plurality of indicators in the vertical information section X3, as described above.

Figure 14:
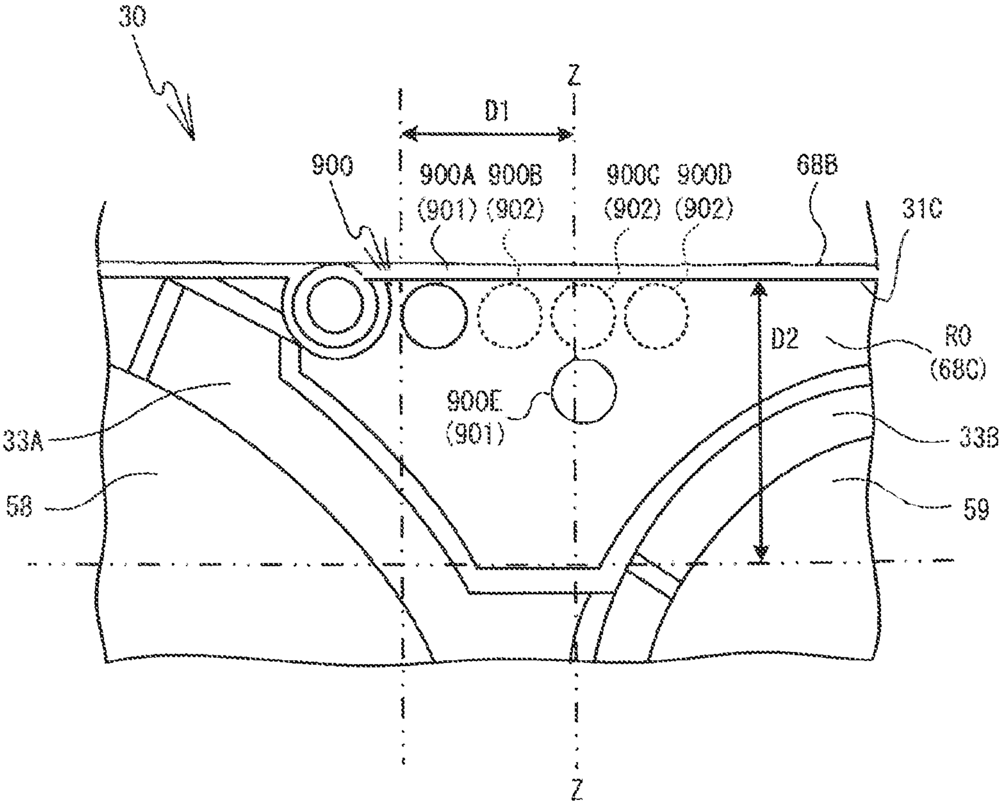
FIG. 14 is a plan view of the tape cassette 30, in which the rear indentation 68C is enlarged with a top case 31A removed.

With the above-described structure, in the tape cassette 30 according to the present embodiment, a person can easily recognize which of the lateral information sections Y1 and Y2, or which of the indicators 900A to 900E includes an indicator element (an aperture or a surface portion). Hereinafter, this reason will be explained with reference to FIG. 13 to FIG. 16. Note that FIG. 13 and FIG. 14 show another tape cassette 30 that includes the rear indentation 68C (the specified area R0) with a different pattern of apertures formed in the rear indentation 68C (the specified area R0).

If a person can ascertain which of the respective lateral information sections Y1 and Y2 includes an aperture by visually checking the rear indentation 68C, the person can identify the color information of the tape cassette 30 simply by visually checking the combination of the apertures in the respective lateral information sections Y1 and Y2. The person may visually check the rear indentation 68C in either of the following two patterns. The first pattern is that the person looks at the tape cassette 30 in a plan view with the top case 31A removed, and visually checks the rear indentation 68C from above. The second pattern is that the person looks at the tape cassette 30 in a bottom view (from underneath), and visually checks the rear indentation 68C. Accordingly, when the person does not know the positions of the lateral information sections Y1 and Y2, the person can identify the elements in the lateral information sections Y1 and Y2 using the following methods, in accordance with the pattern in which the person visually checks the rear indentation 68C.

First, element identification of the lateral information section Y1 will be explained. As shown in FIG. 14, when a person visually checks the rear indentation 68C from above (namely, from the inner side of the bottom case 31B) with the top case 31A removed, the person can identify, as the lateral information section Y1, an area adjoining the rear wall 31C and extending in the left-and-right direction in a plan view. Thus, the person can identify an aperture formed adjacent to the rear wall 31C as an aperture formed in the lateral information section Y1. Further, the person can identify a part where the aperture is not formed within the area adjacent to the rear wall 31C, as a surface portion provided in the lateral information section Y1.

On the other hand, as shown in FIG. 13, when the person visually checks the rear indentation 68C from underneath (namely, from the outer side of the bottom case 31B), the person cannot directly see the rear wall 31C. However, because the rear wall 31C is a thin plate and its thickness (the length in the front-rear direction) is small, the position in the front-rear direction of the rear wall 31C generally corresponds to the position in the front-rear direction of the contour formed by the rear surface when the tape cassette 30 is seen in a bottom view. Therefore, the person can identify, as the lateral information section Y1, the area adjacent to the contour formed by the rear surface and extending in the left-and-right direction in a bottom view. Thus, in the same manner as that described above, the person can identify the aperture and the surface portion provided in the lateral information section Y1.

Next, element identification of the lateral information section Y2 will be explained. As shown in FIG. 14, when a person visually checks the rear indentation 68C from above, the person can recognize the contact point P (refer to FIG. 3 to FIG. 6) at which the outer peripheral edges of the first and second tape housing areas 33A and 33B contact each other when seen in a plan view. Further, the person can recognize the reference line Z that passes through the contact point P. Then, using the reference line Z as a reference, the element identification of the lateral information section Y2 can be performed in the following manner.

First, among apertures formed adjacent to the rear wall 31C (namely, among apertures provided in the lateral information section Y1), an aperture that is positioned closest to the reference line Z is defined as a reference aperture. If there is an aperture that overlaps with the reference line Z when seen in a plan view (namely, an aperture provided in the vertical information section X3), excluding the aperture on the reference line Z, another aperture that is positioned closest to the reference line Z is defined as the reference aperture. Further, an end that is farthest from the reference line Z in the reference aperture is defined as a reference end, and a length in the left-and-right direction between the reference line Z and the reference end is defined as a reference distance D1. In the example shown in FIG. 14, the aperture that is formed in the indicator 900A and that is positioned at the leftmost end among the indicators of the lateral information section Y1 corresponds to the reference aperture. By using the left end of the aperture (the indicator 900A) as the reference end, the length in the left-and-right direction from the reference end to the reference line Z is obtained as the reference distance D1.

If a length in the front-rear direction between the rear wall 31C and the lateral information section Y2 is defined as a distance DO (refer to FIG. 13), the position of the lateral information section Y2 is defined such that the distance DO is less than twice the reference distance D1 (refer to FIG. 14). More specifically, in the rear indentation 68C, at least a part of the lateral information section Y2 is included within a range from the rear wall 31C to the front by a distance that is twice the reference distance D1 (within the range of a distance D2 in FIG. 14; D2=D1*2).

Thus, it can be identified that at least a part of the lateral information section Y2 is present in front of the lateral information section Y1, within the range from the rear wall 31C to the front by the distance that is twice the reference distance D1 (within the range of the distance D2) in the rear indentation 68C. Consequently, when an aperture that is disposed separately from the rear wall 31C (namely, an aperture that is not an aperture in the lateral information section Y1) is formed within the range of the distance D2 in the rear indentation 68C, that aperture can be identified as the aperture provided in the lateral information section Y2. In particular, when only one indicator is provided in the lateral information section Y2, whether or not an aperture is provided in the lateral information section Y2 can be identified without accurately knowing the position of the indicator.

With the above-described method, the reference distance D1 and consequently the distance D2 vary depending on the position in which the reference aperture is formed. For example, in the example shown in FIG. 14, the aperture provided in the indicator (the indicator 900A in FIG. 14) that is farthest from the reference line Z corresponds to the reference aperture. In this case, the reference distance D1 and the distance D2 are largest. On the other hand, in the example shown in FIG. 15, the aperture formed in the indicator 900B, which is closest to the reference line Z among the indicators of the lateral information section Y1, corresponds to the reference aperture. In this case, the reference distance D1 and the distance D2 are smallest.

Figure 16:
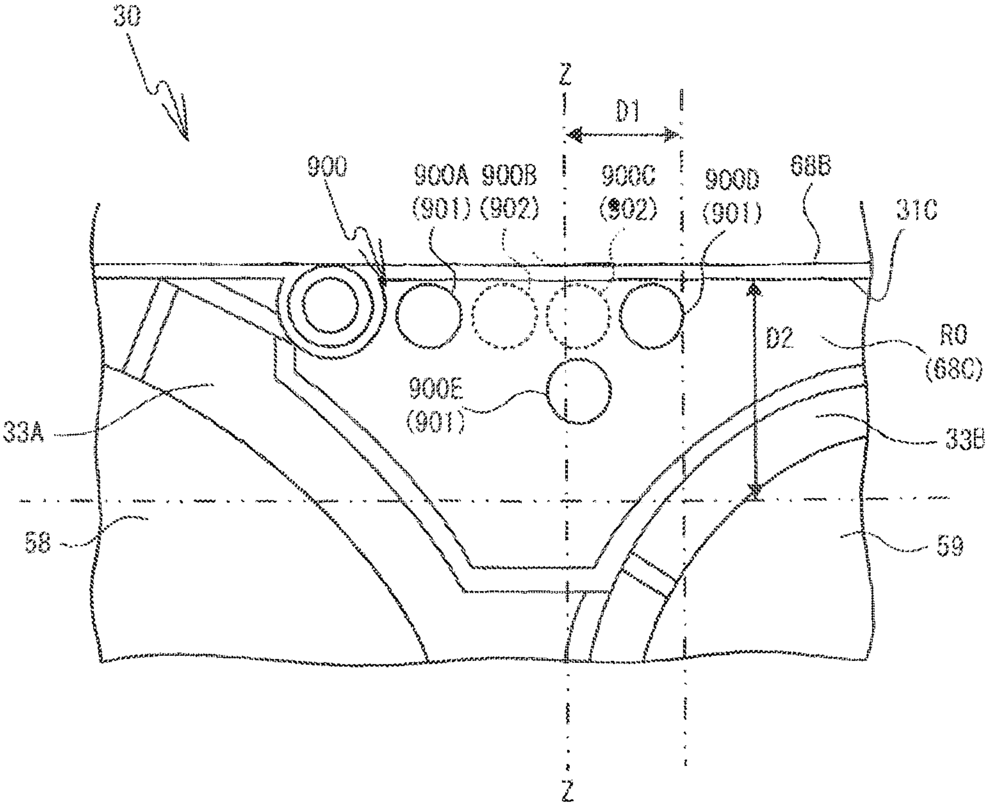
FIG. 16 is a plan view of the tape cassette 30 according to a second comparison example, in which the rear indentation 68C is enlarged with the top case 31A removed.

As in the example shown in FIG. 16, when a plurality of apertures are formed in the lateral information section Y1, the aperture that is closest to the reference line Z (the aperture in the indicator 900D in FIG. 16) corresponds to the reference aperture. Because the aperture that is closest to the reference line Z (the aperture in the indicator 900D in FIG. 16) corresponds to the reference aperture, the reference distance D1 and the distance D2 are smaller than in a case where the aperture that is further away from the reference line Z (the aperture in the indicator 900A in FIG. 16) is used as the reference aperture.

Figure 15:
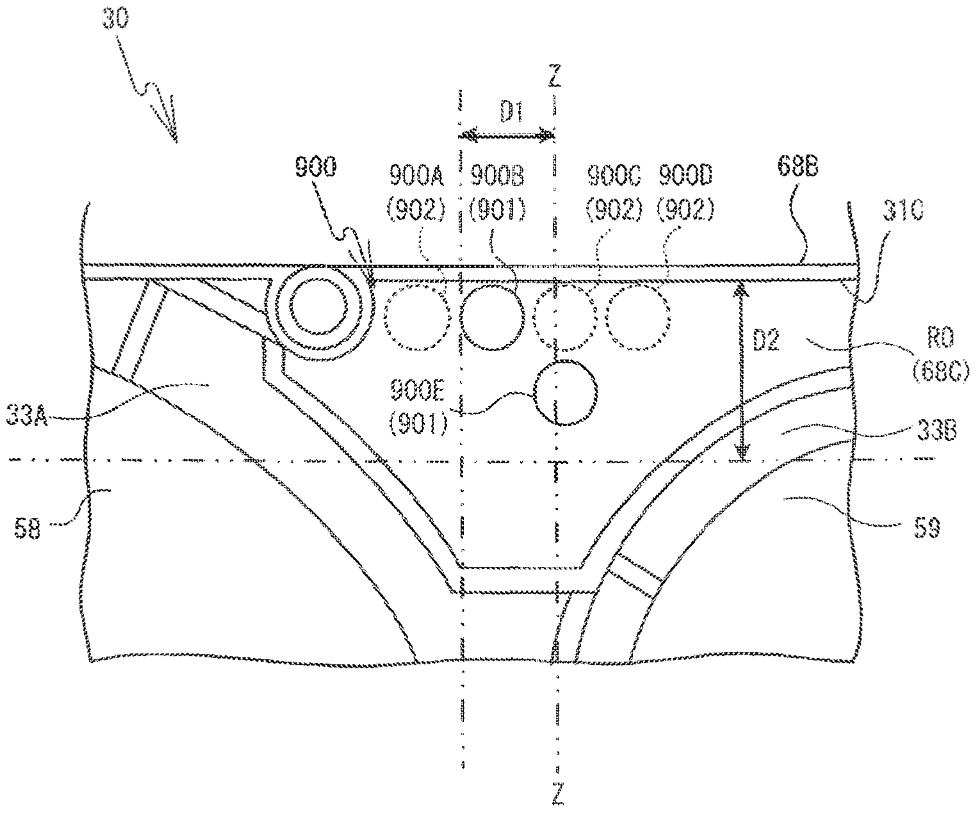
FIG. 15 is a plan view of the tape cassette 30 according to a first comparison example, in which the rear indentation 68C is enlarged with the top case 31A removed.

In the present embodiment, regardless of the pattern in which the aperture(s) is formed in the lateral information section Y1, the position of the lateral information section Y2 in the front-rear direction is defined in advance such that at least a part of the lateral information section Y2 is included within a range of the smallest distance D2 (which corresponds to the example shown in FIG. 15). Therefore, if at least one aperture is present in the lateral information section Y1, regardless of the position in which each of the apertures are formed, it is possible to identify whether or not the lateral information section Y2 includes the aperture, by using as a reference the reference aperture that is closest to the reference line Z.

When a person visually checks the rear indentation 68C from underneath (refer to FIG. 13), the person cannot directly see the first and second tape housing areas 33A and 33B in a plan view. Therefore, in some cases, it may be difficult to recognize the contact point P (refer to FIG. 3 to FIG. 6) and the reference line Z. Accordingly, when the person visually checks the rear indentation 68C from underneath, in some cases, it may difficult to perform element identification of the lateral information section Y2 using the above-described method. In such cases, the following method can be used for the element identification of the lateral information section Y2.

In the rear indicator portion 900 according to the present embodiment, an aperture(s) and a surface portion(s) are provided in a pattern that is determined in advance in accordance with the color information. In the present embodiment, in certain patterns that correspond to certain color information (for example, the tape color: clear, the character color: black) relating to major tapes, a pattern of the two indicators that are respectively provided in the lateral information sections Y1 and Y2 and that are arranged in rows in the front-rear direction is fixed. Specifically, for the major color information, the front indicator is provided with an aperture, and the rear indicator is provided with a surface portion. Note that the major tape refers to a tape that has high likelihood of being mounted in the tape cassette 30. For example, in the examples shown in FIG. 13 to FIG. 16, the two indicators 900C and 900E, through which the reference line Z passes, are formed as a combination of a surface portion and an aperture, respectively.

With this arrangement, when the rear indentation 68C is visually checked from underneath, with most of the tape cassettes 30 including the major tape, it is ensured that, in the two indicators aligned in the front-rear direction, the indicator formed as an aperture is provided away from the rear wall 31C and to the front of the indicator formed as a surface portion. Therefore, the aperture in the lateral information section Y2 does not adjoin the rear wall 31C. In other words, the aperture that is away from the rear wall 31C can be identified as the aperture provided in the lateral information section Y2. Therefore, a person can identify the position of the lateral information section Y1 by visually checking the surface portion of the indicator 900C, and the person can also identify the position of the lateral information section Y2 by visually checking the aperture of the indicator 900E.

On the contrary, of the two indicators that are respectively provided in the lateral information sections Y1 and Y2 and that are aligned in the front-rear direction, the rear indicator may be formed as an aperture and the front indicator may be formed as a surface portion. For example, although not shown in the figures, the two indicators 900C and 900E, through which the reference line Z passes, may be formed as a combination of an aperture and a surface portion, respectively. With this arrangement, when the rear indentation 68C is visually checked from underneath, it is ensured that, in the two indicators aligned in the front-rear direction, the indicator formed as an aperture is provided adjoining the rear wall 31C and to the rear of the indicator formed by a surface portion. Therefore, the aperture adjoining the rear wall 31C does not extend over the lateral information section Y2. In other words, the surface portion that is positioned to the front of the aperture adjoining the rear wall 31C can be identified as the surface portion provided in the lateral information section Y2. Therefore, a person can identify the position of the lateral information section Y1 by visually checking the aperture of the indicator 900C, and the person can also identify the position of the lateral information section Y2 by visually checking the surface portion of the indicator 900E.

The person can also visually check the pattern of the aperture(s) and the surface portion(s) formed in the rear indentation 68C of the present embodiment from above. Therefore, even when the rear indentation 68C is visually checked from above (refer to FIG. 13 to FIG. 16), the aperture or the surface portion in the lateral information section Y2 can be identified in the same manner as that described above.

In the example of FIG. 13, among the plurality of overlapping areas formed by the lateral information sections Y1, Y2 and the vertical information sections X1 to X4, the overlapping areas of the lateral information section Y1 and the vertical information sections X1 to X4 respectively function as the indicators 900A to 900D, and the overlapping area of the lateral information section Y2 and the vertical information section X3 functions as the indicator 900E. In this case, if the color information is identified by whether an aperture is formed in each of the indicators 900A to 900E, it is also necessary to identify which of the indicators 900A to 900E includes an aperture. If a person knows all the positions in the left-and-right direction of the vertical information sections X1 to X4 arranged in the rear indentation 68C, the person can identify to which of the indicators 900A to 900E the aperture provided in the lateral information section Y1 or Y2 corresponds, using the vertical information sections X1 to X4 as references. In other words, the person can visually identify which of the indicators 900A to 900E, provided in the overlapping areas of the lateral information sections Y1, Y2 and the vertical information sections X1 to X4, includes the at least one aperture provided in the specified area R0.

The positions in the left-and-right direction of the vertical information sections X1 to X4 can be identified in the following manner, by a person visually checking the rear indentation 68C. As described above, because the reference line Z is included in the vertical information section X3, if the rear indentation 68C is visually checked from above (refer to FIG. 14), the position in the left-and-right direction of the vertical information section X3 can be identified by using the reference line Z as a reference. In addition, the vertical information sections X1 to X4 are lined up with each other in the left-and-right direction at substantially equal intervals in the specified area R0. Therefore, by using the vertical information section X3 as a reference, it may be possible to identify the vertical information sections X2 and X1 that are lined up in this order in the left direction at equal intervals, and the vertical information section X4 that is arranged in the right direction at an equal interval. In this manner, even when the positions in the left-and-right direction of the vertical information sections are not ascertained, it may be possible to identify the positions of the vertical information sections X1 to X4, by using as a reference the reference line Z that can easily be confirmed by visual check.

Further, when the rear indentation 68C is visually checked from underneath (refer to FIG. 13), it may be possible to identify the position in the left-and-right direction of the vertical information section X3 that includes the indicators 900C and 900E, based on the indicators 900C and 900E that are formed by a combination of an aperture and a surface portion aligned in the front-rear direction. Thus, similarly to that described above, it may be possible to identify the vertical information sections X1 to X4 that are lined up at substantially equal intervals in the left-and-right direction in the specified area R0. In this manner, even when the positions in the left-and-right direction of the vertical information sections X1 to X4 are not ascertained, it may be possible to identify the positions of the vertical information sections X1 to X4, by using as a reference the indicators (the combination of the aperture and the surface portion) aligned in the front-rear direction.

For this reason, based on which of the vertical information sections X1 to X4 includes an aperture provided in the lateral information section Y1, it may be possible to identify which of the indicators 900A to 900D is formed as an aperture. Further, based on whether or not an aperture provided in the lateral information section Y2 is located in the vertical information section X3, it may be possible to identify whether the indicator 900E is formed as an aperture.

In this manner, with the tape cassette 30 according to the present embodiment, it may be possible to identify the combination of the aperture and the surface portion in the indicators 900A to 900E, by a person visually checking the rear indentation 68C.

Next, identification of the color information based on a combination of whether an aperture is formed in each of the lateral information sections Y1 and Y2 or in each of the indicators 900A to 900E will be explained. In the present embodiment, an example will be explained in which the tape color and the character color of the tape cassette 30 are identified as the color information of the tape cassette 30. Note that the tape color included in the color information indicates a base material color of the tape (the heat-sensitive paper tape 55, the print tape 57, or the double-sided adhesive tape 58). The character color included in the color information indicates an ink color of the ink ribbon 60 when thermal-transfer printing is performed using the ink ribbon 60. The character color also indicates a color developed by the heat-sensitive paper tape 55 when thermal printing that causes the heat-sensitive paper tape 55 to develop color is performed.

Color information element that each of the lateral information sections Y1 and Y2 indicates is determined in advance. In the present embodiment, the lateral information section Y1 is determined as a section that indicates information for identifying the tape color of the color information. The lateral information section Y2 is determined as a section that indicates information for identifying the character color of the color information. In this manner, the tape cassette 30 is structured such that a corresponding color information element can be identified with each of the lateral information sections alone, regardless of the structure of the other lateral information section.

Further, in a case where specific overlapping areas in the lateral information sections Y1 and Y2 function as the indicators 900A to 900E, the color information element that each of the indicators 900A to 900E indicates is determined in accordance with which of the lateral information sections Y1 and Y2 includes each of the indicators 900A to 900E. Accordingly, the indicators 900A to 900D are indicators for identifying the tape color of the color information, and the indicator 900E is an indicator for identifying the character color of the color information. In other words, the lateral information section Y1 and the indicators 900A to 900D each function as a tape color indicator portion, and the lateral information section Y2 and the indicator 900E each function as a character color indicator portion. A method for identifying the color information based on the indicators 900A to 900E will be described below as an example.

The tape color and the character color indicated by each of the indicator portions will be described with reference to Table 1 to Table 3. For explanatory purpose, in the Tables, a case where an aperture is formed in each of the indicators 900A to 900E is denoted by a value zero (0), and a case where each of the indicators 900A to 900E is a surface portion and no aperture is formed therein is denoted by a value one (1). Note that, in a case where the color information is identified based on a combination of the aperture(s) and the surface portion(s) formed in the lateral information sections Y1 and Y2, the method for identifying the major tape color described below may be used, with reference to a similar table in which the indicators 900B to 900D in Table 1 are respectively replaced with a combination of the aperture(s) and the surface portion(s) provided at three locations in the lateral information section Y1. The method for identifying the special tape color described below may be used, with reference to a similar table in which the indicators 900A to 900D in Table 2 are replaced with a combination of the aperture(s) and the surface portion(s) provided at four locations in the lateral information section Y1. The method for identifying the character color described below may be used, with reference to a similar table in which the indicator 900E in Table 3 is replaced with the aperture or the surface portion provided at one location in the lateral information section Y2.

TABLE 1

| Major Tape Color (Y1) | 900B (X2) | 900C (X3) | 900D (X4) |
|---|---|---|---|
| Clear | 1 | 1 | 0 |
| Blue | 0 | 1 | 1 |
| Black | 0 | 0 | 1 |

TABLE 2

| Special Tape Color (Y1) | 900A (X1) | 900B (X2) | 900C (X3) | 900D (X4) |
|---|---|---|---|---|
| White | 0 | 1 | 1 | 1 |
| Yellow | 1 | 0 | 1 | 0 |
| Red | 0 | 1 | 0 | 1 |

TABLE 3

| Character Color (Y2) | 900E (X3) |
|---|---|
| Black | 0 |
| Other than Black | 1 |

First, a method, performed by human visual check, for identifying the color of the tape mounted in the tape cassette 30 will be described. In the present embodiment, the indicators 900A to 900D (the indicators in the lateral information section Y1) indicate the tape color based on a combination of the aperture(s) and the surface portion(s). In particular, the tape color of the major tape that has a high likelihood of being mounted in the tape cassette 30 can be identified simply by visually checking the three indicators 900B to 900D. Further, the tape color for a special tape that has a low likelihood of being mounted in the tape cassette 30 can be identified by visually checking the four indicators 900A to 900D.

As shown in Table 1, corresponding to combinations of whether the indicators 900B to 900D, which form the tape color indicator portion, are each formed as an aperture or as a surface portion, three colors "clear" "blue" and "black" are respectively defined as major tape colors indicated by the combinations. Therefore, a person can recognize the tape color of the major tape mounted in the tape cassette 30 simply by visually checking, of the rear indicator portion 900, the indicators 900B to 900D within the lateral information section Y1.

More specifically, if the indicators 900B to 900D are respectively a surface portion, a surface portion, and an aperture (the combination of "1, 1, 0" in Table 1), it indicates that the tape color is "clear". If the indicators 900B to 900D are respectively an aperture, a surface portion, and a surface portion (the combination of "0, 1, 1" in Table 1), it indicates that the tape color is "blue". If the indicators 900B to 900D are respectively an aperture, an aperture, and a surface portion (the combination of "0, 0, 1" in Table 1), it indicates that the tape color is "black". For example, in the tape cassette 30 shown in FIG. 15, the indicators 900B to 900D are respectively an aperture, a surface portion, and a surface portion. Therefore, the tape color can be identified as "blue". In the tape cassette 30 shown in FIG. 16, the indicators 900B to 900D are respectively a surface portion, a surface portion, and an aperture. Therefore, the tape color can be identified as "clear".

The indicator 900C is provided in the vertical information section X3 that can be identified by using the reference line Z as a reference. Therefore, among the indicators 900A to 900D in the lateral information section Y1, the indicator 900C can most easily be identified by human visual check. Further, the indicators 900B and 900D that are respectively provided in the vertical information sections X2 and X4, which are located to the right and left of the vertical information section X3, can also easily be identified by human visual check. Therefore, the major tape color can be identified simply by checking the indicators 900B to 900D that can be identified by human visual check, among the indicators 900A to 900D in the lateral information section Y1.

As shown in Table 2, corresponding to combinations of whether the indicators 900A to 900D, which form the tape color indicator portion, are each formed as an aperture or a surface portion, three colors "white" "yellow" and "red" are respectively defined as special tape colors indicated by the combinations. Therefore, a person can recognize the tape color of the special tape mounted in the tape cassette 30 simply by visually checking the indicators 900A to 900D within the lateral information section Y1 of the rear indicator portion 900.

More specifically, if the indicators 900A to 900D are respectively an aperture, a surface portion, a surface portion, and a surface portion (the combination of "0, 1, 1, 1" in Table 2), it indicates that the tape color is "white". If the indicators 900A to 900D are respectively a surface portion, an aperture, a surface portion, and an aperture (the combination of "1, 0, 1, 0" in Table 2), it indicates that the tape color is "yellow". If the indicators 900A to 900D are respectively an aperture, a surface portion, an aperture, and a surface portion (the combination of "0, 1, 0, 1" in Table 2), it indicates that the tape color is "red". For example, in the tape cassettes 30 shown in FIG. 13 and FIG. 14, the indicators 900A to 900D are respectively an aperture, a surface portion, a surface portion, and a surface portion. Therefore, the tape color can be identified as "white".

As shown in Table 3, corresponding to whether the indicator 900E, which is the character color indicator portion, is formed as an aperture or a surface portion, "black" or "other than black" is defined as the character color. Therefore, a person can recognize the character color for the tape mounted in the tape cassette 30 by just visually checking the indicator 900E within the lateral information section Y2 of the rear indicator portion 900. More specifically, if the indicator 900E is an aperture ("0" in Table 3), it indicates that the character color is "black". If the indicator 900E is a surface portion ("1" in Table 3), it indicates that the character color is "other than black". For example, in the tape cassettes 30 shown in FIG. 13 to FIG. 16, the indicator 900E is an aperture. Therefore, the character color can be identified as "black".

In this manner, with the tape cassette 30 according to the present embodiment, regardless of whether the indicator 900E provided in the specified area R0 is formed as an aperture or a surface portion, with respect to the major tape colors shown in Table 1, a person can identify the tape color simply by visually checking the indicators 900B to 900D. With respect to the special tape colors shown in Table 2, the person can identify the tape color simply by visually checking the indicators 900A to 900D. With respect to the character colors shown in Table 3, regardless of whether each of the indicators 900A to 900D provided in the specified area R0 is an aperture or a surface portion, the person can identify the character color simply by visually checking the indicator 900E.

In the cassette case 31, the first and second tape housing areas 33A and 33B are provided to the rear, while the ink ribbon housing area 33C is provided to the front. Consequently, in the tape cassette 30 that uses the ink ribbon 60, the tape (the double-sided adhesive tape 58 in FIG. 3 and FIG. 4, and the print tape 57 in FIG. 5) and the ink ribbon 60 are aligned in the front-rear direction inside the cassette case 31, corresponding to the arrangement order in the front-rear direction of the lateral information sections Y1 and Y2. Therefore, the person can identify the base material color of the tape located to the rear of the ink ribbon, by visually checking the lateral information section Y1 that indicates the tape color, which is to the rear side of the lateral information section Y2. Further, the person can identify the ink color of the ink ribbon located to the front of the tape, by visually checking the lateral information section Y2 that indicates the character color, which is to the front side of the lateral information section Y1. Thus, based on the arrangement of the tape and the ink ribbon inside the cassette case 31, a person can accurately identify the color information indicated by the lateral information sections Y1 and Y2.

The contents of the color information (the tape color and the character color) indicated by each of the indicator portions are not limited to those shown in Table 1 to Table 3, and can be modified as necessary. Additionally, although the total number of combinations of the color information defined in Table 1 to Table 3 is twenty eight, all of the combinations need not necessarily be used. However, it may be preferable that the combination of the aperture(s) and the surface portion(s) corresponding to the color information is defined at least in accordance with the following rules.

First, it may be desirable that at least one of the indicators 900A, 900B and 900D, except the indicator 900C that can easily be identified using the reference line Z as a reference, is formed as an aperture, and at least one of the indicators 900A, 900B and 900D is formed as a surface portion. In this case, when a person visually checks the indicators 900A to 900D, it may be possible to improve visibility of the combination of the aperture(s) and the surface portion(s) of the indicators 900A to 900D, and it may be possible for the person to easily identify the combination.

Second, it may be desirable that the following two combinations are not employed. One is a combination in which all the indicators 900A to 900D within the lateral information section Y1 are surface portions. The other is a combination in which all the indicators 900A to 900E within the specified area R0 are surface portions. In such combinations, the entire rear indentation 68C may be formed as a surface portion in which only one aperture is formed at a position away from the rear wall 31C, or as a surface portion including no aperture. Then, it may be difficult for a person to ascertain that the rear indicator portion 900 is provided in the rear indentation 68C in the first place. Therefore, by providing at least one aperture in a position adjoining the rear wall 31C, it may be possible to make clear that the rear indicator portion 900 is provided in the rear indentation 68C.

Third, for the color information of the tape that has a high likelihood of being mounted in the tape cassette 30, it may be desirable that one of the indicators 900C and 900E that are aligned in the front-rear direction in the rear indentation 68C is an aperture, and the other indicator is a surface portion. In this case, the person can identify the element of the lateral information section Y2 by visually checking the rear indentation 68C as described above.

Fourth, when the tape color of the tape cassette 30 is identified by human visual check, regardless of whether the tape color is a major tape color or a special tape color, whether each of the indicators 900B to 900D is an aperture or a surface portion is necessary information to identify the tape color. Therefore, it may be preferable that the color information corresponding to the special tape colors shown in Table 2 does not include the color information corresponding to the major tape colors shown in Table 1. More specifically, it may be desirable that the color information of the special tape colors (refer to Table 2) does not include combinations in which the indicators 900B to 900D are "surface portion, surface portion, aperture", "aperture, surface portion, surface portion", and "aperture, aperture, surface portion". Thus, when a person visually checks the rear indentation 68C, it may be possible to clearly distinguish whether it is the major tape color or the special color, and it may be possible to easily identify the tape color.

The structure for the rear indicator portion 900 to indicate the color information, and the method for identifying the color information by a person visually checking the rear indicator portion 900 are described above. Hereinafter, the structure of the rear indicator portion 900 in relation to the rear detecting switches 310 of the tape printer 1, and color information identification by the rear detecting switches 310 will be described.

First, the structure of the rear indicator portion 900 in relation to the rear detecting switches 310 of the tape printer 1 will be described. As described above, in the tape printer 1 of the present embodiment, the rear detection portion 300 provided in the rear support portion 8C has the five rear detecting switches 310A to 310E (refer to FIG. 2 and FIG. 7). In the tape cassette 30, the overlapping areas that respectively face the rear detecting switches 310A to 310E when the tape cassette 30 is installed in the cassette housing portion 8 are formed as the indicators 900A to 900E (refer to FIG. 13 and FIG. 14).

When the aperture opposes the rear detecting switch 310, the switch terminal 322 of the rear detecting switch 310 can be inserted into and removed from the aperture, and the aperture functions as the non-pressing portion 901 that does not press the switch terminal 322. The non-pressing portion 901 is formed as a through-hole that has a circular shape in a plan view and matches the size of the indicator (overlapping area). The rear detecting switch 310 that opposes the non-pressing portion 901 remains in an off state, as the switch terminal 322 is inserted in the non-pressing portion 901.

When the surface portion opposes the rear detecting switch 310, the surface portion functions as the pressing portion 902 that presses the switch terminal 322. The rear detecting switch 310 that opposes the pressing portion 902 is changed to an on state, as the switch terminal 322 contacts with the pressing portion 902. In the examples shown in FIG. 13 and FIG. 14, the indicators 900A and 900E are the apertures (namely, the non-pressing portions 901), and the indicators 900B to 900D are the surface portions (namely, the pressing portions 902).

As described above with reference to Table 1 to Table 3, either an aperture (the non-pressing portion 901) or a surface portion (the pressing portion 902) is formed in each of the indicators 900A to 900E of the rear indicator portion 900, in accordance with a prescribed pattern that corresponds to the color information. Accordingly, the tape printer 1 can identify the color information based on the combination of the on and off states of the rear detecting switches 310 that are selectively pressed by the rear indicator portion 900. More specifically, the prescribed pattern (the combination of the aperture(s) and the surface portion(s)) that is defined in advance for the indicators 900A to 900E as described above can be converted to a detection pattern (the combination of the on and off states) of the corresponding rear detecting switches 310A to 310E. Then, the tape printer 1 can identify the color information with reference to a table in which each detection pattern is associated with the color information.

A color information table 520 shown in FIG. 20 is an example of a table used in the tape printer 1 to identify the color information, and is stored in the ROM 402 of the tape printer 1. The color information of the tape cassette 30 is defined in the color information table 520 in accordance with the combination of the on and off states of the five rear detecting switches 310A to 310E. In the color information table 520 shown in FIG. 20, the rear detecting switches 310A to 310E respectively correspond to switches "ST1" to "ST5", and the off state (OFF) and the on state (ON) of each of the rear detecting switches 310 correspond to the values zero "0" and one "1", respectively.

The color information table 520 of the present embodiment includes a plurality of color tables to respectively identify different color information corresponding to different detection patterns of the rear detecting switches 310A to 310E. In the example shown in FIG. 20, the color information table 520 includes a first color table 521 and a second color table 522. In the first color table 521, first color information is defined in association with detection patterns of the rear detecting switches 310A to 310E. In the second color table 522, second color information is defined in association with the detection patterns of the rear detecting switches 310A to 310E. In the present embodiment, the first color table 521 is a standard color table that includes the color information that is frequently used, and the second color table 522 is a special color table that includes the color information that is less frequently used. In the tape printer 1, the first color table 521 and the second color table 522 are selectively used, and the color information (the first color information or the second color information) is identified in accordance with the detection pattern of the rear detecting switches 310A to 310E, as will be described later.

The table that can be used in the tape printer 1 is not limited to the color information table 520 shown in FIG. 20. For example, any selected color information may be newly added corresponding to "spare" field in the color information table 520. In addition, the color information that is recorded in the color information table 520 may be deleted, the correspondence between each detection pattern and the color information may be changed, or the content of the color information corresponding to each detection pattern may be changed. In such a case, the above-described pattern of the aperture(s) that is determined for identification of the color information by a visual check may also be changed as necessary.

Next, detection modes of the tape type of the tape cassette 30 by the tape printer 1 will be explained with reference to FIG. 3 to FIG. 6, FIG. 17 and FIG. 18.

First, detection modes of the arm indicator portion 800 by the arm detection portion 200 will be explained with reference to FIG. 3 to FIG. 6 and FIG. 17. When the tape cassette 30 is installed at the proper position in the cassette housing portion 8 by the user and the cassette cover 6 is closed, the platen holder 12 moves from the stand-by position (refer to FIG. 3) to the print position (refer to FIG. 4 to FIG. 6). Then, the arm detection portion 200 and the latching piece 225 provided on the cassette-facing surface 12B of the platen holder 12 move to the positions that respectively oppose the arm indicator portion 800 and the latching hole 820 provided on the arm front wall 35 of the tape cassette 30.

In a case where the tape cassette 30 is installed in the cassette housing portion 8 at the proper position, the latching piece 225 is inserted into the latching hole 820. As a result, the latching piece 225 does not interfere with the tape cassette 30, and the switch terminals 222 of the arm detecting switches 210 that protrude from the cassette-facing surface 12B oppose the indicators 800A to 800E (the non-pressing portions 801 and the pressing portion 802) that are provided at the corresponding positions in the arm indicator portion 800, and are selectively pressed. More specifically, the arm detecting switch 210 opposing the non-pressing portion 801 remains in the off state by being inserted into the aperture that is the non-pressing portion 801. The arm detecting switch 210 opposing the pressing portion 802 is changed to the on state by being pressed by the surface portion of the arm front wall 35 that is the pressing portion 802.

Figure 17:
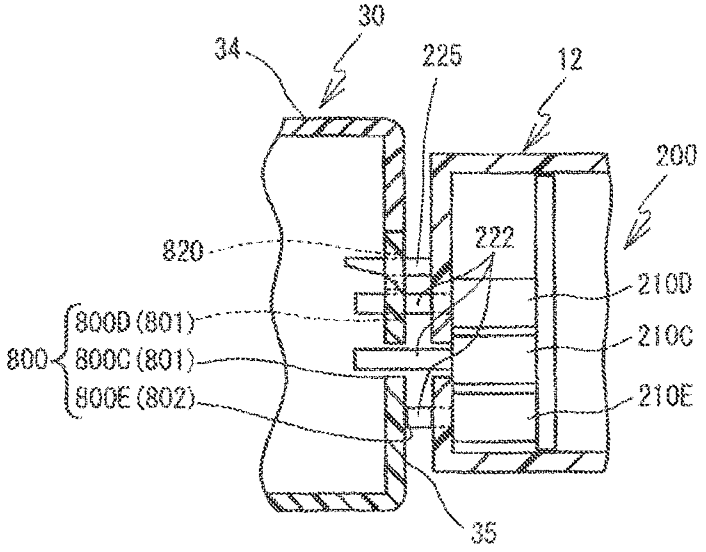
FIG. 17 is a cross-sectional view taken along a line III-III in FIG. 8 as seen in the direction of the arrows, and illustrates a state where the arm detection portion 200 shown in FIG. 8 opposes an arm indicator portion 800 shown in FIG. 12.

For example, in a case where the tape cassette 30 shown in FIG. 2 and FIG. 10 to FIG. 14 is installed at the proper position in the cassette housing portion 8, the arm detecting switches 210A, 210C and 210D are in the off state (0), because they respectively oppose the indicators 800A, 800C and 800D that are the non-pressing portions 801, as shown in FIG. 17. On the other hand, the arm detecting switches 210B and 210E are in the on state (1), because they respectively oppose the indicators 800B and 800E that are the pressing portions 802. More specifically, the values that indicate the on and off states of the arm detecting switches 210A to 210E are identified as "0", "1", "0", "0", "1", respectively.

In the tape printer 1, based on the detection pattern of the arm detection portion 200 (here, the combination of the on and off states of the five arm detecting switches 210A to 210E), the print information is identified as the tape type of the tape cassette 30. In the present embodiment, the print information of the tape cassette 30 includes the tape width and the print mode. The "tape width" included in the print information indicates one of seven types of tape width from 3.5 mm to 36 mm. The "print mode" included in the print information indicates whether the print mode is a mirror image printing mode (laminated) or a normal image printing mode (receptor).

The ROM 402 of the tape printer 1 stores a print information table (not shown in the figures) in which the print information of the tape cassette 30 is defined in association with the combinations of the on and off states of the five arm detecting switches 210A to 210E. In the above-described example, with reference to the print information table (not shown in the figures), for example, "tape width: 36 mm, print mode: laminated" is identified as the print information in accordance with the on and off states "0", "1", "0", "0", "1" of the arm detecting switches 210A to 210E.

Next, detection modes of the rear indicator portion 900 by the rear detection portion 300 will be explained with reference to FIG. 18. When the tape cassette 30 is installed at the proper position in the cassette housing portion 8 by the user, the rear detection portion 300 provided in the rear support portion 8C of the tape printer 1 opposes the rear indicator portion 900 provided in the rear indentation 68C of the tape cassette 30. More specifically, the switch terminals 322 (refer to FIG. 2 and FIG. 7) of the rear detecting switches 310 that protrude from the rear support portion 8C oppose the indicators (the non-pressing portion 901 and the pressing portion 902) provided at the corresponding positions in the rear indicator portion 900, and are selectively pressed. Consequently, the rear detecting switch 310 that opposes the non-pressing portion 901 is inserted in the non-pressing portion 901, and remains in an off state. Meanwhile, the rear detecting switch 310 that opposes the pressing portion 902 is pressed by the pressing portion 902, and is changed to an on state.

Figure 18:
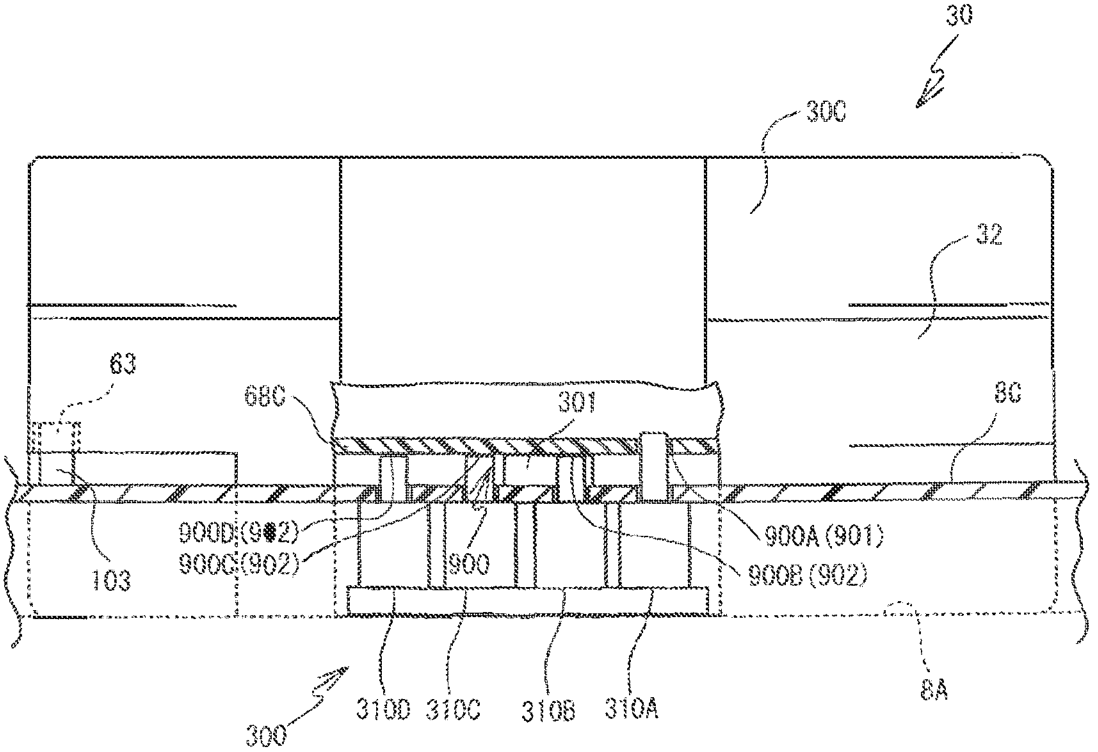
FIG. 18 is a cross-sectional view taken along a line II-II in FIG. 4 as seen in the direction of the arrows, and illustrates a state where a rear detection portion 300 shown in FIG. 7 opposes a rear indicator portion 900 shown in FIG. 13.

For example, in a case where the tape cassette 30 shown in FIG. 2 and FIG. 10 to FIG. 14 is installed at the proper position in the cassette housing portion 8, as shown in FIG. 18, the rear detecting switches 310A and 310E respectively oppose the indicators 900A and 900E, which are the non-pressing portions 901, and therefore remain in the off state. Meanwhile, the rear detecting switches 310B to 310D respectively oppose the indicators 900B to 900D, which are the pressing portions 902, and are therefore changed to the on state. Consequently, the on and off states of the switches "ST1" to "ST5" that respectively correspond to the rear detecting switches 310A to 310E are identified as "0", "1", "1", "1" "0", respectively.

In the tape printer 1, the color information is identified as the tape type of the tape cassette 30, based on the detection pattern (here, the combination of the on and off states of the five rear detecting switches 310A to 310E) of the rear detection portion 300. In the above-described example, with reference to the above-described color information table 520 (refer to FIG. 20), the color information corresponding to the on and off states "0", "1", "1", "1" "0" of the rear detecting switches 310A to 310E is identified. However, the identified color information varies depending on which of the color tables 521 and 522 included in the color information table 520 is used. Here, the standard first color table 521 is used in accordance with the off state of the arm detecting switch 210D to be described later, and the color information "tape color: white, character color: black" is identified similarly to the above-described identification result by a visual check.

Next, processing relating to printing performed in the tape printer 1 according to the present embodiment will be explained with reference to FIG. 19. The processing relating to printing shown in FIG. 19 is performed by the CPU 401 based on programs stored in the ROM 402 when the power source of the tape printer 1 is switched on.

Figure 19:
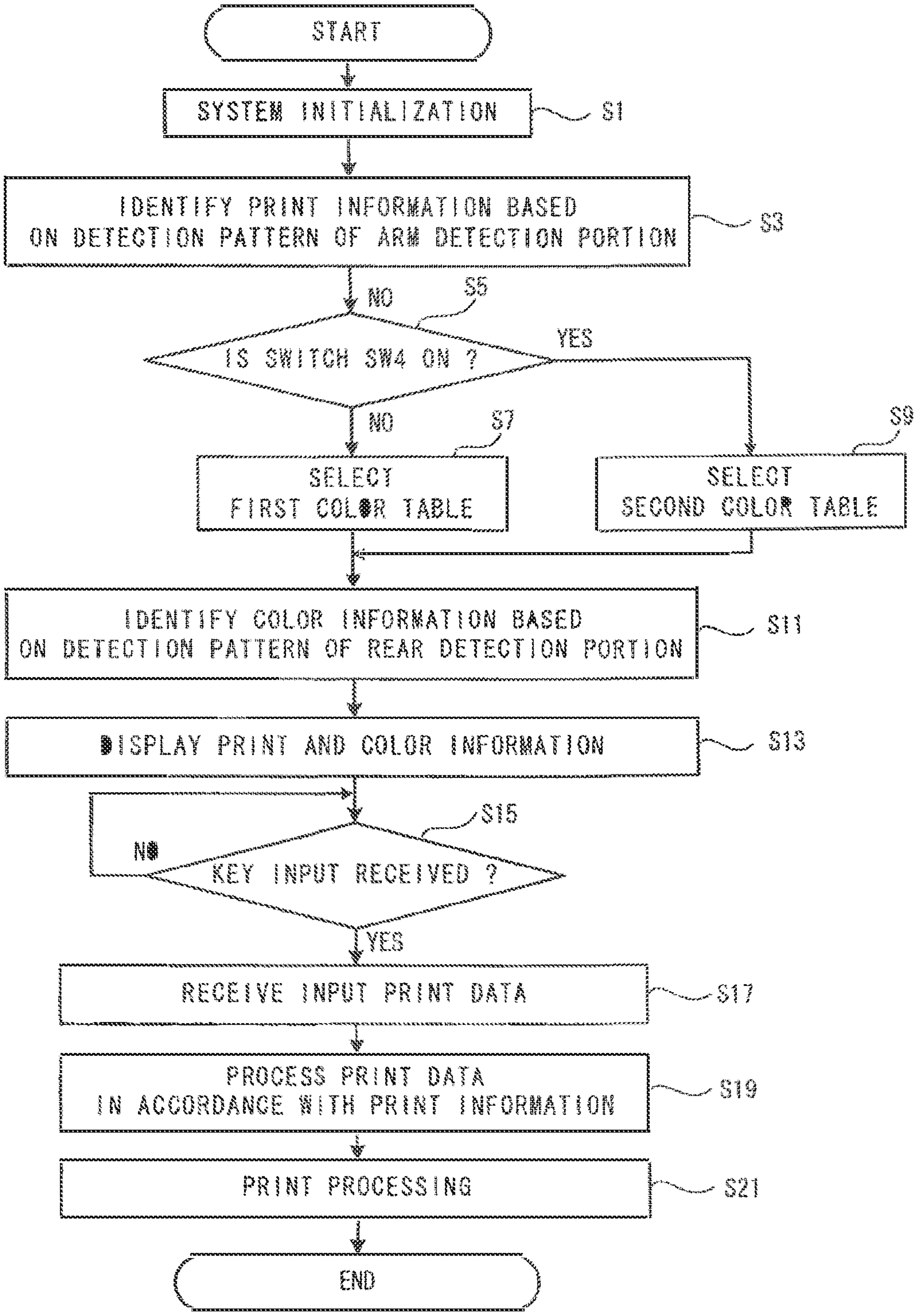
FIG. 19 is a flowchart showing processing relating to printing of the tape printer 1.

As shown in FIG. 19, in the processing relating to printing, first, system initialization of the tape printer 1 is performed (step S1). For example, in the system initialization performed at step S1, the text memory in the RAM 404 is cleared, and a counter is initialized to a default value.

Next, the print information of the tape cassette 30 is identified based on the detection pattern of the arm detection portion 200 (namely, based on the combination of the on and off states of the arm detecting switches 210) (step S3). At step S3, as described above, with reference to the print information table (not shown in the figures) stored in the ROM 402, the print information corresponding to the combination of the on and off states of the arm detecting switches 210A to 210E is identified.

Then, it is determined whether or not the arm detecting switch 210D (hereinafter referred to as the switch SW4), among the plurality of arm detecting switches 210, is in the on state (step S5). When the switch SW4 is in the off state (no at step S5), the first color table 521 is selected from among the color tables included in the color information table 520 stored in the ROM 402 (step S7). When the switch SW4 is in the on state (yes at step S5), the second color table 522 is selected from among the color tables included in the color information table 520 stored in the ROM 402 (step S9).

Next, the color information of the tape cassette 30 is identified based on the detection pattern of the rear detection portion 300 (namely, based on the combination of the on and off states of the plurality of rear detecting switches 310) (step S11). At step S11, with reference to the color table selected at step S7 or at step S9, the color information corresponding to the combination of the on and off states of the plurality of rear detecting switches 310 is identified. In the present embodiment, in the tape cassette 30 of the tape type that is manufactured in large quantities, the indicator 800D corresponding to the arm detecting switch 210D is formed as the non-pressing portion 801. For that reason, at step S11, in many cases, the color information is identified with reference to the standard first color table 521.

Thus, in the present embodiment, the color table to be used to identify the color information of the tape cassette 30 is selected in accordance with the detection state of a particular arm detecting switch 210 (here, the on or off state of the arm detecting switch 210D). Therefore, without increasing the number of the rear detecting switches 310 (namely, without increasing the area occupied by the rear detection portion 300), it may be possible to increase the number of color information patterns that can be identified by the tape printer 1.

In the processing relating to printing (refer to FIG. 19), the print information identified at step S3 and the color information identified at step S11 are displayed on the display 5 as text information (step S13). In a case where the above-described tape cassette 30 (refer to FIG. 2 and FIG. 10 to FIG. 14) is properly installed, the display 5 displays a message that reads, for example, "A 36 mm laminated-type tape cassette has been installed. The tape color is white and the character color is black."

Next, it is determined whether there is any input from the keyboard 3 (step S15). If there is an input from the keyboard 3 (yes at step S15), the CPU 401 receives the characters input from the keyboard 3 as print data, and stores the print data (text data) in the text memory of the RAM 404 (step S17). If there is no input from the keyboard 3 (no at step S15), the processing returns to step S15 and the CPU 401 waits for an input from the keyboard 3.

Then, if there is an instruction to start printing from the keyboard 3, for example, the print data stored in the text memory is processed in accordance with the print information identified at step S3 (step S19). For example, at step S19, the print data is processed such that a print range and a print size corresponding to the tape width identified at step S3, and a print position corresponding to the print mode (the mirror image printing mode or the normal image printing mode) identified at step S3 are incorporated. Based on the print data processed at step S19, print processing is performed on the tape that is the print medium (step S21). After the print processing is performed, the processing relating to printing (refer to FIG. 19) ends.

The above-described print processing (step S21) will be explained below more specifically. In a case where the laminated type tape cassette 30 shown in FIG. 3 and FIG. 4 is installed, the tape drive roller 46, which is driven to rotate via the tape drive shaft 100, pulls out the film tape 59 from the second tape spool 41 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed. The film tape 59 that has been pulled out from the second tape spool 41 passes the outer edge of the ribbon spool 42 and is fed along the feed path within the arm portion 34.

Then, the film tape 59 is discharged from the exit 34A toward the head insertion portion 39 in a state in which the ink ribbon 60 is joined to the surface of the film tape 59. The film tape 59 is then fed between the thermal head 10 and the platen roller 15 of the tape printer 1. Then characters are printed onto the print surface of the film tape 59 by the thermal head 10. Following that, the used ink ribbon 60 is separated from the printed film tape 59 at the guide wall 47 and wound onto the ribbon take-up spool 44.

Meanwhile, the double-sided adhesive tape 58 is pulled out from the first tape spool 40 by the tape drive roller 46 moving in concert with the movable feed roller 14. While being guided and caught between the tape drive roller 46 and the movable feed roller 14, the double-sided adhesive tape 58 is layered onto and affixed to the print surface of the printed film tape 59. The printed film tape 59 to which the double-sided adhesive tape 58 has been affixed (namely, the printed tape 50) is then fed toward the tape discharge portion 49, discharged from the discharge portion 49, and is cut by the cutting mechanism 17.

In a case where the receptor type tape cassette 30 shown in FIG. 5 is installed, the tape drive roller 46, which is driven to rotate via the tape drive shaft 100, pulls out the print tape 57 from the first tape spool 40 by moving in concert with the movable feed roller 14. Further, the ribbon take-up spool 44, which is driven to rotate via the ribbon take-up shaft 95, pulls out the unused ink ribbon 60 from the ribbon spool 42 in synchronization with the print speed. The print tape 57 that has been pulled out from the first tape spool 40 is bent in the leftward direction in the front right portion of the cassette case 31, and fed along the feed path within the arm portion 34.

Then, the print tape 57 is discharged from the exit 34A toward the head insertion portion 39 in a state in which the ink ribbon 60 is joined to the surface of the print tape 57. The print tape 57 is then fed between the thermal head 10 and the platen roller 15 of the tape printer 1. Then, characters are printed onto the print surface of the print tape 57 by the thermal head 10. Following that, the used ink ribbon 60 is separated from the printed print tape 57 at the guide wall 47 and wound onto the ribbon take-up spool 44. Meanwhile, the printed print tape 57 (in other words, the printed tape 50) is then fed toward the tape discharge portion 49, discharged from the discharge portion 49, and is cut by the cutting mechanism 17.

In a case where the thermal type tape cassette 30 shown in FIG. 6 is installed, when printing is performed, the tape drive roller 46, which is driven to rotate via the tape drive shaft 100, pulls out the heat-sensitive paper tape 55 from the first tape spool 40 by moving in concert with the movable feed roller 14. The heat-sensitive paper tape 55 that has been pulled out from the first tape spool 40 is bent in the leftward direction in the front right portion of the cassette case 31, and is fed along the feed path within the arm portion 34.

Then, the heat-sensitive paper tape 55 is discharged from the exit 34A of the arm portion 34, and is then fed between the thermal head 10 and the platen roller 15. Then, characters are printed onto the print surface of the heat-sensitive paper tape 55 by the thermal head 10. Following that, the printed heat-sensitive paper tape 55 (namely, the printed tape 50) is further fed toward the tape discharge portion 49 by the tape drive roller 46 moving in concert with the movable feed roller 14, discharged from the discharge portion 49, and is cut by the cutting mechanism 17.

In the above-described print processing (step S21), in a case where the laminated type tape cassette 30 is installed, mirror image printing is performed. In mirror image printing, the ink of the ink ribbon 60 is transferred onto the film tape 59 such that the characters are shown as a mirror image. On the other hand, in a case where the receptor type tape cassette 30 is installed, normal image printing is performed. In normal image printing, the ink of the ink ribbon 60 is transferred onto the print tape 57 such that the characters are shown as a normal image. Further, in a case where the thermal type tape cassette 30 is installed, thermal type normal image printing is performed on the heat-sensitive paper tape 55 such that the characters are color developed as a normal image.

In the present embodiment, the print mode "laminated" is applied to the tape cassette 30 with which mirror image printing is performed, while the print mode "receptor" is applied to the tape cassette 30 with which normal image printing is performed. For that reason, the print mode "receptor" is applied not only to the receptor type tape cassette 30 shown in FIG. 5, but also to the thermal type tape cassette 30 shown in FIG. 6.

Through the above-described processing relating to printing (refer to FIG. 19), the tape type of the tape cassette 30 installed in the cassette housing portion 8 is identified by the tape printer 1, based on the detection pattern of the arm detection portion 200 and the detection pattern of the rear detection portion 300. More specifically, the arm detecting switches 210A to 210E on the arm detection portion 200 are selectively pressed by the arm indicator portion 800 provided on the arm front wall 35 of the tape cassette 30, and the print information of the tape cassette 30 is thus identified. Further, the rear detecting switches 310A to 310E on the rear detection portion 300 are selectively pressed by the rear indicator portion 900 provided on the bottom wall 30B (more specifically, the rear indentation 68C) of the tape cassette 30, and the color information of the tape cassette 30 is thus identified.

As described above, the tape cassette 30 according to the present embodiment is structured such that when a person looks at the tape cassette 30 alone, the person can identify the tape type (here, the color information) by visually checking the rear indentation 68C. In addition, the tape cassette 30 is structured such that when the tape cassette 30 is installed in the cassette housing portion 8 of the tape printer 1, the tape printer 1 can identify the tape type with the rear detection portion 300 detecting information indicated by the rear indicator portion 900. Of the foregoing structures, as a result of structuring the tape cassette 30 such that a person can recognize the color information by visually checking the rear indicator portion 900, the following effects may be particularly exhibited.

In a conventional manufacturing method for tape cassettes, it is a general practice to house a tape or the like in a cassette case in accordance with a type of a tape cassette. For example, in accordance with the color information (a combination of the tape color and the character color) of the tape to be mounted in the tape cassette, a worker mounts, in the cassette case, a tape whose base material color matches the tape color, and an ink ribbon with an ink color that matches the character color. However, there are a variety of combinations of tape colors and character colors. Therefore, when tape cassettes are manufactured, the worker may mistakenly mount a tape or an ink ribbon that does not correspond to the color information of the tape or the ink ribbon to be mounted in the tape cassette.

With the tape cassette 30 according to the present embodiment, in the manufacturing process of the tape cassette 30, a worker can check the rear indicator portion 900, by visually checking the rear indentation 68C from above before assembling the top case 31A. Alternatively, the worker may check the rear indicator portion 900 by turning over the bottom case 31B before mounting a tape or the like, and visually checking the rear indentation 68C from the bottom side of the cassette case 31. Therefore, the worker can identify the color information intended for the cassette case 31, and can ascertain the tape color and the character color of the tape or the like that should be housed in the cassette case 31. As a consequence, in the manufacturing process of the tape cassette 30, the worker can work while confirming the contents to be housed in the cassette case 31, and thus errors in the manufacture of the tape cassette 30 may be reduced.

Furthermore, after the tape cassettes 30 has been shipped from the plant, even if the tape type or the like written on a label cannot be read for some reason, the worker can recognize the color information by visually checking the tape cassette 30 from the bottom surface side. Therefore, the worker can easily select the tape cassette 30 having desired color information from among a plurality of the tape cassettes 30.

In addition, the rear indicator portion 900 indicates the color information using a simple structure formed of a combination of a presence and an absence of an aperture (namely, a combination of the non-pressing portion(s) 901 and the pressing portion(s) 902) in each of the lateral information sections Y1 and Y2. Therefore, the rear indicator portion 900 may be formed easily on the cassette case 31 in advance. For that reason, at the time of manufacture of the cassette case 31, there may be no need to print the contents to be housed in the cassette case 31, nor to affix labels to indicate the contents, and therefore errors in the manufacture of the tape cassette 30 can be reduced at a low cost.

Moreover, in the present embodiment, the laminated type tape cassette 30 formed from the general purpose cassette is used in the general purpose tape printer 1. Therefore, a single tape printer 1 can be used with each type of the tape cassette 30, such as the thermal type, the receptor type, and the laminated type etc., and it may not be necessary to use the different tape printer 1 for each type. Furthermore, the tape cassette 30 is normally formed by injecting plastic into a plurality of combined dies. In the case of the tape cassette 30 that corresponds to the same tape width, common dies can be used, except for the die including the portion that forms the rear indicator portion 900. Thus, costs may be significantly reduced.

In the example described above, the specified area R0 of the rear indentation 68C includes overlapping areas that function as the indicators 900A to 900E, each of which includes either an aperture (namely, the non-pressing portion 901) or a surface portion (namely, the pressing portion 902) corresponding to the color information. In such a case, in the specified area R0, an aperture and a surface portion may be formed freely as long as the functions of the indicators 900A to 900E are maintained.

More specifically, with the above-described tape cassette 30 shown in FIG. 2 and FIG. 10 to FIG. 14, all the areas in the specified area R0 that do not function as the indicators 900A to 900E are surface portions that are in the same plane as the pressing portions 902. Therefore, the apertures (the non-pressing portions 901) provided in the specified area R0 are formed separately from each other. However, it may not be necessary that the apertures are all separated from each other. For example, one aperture (groove) having a size and shape that include at least two of the non-pressing portions 901 may be formed in the specified area R0. Note, however, that in a case where one groove is formed, the groove needs to be formed such that the groove does not include a part that functions as the pressing portion 902.

Figure 21:
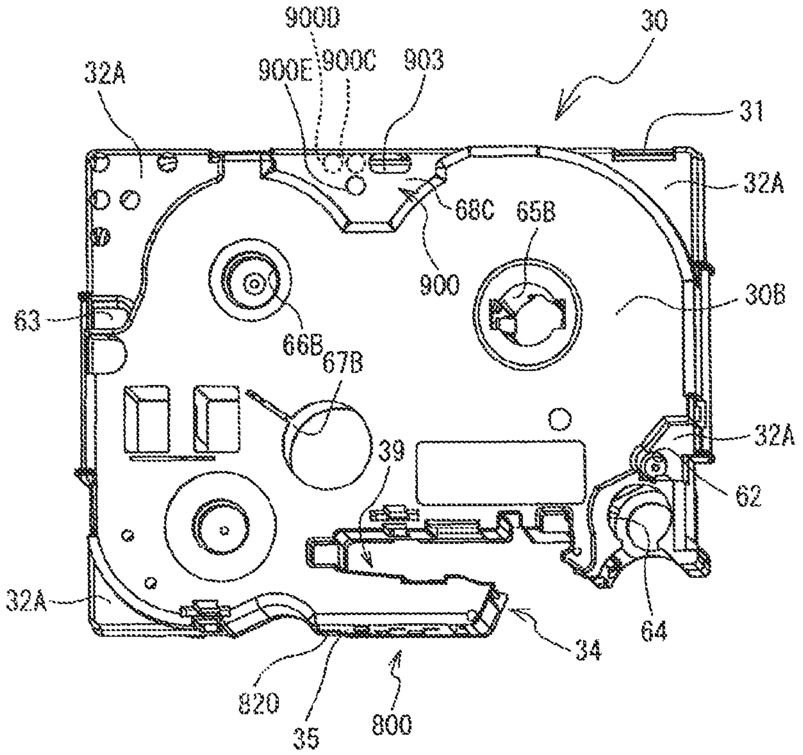
FIG. 21 is an external perspective view of a tape cassette 30 according to a modified example, as seen from the bottom surface side.
Figure 22:
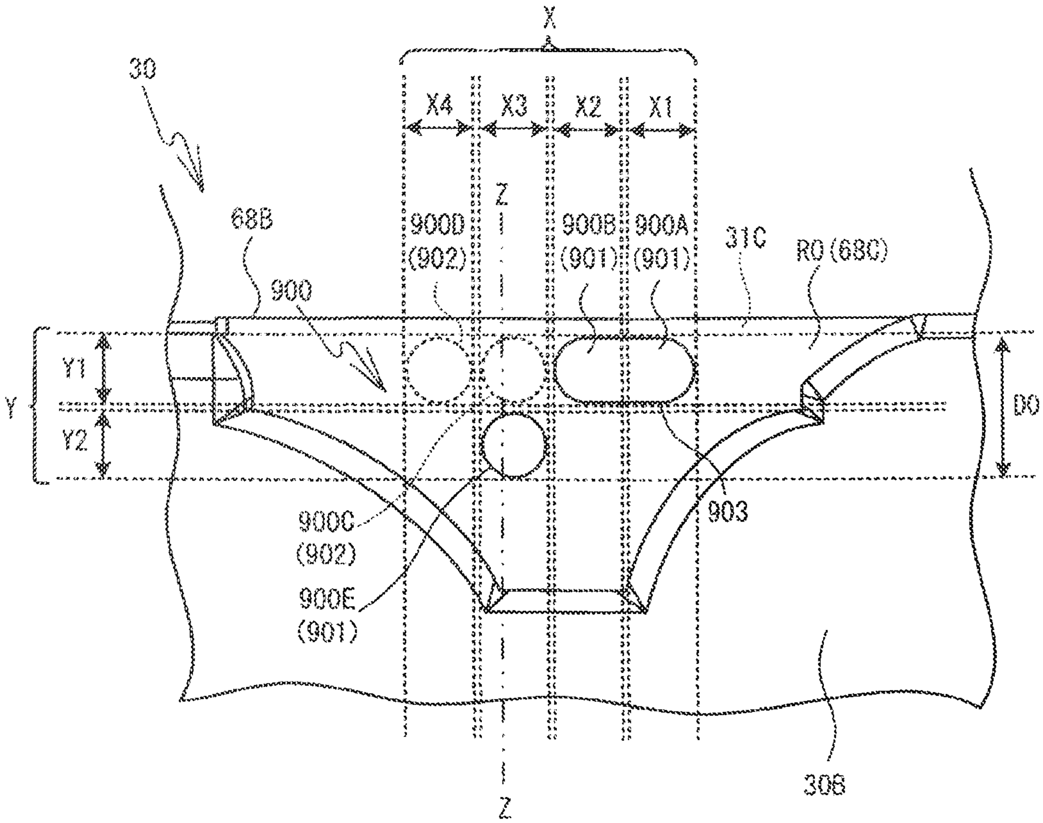
FIG. 22 is a bottom view of the tape cassette 30 according to the modified example, in which the rear indentation 68C is enlarged.
Figure 23:
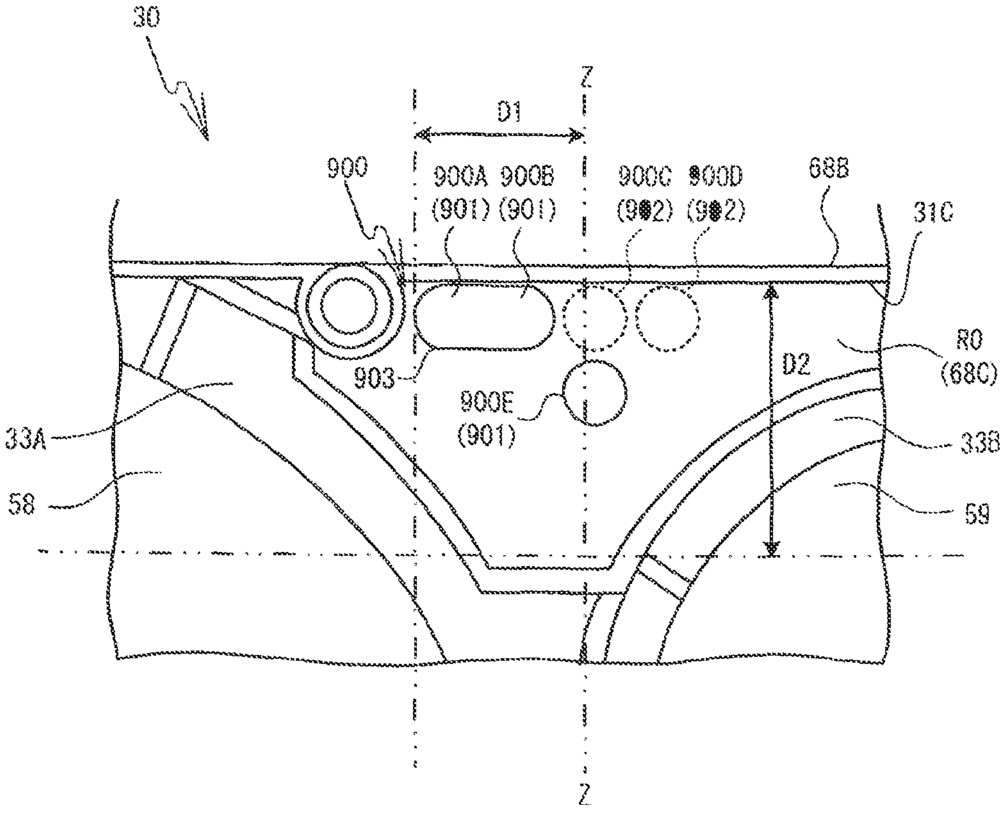
FIG. 23 is a plan view of the tape cassette 30 according to the modified example, in which the rear indentation 68C is enlarged with the top case 31A removed.

FIG. 21 to FIG. 23 show an example of the tape cassette 30 in which each of the non-pressing portions 901 provided in the indicators 900A and 900B are made continuous to form a groove 903. In the tape cassette 30 shown in FIG. 21 to FIG. 23, the indicators 900A to 900E are respectively, an aperture, an aperture, a surface portion, a surface portion, and an aperture. Therefore, the tape color is identified as "blue" and the character color is identified as "black", by either detection of the rear detecting switches 310 or by human visual check.

As in the example shown in FIG. 21 to FIG. 23, with the tape cassette 30 in which the plurality of non-pressing portions 901 provided in the lateral information section Y1 are made continuous to form the groove 903, when element identification of the lateral information section Y2 is performed by visually checking the rear indentation 68C from above or underneath, the groove 903 is treated as one aperture. Therefore, if the aperture that is closest to the reference line Z is the groove 903, this groove 903 serves as the reference aperture, and the end (the left end in FIG. 23) that is farthest from the reference line Z in the groove 903 serves as the reference end. Therefore, even when the groove 903 is provided in the lateral information section Y1, element identification of the lateral information section Y2 can be performed by visually checking the rear indentation 68C in a similar manner to that described above.

The tape cassette 30 and the tape printer 1 of the present invention are not limited to those in the above-described embodiment, and various modifications and alterations may of course be made insofar as they are within the scope of the present invention.

The shape, size, number and arrangement pattern of the non-pressing portion(s) 901 and the pressing portion(s) 902 of the rear indicator portion 900 are not limited to the examples represented in the above-described embodiment, but can be modified as appropriate. For example, in the above-described embodiment, the non-pressing portion 901 (aperture) of the rear indicator portion 900 is a through-hole that has a circular shape in a plan view and that is provided to occupy almost the entire overlapping area functioning as each of the indicators 900A to 900E. However, the non-pressing portion 901 can be modified in a range of size and shape that substantially fully includes the overlapping area functioning as each of the indicators 900A to 900E. For example, the non-pressing portion 901 may be a through-hole that has a square shape in a plan view that substantially matches the overlapping area, or the non-pressing portion 901 may have any other different shape.

Figure 24:
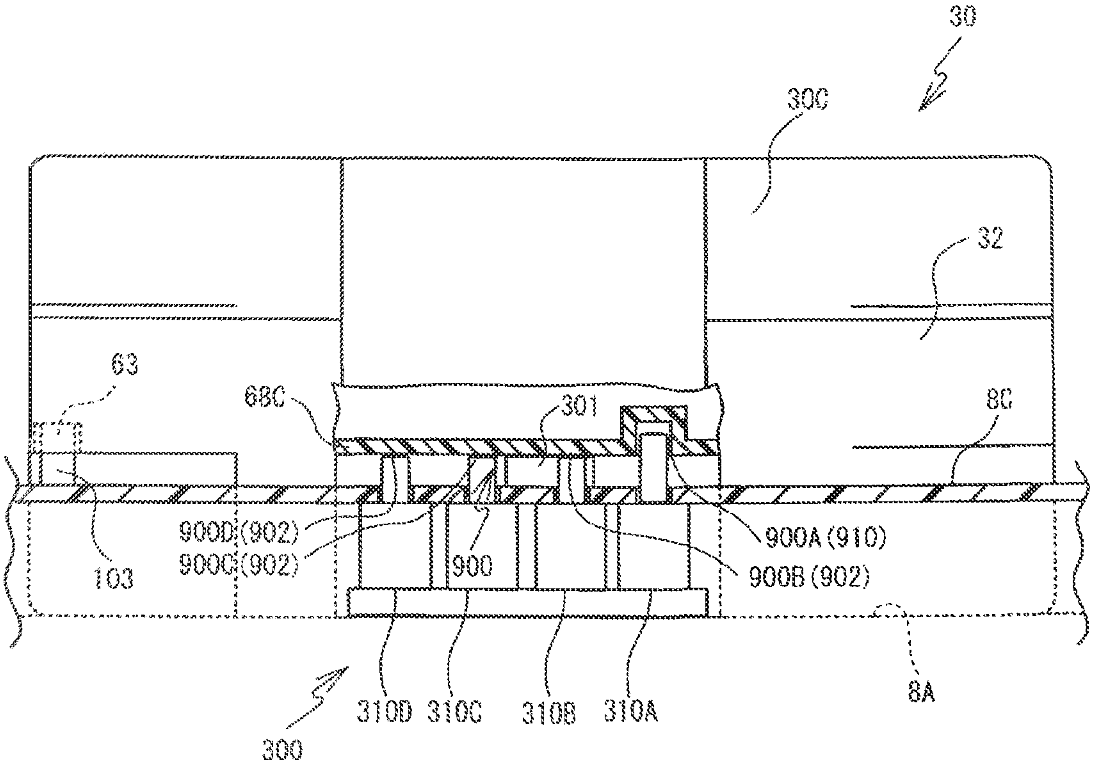
FIG. 24 is a cross-sectional view taken along the line II-II in FIG. 4 as seen in the direction of the arrows, and shows the tape cassette 30 according to the modified example.

Further, the non-pressing portion provided on the rear indicator portion 900 need not necessarily be a through-hole, but may be an indentation 910 formed in the rear indentation 68C, as shown in FIG. 24. In the example shown in FIG. 24, when a person visually checks the rear indentation 68C from underneath, the non-pressing portion 901 (the indentation 910) that is indented upward from the rear indentation 68C is recognized as an aperture, similarly to the case where the non-pressing portion 901 is formed as a through-hole. On the other hand, when the person visually checks the rear indentation 68C from above, the non-pressing portion 901 (the recess 910) that protrudes upward in a generally cylindrical shape from the rear indentation 68C is recognized as a protrusion, not as an aperture. Therefore, when the person visually checks the rear indentation 68C from above, by recognizing, instead of the aperture, the protrusion formed by the non-pressing portion 901 (the recess 910), the person can identify the color information indicated by the rear indicator portion 900, in a similar manner to that described above.

Further, the color information table 520 includes the first color table 521 and the second color table 522, and either the first color table 521 or the second color table 522 is selected based on the detection result of the arm detecting switch 210D. However, the color information table 520 may include a single color table.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette comprising:

a cassette case having a first end portion and a second end portion separated from the first end portion in a first direction, the cassette case including:

a first spool positioned in the cassette case, the first spool on which a tape is wound, and the first spool positioned closer to a third end portion of the cassette case in a second direction than to a fourth end portion being separated from the third end portion in the second direction, the first spool positioned closer to the second end portion than to the first end portion in the first direction;

a second spool positioned in the cassette case, the second spool on which an ink ribbon is wound, the second spool positioned closer to the fourth end portion than to the third end portion in the second direction, and the ink ribbon positioned closer to the first end portion than to the second end portion in the first direction;

a tape drive roller rotatable about an axis extending in a third direction, the drive roller allowing the tape to be discharged from inside of the cassette case, the tape drive roller positioned closer to the first end portion of the cassette case in the first direction than to the second end portion, the tape drive roller positioned closer to the third end portion of the cassette case than the fourth end portion of the cassette in the second direction, and an arm positioned at the first end portion, the arm extending in the second direction, the arm having a first outer surface facing a portion of the cassette case in the first direction and a second outer surface opposite side of the first outer surface in the first direction, and the arm has an exit allowing the ink ribbon to be discharged toward the tape drive roller from inside of the cassette case, wherein the cassette case has a third outer surface and a fourth outer surface being separated from the third outer surface in the third direction, wherein a portion of the third outer surface being positioned closer to the second end portion than the first end portion in the second direction, the portion of the third outer surface positioned outside of the first spool and the second spool, wherein the cassette case has a first aperture and a second aperture positioned at the portion of the third outer surface, wherein the first aperture extending in the third direction toward the fourth outer surface in the third direction, wherein the second aperture extending in the third direction toward the fourth outer surface in the third direction, and wherein the second aperture is separated from the first aperture in the second direction, and wherein a shape of the second aperture is different from a shape of the first aperture in the second direction.

2. The tape cassette according to claim 1, wherein a length of the second aperture in the second direction is greater than a length of the first aperture in the second direction.

3. The tape cassette according to claim 1, wherein the cassette case further includes:

a third spool positioned in the cassette case, the third spool on which a film tape is wound, the third spool positioned closer to the fourth end portion than to the third end portion in the second direction and the third spool positioned closer to the second end portion than to the first end portion in the first direction;

wherein the portion of the third outer surface is positioned outside of the third spool.

4. The tape cassette according to claim 1, further comprising:

a tape guide positioned at the first end portion, the tape guide positioned closer to the third end portion than the arm in the second direction, the tape guide guiding a portion of the tape which is discharged from the exit, the portion of the tape between the arm and tape guide being exposed.

5. The tape cassette according to claim 1, wherein the first aperture indicates color information of the tape.

6. The tape cassette according to claim 1, wherein the second aperture indicates color information of the tape.

7. The tape cassette according to claim 1, wherein the second direction crosses the first direction.

8. The tape cassette according to claim 7, wherein the second direction is perpendicular to the first direction.

9. The tape cassette according to claim 7, wherein the third direction crosses the first direction and the second direction.

10. The tape cassette according to claim 8, wherein the third direction is perpendicular to the first direction and the second direction.

11. The tape cassette of claim 1, wherein the arm includes a first indicator and a second indicator arranged at the second outer surface in a predetermined pattern, a position of the first indicator is different from a position of the second indicator in the second direction and third direction.

12. The tape cassette according to claim 11, wherein the first indicator is a hole extending through the second outer surface.

13. The tape cassette according to claim 12, wherein the second indicator is a hole extending through the second outer surface.

* * * * *